INVENTORS
DAVID R. HUNTER
MARTIN S. KESSELMAN
BY [signature]
ATTORNEY

COMBINATIONAL COMPUTER SYSTEM

Filed Oct. 7, 1964

INVENTORS
DAVID R. HUNTER
MARTIN S. KESSELMAN
BY [signature]
ATTORNEY

COMBINATIONAL COMPUTER SYSTEM

Filed Oct. 7, 1964

INVENTORS
DAVID R. HUNTER
MARTIN S. KESSELMAN
BY
ATTORNEY

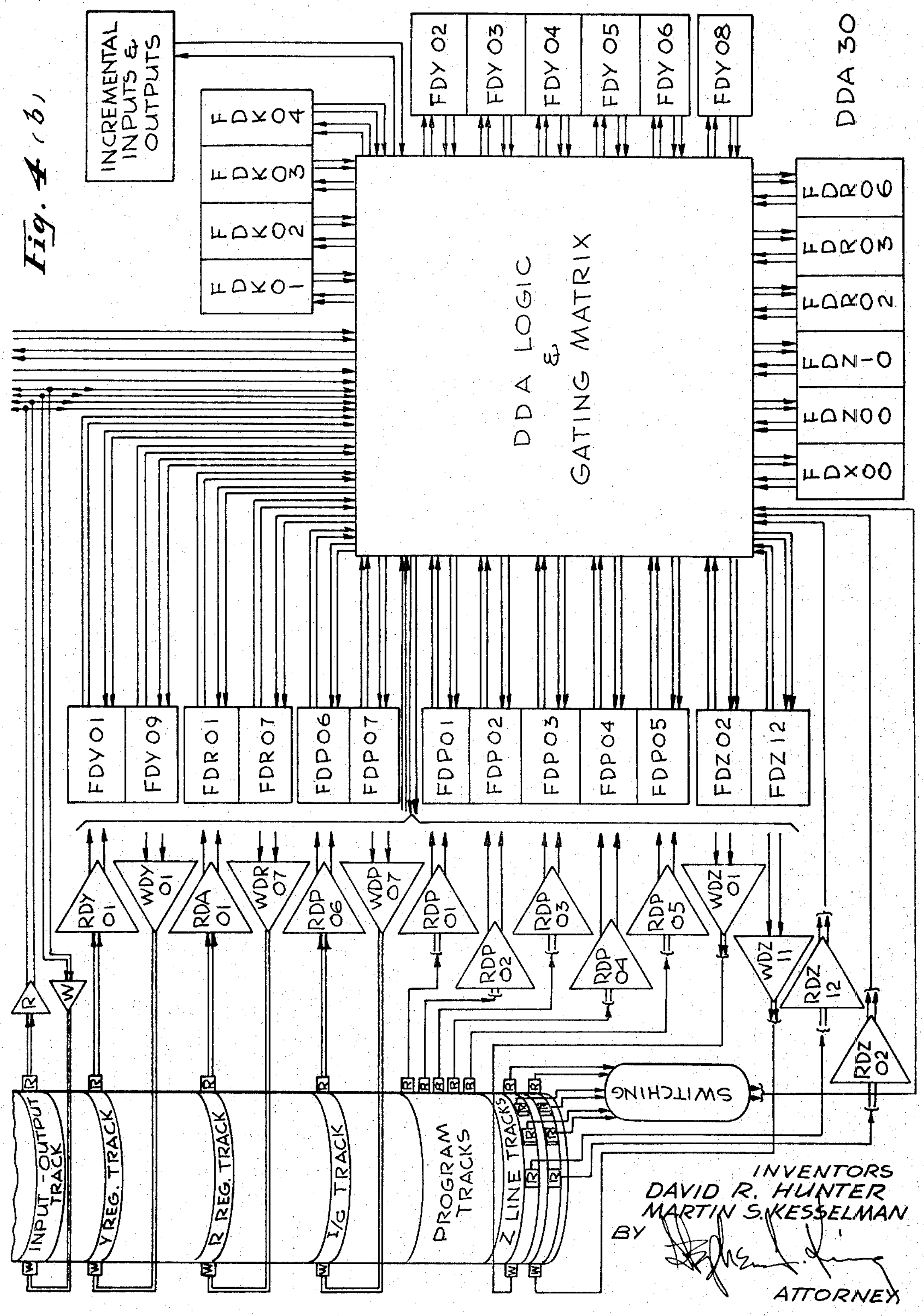
Fig. 4 (3)
INVENTORS
DAVID R. HUNTER
MARTIN S. KESSELMAN
BY [signature]
ATTORNEY

INVENTORS
DAVID R. HUNTER
MARTIN S. KESSELMAN
BY
ATTORNEY

INVENTORS
DAVID R. HUNTER
MARTIN S. KESSELMAN
BY
ATTORNEY

INVENTORS
DAVID R. HUNTER
MARTIN S. KESSELMAN
BY [signature]
ATTORNEY 3,419,711
Patented Dec. 31, 1968

3,419,711

COMBINATIONAL COMPUTER SYSTEM

David R. Hunter, Canoga Park, Los Angeles, and Martin S. Kesselman, Encino, Los Angeles, Calif., assignors to Litton Systems, Inc., Beverly Hills, Calif.

Filed Oct. 7, 1964, Ser. No. 402,194
17 Claims. (Cl. 235—150.31)

This invention relates to digital computers and, more particularly, to a combinational computer system including a general purpose computer and a digital differential analyzer.

A general purpose computer (termed a GP) is capable of accomplishing most arithmetic functions. However, a general purpose computer requires an inordinate amount of time for many operations since it is constructed of basic functional units to enhance its flexibility. For example, integration is a slow process with a general purpose computer.

On the other hand, integration is accomplished quite rapidly by a minimal equipment of a digital differential analyzer, a computer designed especially for integration. However, a digital differential analyzer (more familiarly termed a DDA) is quite limited in the functions it can accomplish.

It would appear quite advantageous to combine a GP and a DDA into a single combinational computer system in which each complemented the other. The advantages of such a system have long been known. In such a system the GP would handle general problems and exert overall control while the DDA would handle integration problems rapidly. Attempts have been made to devise combinational systems of this type but those realized have proven less than entirely successful because of size, complication, low speed of operation, and incompleteness of communication between and within units.

More particularly, large numbers of components have increased both the size of the combination and the rapidity of failures in prior art machines. Coordinating the two basic machines has proven a problem. Techniques for making best use of the inherent advantages have not heretofore been devised.

Particular problems arose because GP's and DDA's were originally designed independently of one another and their association was accomplished in a patchwork fashion. For example, in general, both GP's and DDA's are fixed word length machines. When associated, the word lengths had to be chosen with both machines in mind though the original factors determining word lengths varied. Generally, the compromise reached was unsatisfactory. For example, often the GP was forced to idle for long periods until DDA solutions could be reached; and vice-versa. Internal DDA communication difficulties related to the particular word length often slowed the operations further.

All of these problems and many other more specific problems emphasize the need for an improved system, one designed from the ground up as a combinational computer. It is to this end that the system of this invention was devised.

A general object of the invention is to improve computer systems comprised of a general purpose computer and a digital differential analyzer in association.

Another object of this invention is to increase the facility and ability of such a combinational computer system.

An additional object of the invention is to reduce the size of combinational computer systems while increasing their flexibility.

A more particular object of the invention is to increase the control the general purpose computer of such a system exerts over the digital differential analyzer by increasing the number of interrelated functions available.

Yet another object of the invention is to eliminate the necessity of compromising word lengths in machine design where a general purpose computer and a digital differential analyzer are associated.

Another object of the invention to increase the ability of each associated computer unit to furnish values which may be utilized by the other unit and to provide checks and corrections for the other unit.

Specific objects of the invention relating to the individual units are to increase the speed and ability of each by facilitating internal communications and to provide certain new automatic functions.

These and other objects are accomplished in acordance with the features of the invention by a combination computer system utilizing a general purpose section with increased automatic ability and a DDA constructed in accordance with a new philosophy to provide variable word length integrators and a radically increased internal communication facility. The variable length integrators eliminate the necessity for word length compromises so that each machine may operate most efficiently. The increased communication facility allows the machines to interoperate without the usual delays. The additional automatic functions increase overall system ability and speed.

The system includes a GP having memory, control, and arithmetic sections. The control section enables the normal computational functions of a general purpose computer and, additionally, provides preemptive control of the DDA. The DDA has program and control sections for relating components as an initial conditions track, a Y register, a R register, and a pair of Z lines, all for accomplishing programmed integration.

The general purpose computer section is arranged to have two independent methods of communication with the DDA to further enhance cooperative association between the units. A number of GP-controlled checking and correcting functions have been devised for better utilizing the dual arrangement. For example, whole number corrections of individual DDA integrators may be made. Provision for correcting or initiating Y numbers for interrelated DDA integrators on a single iteration is also available.

The variable length integrators of the DDA are especially important—not only do they allow the DDA of this system to be used so that substantially no bit position is useless by virtue of machine restrictions, they also eliminate the word length compromises between GP and DDA. The location and length of each integrator is completely under control of the programmer who can start and stop integrators, select increments as he desires, and accomplish many other functions. The programmer can reserve as many bit times as are needed for an operation, leaving no wasted space between integrators. Thus, each integrator may abut upon its neighbors with substantially no waste space between them; and each integrator may be as long as the programmer desires.

In order that such a compact arrangement may be used, a very flexible system of Z-line communication is necessary within the DDA. In the present DDA, a short recirculation loop is provided for the Z-lines. There are four read stations spaced above the Z-line tracks on the drum. A temporary storage flip-flop is also provided to allow selective Z-line storage thereby to increase the communication facility of the arrangement. It is possible, by intelligent use of the storage flip-flop, the recirculating loop, and the multiple read positions to effect Z-line storage at any desired bit location on the Z-lines. Selection may also be accomplished at any bit location. Therefore, each integrator can communicate with any other integrator with practically no restrictions.

The DDA of this invention by reason of its ability to be programmed and thus to use variable length integrators and due to its flexible communication scheme can utilize as much as ninety percent of the register space available for integration. In a fixed length machine, only sixty percent of integrator space is, on an average, usable. The advantages of this optimization are manifest.

A number of other features of both the GP and DDA sections are important in realizing the objects of the invention. For example, an extremely long track length provided for the registers of the DDA allows the variable length integrators to be programmed substantially at will and eliminates word length restrictions. "Semi-permanent" storage arrangements within the GP and the DDA lighten the weight of the system and reduce its size and complexity, and the enhanced internal communication allowed by increased storage and pick-off facilities aids in increasing machine speed. An especially useful feature is a storage facility placed between the DDA and GP and capable of cooperating with either; the storage is most useful as an interim memory for the DDA, allowing short-term changes to be made with ease and without delay. A pair of logical transfer commands in the GP allow automatic operations especially suited to such a combinational system.

These and other advantages and features of the invention will be better understood from the detailed description which follows when considered with the drawings. In the various figures of the drawings, the same designations have been used for the same elements. It is to be understood that the drawings are for the purpose of illustration only and are not intended to define the limits of the invention.

Figure 5:
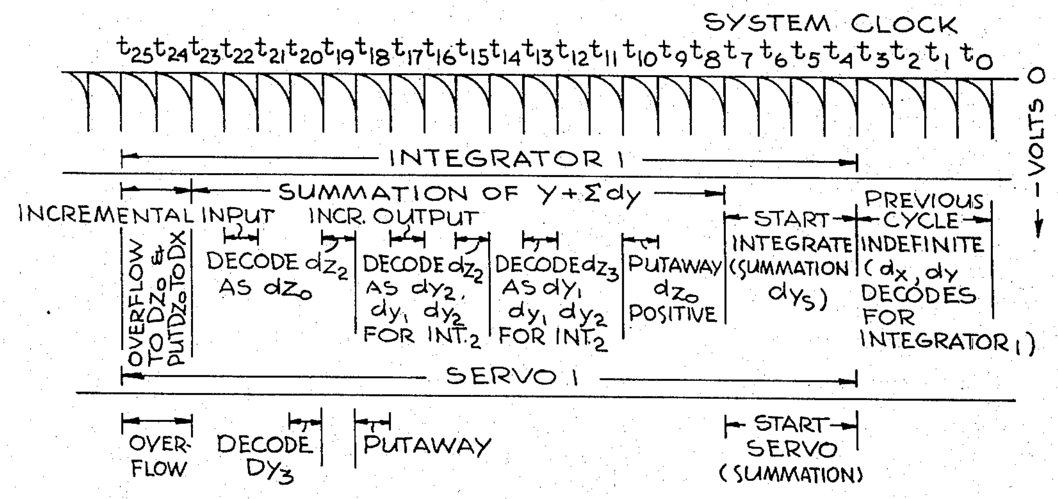
Figure 4A:
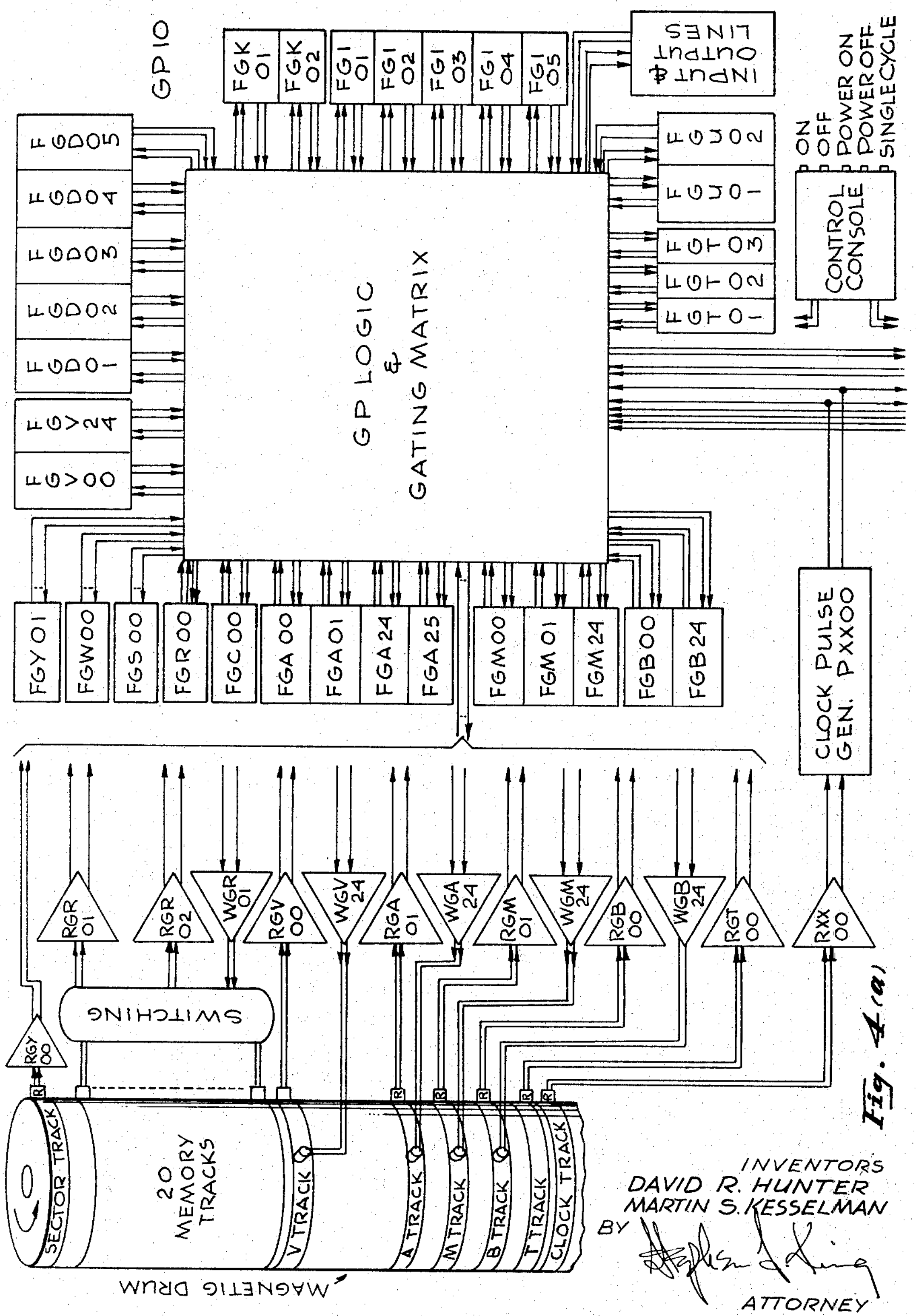
Figure 6:
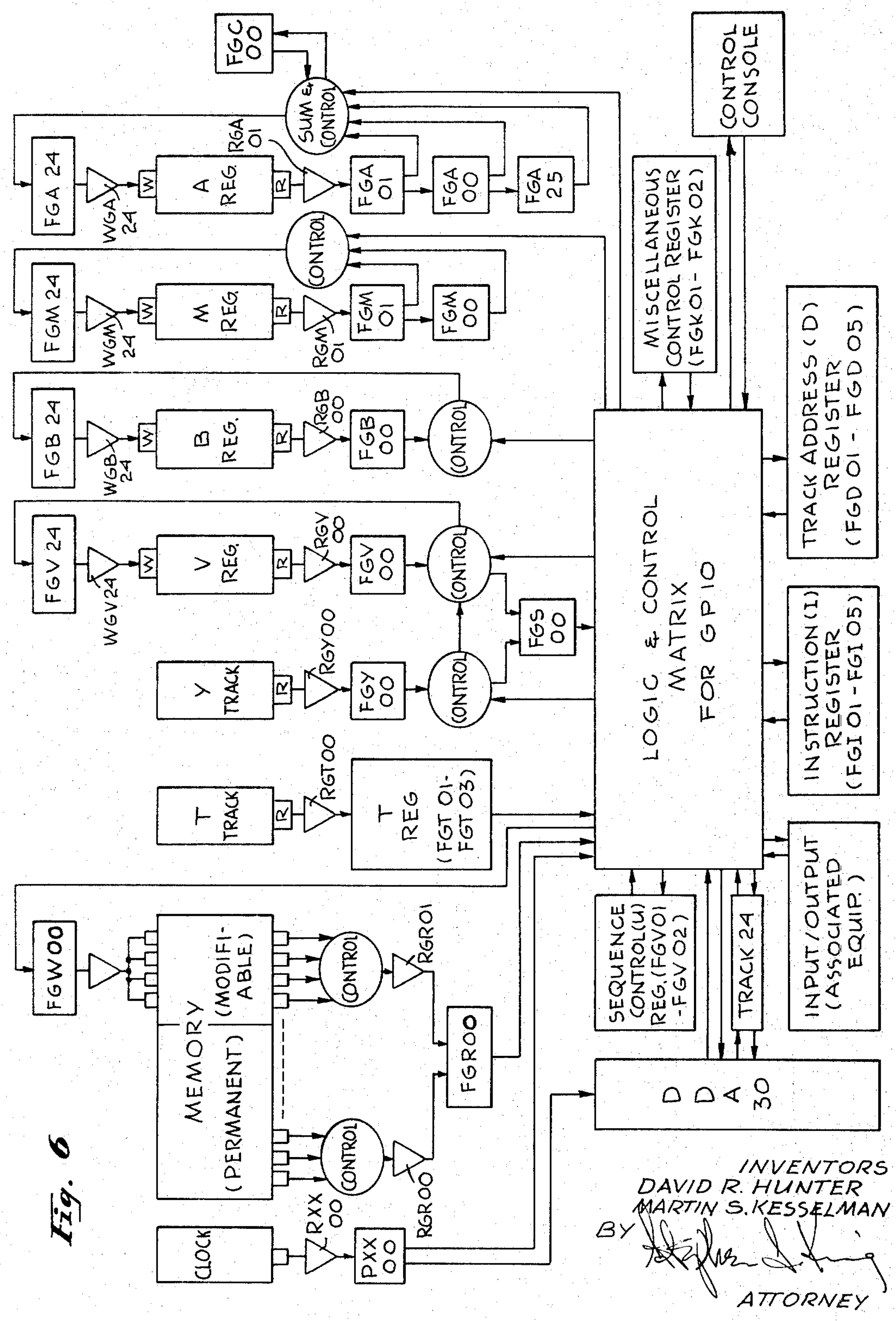
Figure 7:
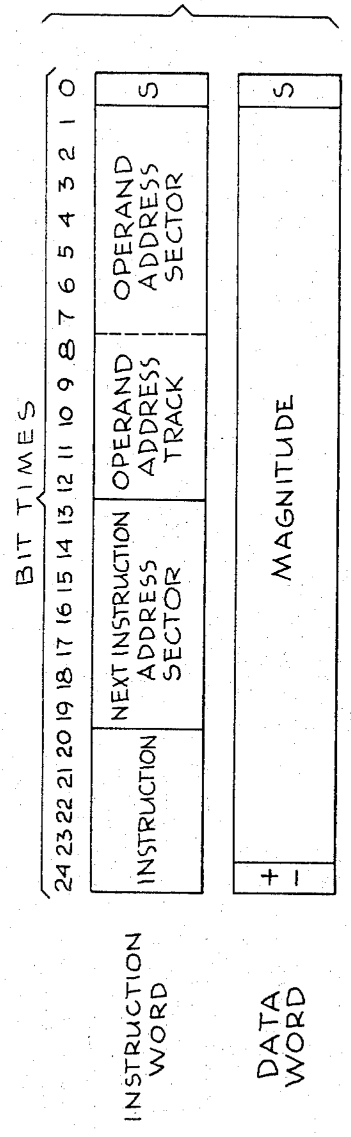
Figure 8:
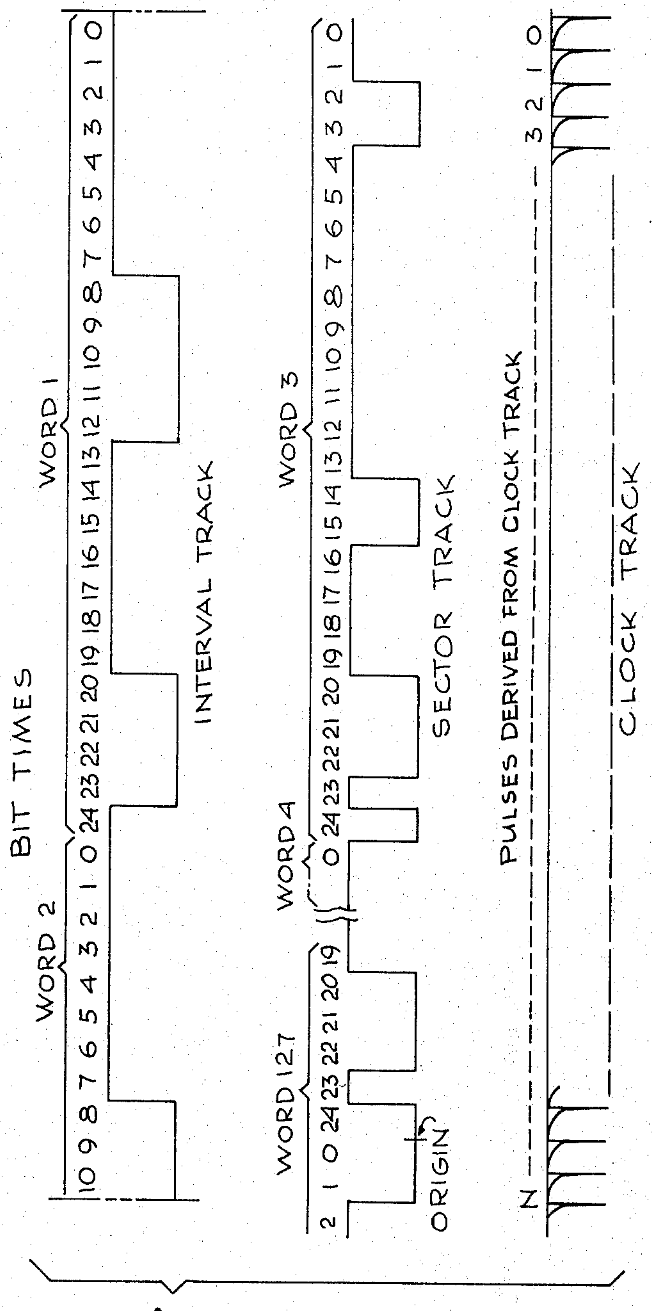
Figure 9:
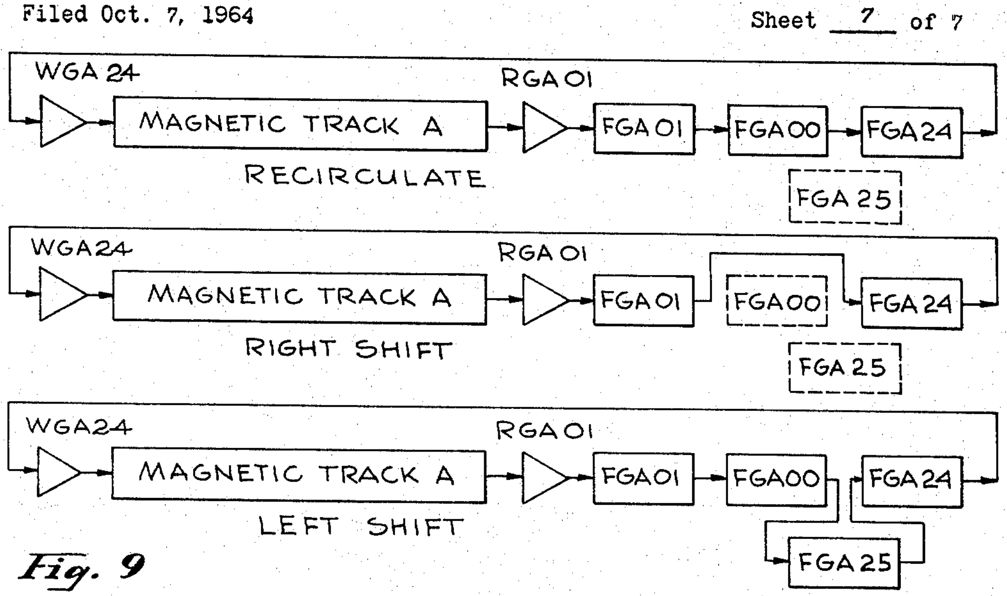
Figure 10:
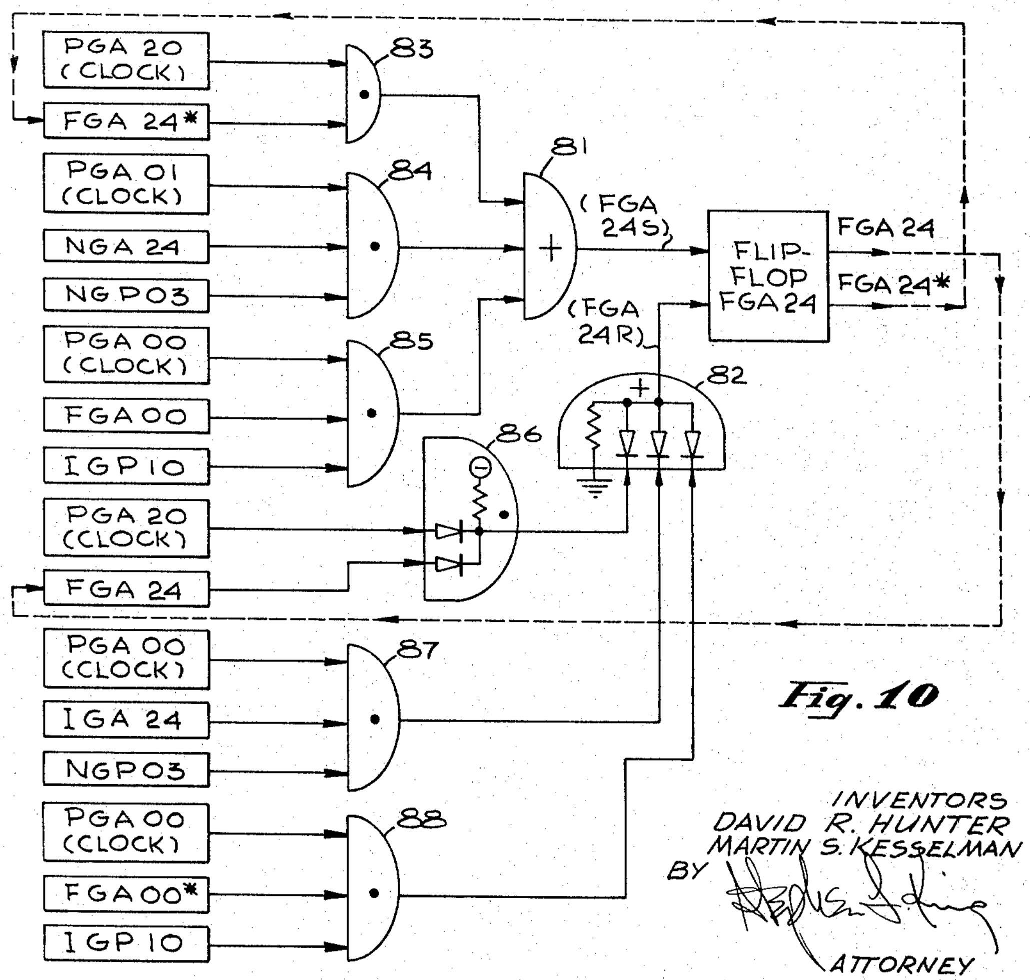

FIGURES 4(*a*) and 4(*b*) form (when combined) a partial-block, partial-schematic diagram of the combination computer system of the invention;

FIGURE 5 is a diagram illustrating the sequence of commands during typical operations of the digital differential analyzer of the invention;

FIGURE 6 is a functional block diagram of the general purpose computer section of the system of the invention;

FIGURE 7 is a diagram of the word structure of the general purpose computer section of the invention;

FIGURE 8 is a diagram of the timing tracks of the general purpose computer section of the invention;

FIGURE 9 is a diagram describing connections in the operation of the accumulator of the general purpose computer section of the invention; and FIGURE 10 is a diagram illustrating how one of the logic equations relating to the invention may be mechanized.

*General description of the system*

Figure 1:
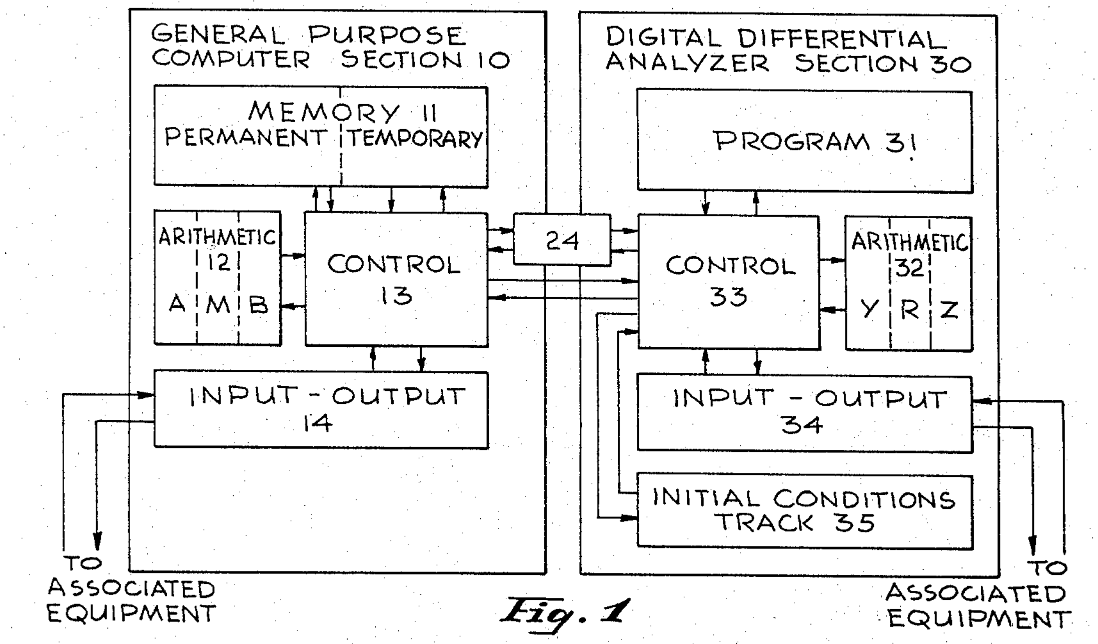
FIGURE 1 is a block diagram describing the system of the invention in general functional detail.

In FIGURE 1 of the drawings, a philosophical block diagram of a computer system in accordance with the invention is shown. The block diagram is useful in illustrating the fundamental elements, concepts, interrelations and modes of operation of the system. Basically, the system of FIGURE 1 comprises a general purpose computer section 10 (GP 10) and a digital differential analyzer section 30 (DDA 30). As is well known, a GP is a computer constructed to solve mathematical and logical problems in general, while a DDA is a computer constructed with a special integration function in mind, often called a special purpose computer.

A GP utilizes a number of arithmetic registers, a memory section for storing data and instructions, and a control section. The control section operates in response to the instructions to relate the arithmetic registers and certain other equipment in such a way as to accomplish prescribed manipulations with the data.

A DDA is adapted to perform integration by a process such as that disclosed in U.S. Patent No. 3,035,768, issued May 22, 1962, to Floyd G. Steele. Essentially, the process involves the variation of a Y number in a Y register by delta Y increments, the variation of an R number in an R register by the Y number at a delta X incremental rate, and the selection of R register overflow increments (delta Z increments) as indicative of the result of integration. Each particular integrator is normally associated with others to handle large integration problems. The integrating ability of a DDA is especially useful when associated with a navigational system such as an inertial guidance platform system for computing distances, velocities, and positions. The DDA 30 of the system of this invention may be used for just such purposes.

In the system of the present invention, the DDA 30 is operated under control of the GP 10. The overall control practiced by the GP 10 allows the operation of the DDA 30 to be corrected, enhanced, and complemented, thereby providing a much more capable arrangement than that of the usual DDA. For example, the GP 10 of the present arrangement is capable of providing initial conditions for the DDA 30, of computing discrete variable and using these for correcting the DDA 30, and of handling other problems related to navigation and other assigned operations, such as fire control and so on. As will be obvious to all skilled in the art, such an arrangement of a GP-controlled DDA offers substantial capabilities.

The GP 10 provides overall control of the system. It consists, philosophically, of a memory section 11, an arithmetic section 12, a control section 13, and an input-output section 14. The memory section 11 is subdivided into a permanent memory section and a temporary memory section. The permanent memory section may be used advantageously to hold constants useful in the contemplated operations of the GP 10 while the modifiable section may be used for the storing of program instructions, for holding various inputs, storing partial solutions, and for accomplishing other interim memory functions.

The particular embodiment of the computer system, described generally in this section and in detail in the specific description, comprises a single magnetic drum and associated logic and gating circuitry for providing memory, recirculating registers, and timing tracks for both the GP 10 and the DDA 30. The machine operates in a serial fashion upon binary numbers, though a ternary representation is used for a portion of the internal communication of the DDA 30.

The arithmetic section 12 has three recirculating arithmetic registers A, M, and B. The register A is an accumulator having both left and right shift capabilities, the register M is an auxiliary register having both left and right shift capabilities, and the register B is an auxiliary register havng only a recirculating storage capability.

The control section 13 may be considered to include a number of flip-flop control registers, timing tracks, and a logic and control matrix for executing the various functions defined by the equations and instructions by which the GP 10 is operated. Input and output communications between the GP 10 and various equipments external to the system is accomplished via the input-output section 14. General control and information transfer of input and outpjut signals within the system between the GP 10 and the DDA 30 are accomplished directly and via a special storage section 24, as explained more particularly in the specific description which follows.

Essentially, the GP 10 is capable of the normal functions of a general purpose computer and, in addition, a number of functions which are especially useful in controlling the DDA 30. For example, the GP 10 is provided with control circuitry for initializing, clearing, recirculating, operating upon various registers of, and starting and stopping the DDA 30. It also has special logical functions which do not directly affect the DDA 30 but are useful when utilized to enhance its operations.

For purposes of description it will be assumed hereinafter that the GP 10 of this invention is to operate, with, upon, and in response to signals representing binary numbers, although it will be clear from both the general and detailed description that the fundamental concepts of the invention are equally applicable to operation with numbers represented in other conventions of notation.

The DDA 30 has program section 31 including five program storage tracks; an arithmetic section 32 including a Y register, an R register, and a pair of Z-line storage tracks; a control section 33; an input-output section 34; and an initial conditions track 35 for storing Y numbers for initializing the integrators of the Y register.

Overall control of the operation of the DDA 30 is exerted by the program section 31 which functions in response to the program on the five tracks. These tracks contain the entire control program for starting and ending integrators, selecting incremental signals, and operating in the servo mode. Overall control is exerted by these tracks and by the GP 10. Both operate on the control section 33 to control the logical operations. The program section 31 also controls the receipt of incremental information via input-output section 34 from positions external to the system. The control section 33 includes circuitry for executing the logical equations (the matrix) and a variety of flip-flop registers for controlling operations.

The DDA 30, under control of the GP 10, is capable of operating in three modes. In the integrate mode, the DDA 30 utilizes the arithmetic registers in section 32 to accomplish specified integrations under the control of the program control section 31 and the control section 33. In the servo mode of operation, ternary indications generated during the integration mode are converted into conventional binary form under program track control for external use. In the recirculate mode of operation, information being processed through an integration cycle is recirculated and retained without further manipulation being accomplished so that the GP 10 may function without destroying information of the DDA 30 which may still be useful.

As intimated above, the primary exception to the use of binary notation throughout the system occurs in the arithmetic section 32 of the DDA 30 which utilizes a ternary representation for internal communication. This deviation from the conventional binary system of notation will be commented upon and explained as it is considered. In general, the notation is used to enhance the calculation precision attainable.

In general, the operations of the GP 10 and the DDA 30 which interrelate and enhance each other are best understood only after a discussion of the particularities of the individual sections. For this reason, further discussion of the capabilities of the system realized by the association will be deferred until a complete discussion of each component computer has been given.

In general, however, it should be remarked that the GP 10 is capable of providing the DDA 30 with whole number values for integration and of receiving whole numbers from the DDA 30 for computational use, of providing interrelated groups of initial conditions for Y register integrators of the DDA 30, of checking values in the DDA 30 and correcting or updating those values where necessary, and of many other valuable functions. And the unique system of DDA 30 which allows individual integrators to vary in length negates the normal time-consuming compromises between systems. Internal communication within the DDA 30 further enhances the ability of the two computer sections to function together and independently without placing disabling requirements on each other. All this will be better understood from the specific descriptions of the GP 10 and the DDA 30 which follow.

Before proceeding further with the description of the system, various nomenclature used will be explained.

Since a component-by-component representation of a computer is extremely difficult, wasteful of descriptive space, and confusing, algebraic representations of computer construction have been developed. The most widely used representation, a Boolean algebra representation, describes computer signals and computer elements by algebraic symbols. The two are then related by equations which represent computer construction and operation in terms of algebraic functions.

For example, numbers and instructions are represented in the physical electronic digital computer by discrete electrical signals. Normally, two state (binary) signals are chosen as the most reliable and as causing the least waste of equipment. Two levels (often voltage levels) of electrical signals are chosen to represent the two binary digits; for example, a first voltage may represent a binary one, a second voltage, a binary zero. By combining the signals into groups in accordance with a prescribed pattern such as the binary number pattern, each number and instruction may be represented. These groups of signals may then be related by logical equations which define the interrelations of elements and signals. These signals accomplish association of the physical computer elements to realize the computer functions. The equations relating the signals and elements completely represent a computer.

In operation, the numbers and instructions appear as timed sequences of voltages. A basic time interval (the clock interval) is selected. The boundaries of the clock interval are delineated by clock pulse signals.

In the present Boolean algebraic notation, the individual signals are represented by alphanumeric symbols. To clarify the nomenclature utilized in the present description, consider the flip-flop FGA01 shown in FIGURE 4. Flip-flop FGA01 has a pair of input conductors designated FGA01S (set FGA01) and FGA01R (reset FGA01) and a pair of output conductors designated FGA01 (set or one condition output) and FGA01* (reset or zero condition output). The designations of the conductors correspond to the signals applied on the conductors. It will be understood that in response to a selective application of a signal FGA01S or a signal FGA01R, the flip-flop FGA01 will be placed in its one-representing state or in its zero-representing state, respectively. Further, placing the flip-flop FGA01 in its set state will be understood to generate a set output signal FGA01, while placing it in its reset state will be understood to generate a reset output signal FGA01*. Corresponding nomenclature and operation will be understood to apply to each of the other flip-flops of the computer.

The nomenclature used for identifying each of the components of the system should also be considered. Each of the items (e.g., FGA01) represents a particular functional piece of equipment. The first letter in the designation defines the particular type of equipment; for example, F designates that a piece or item of equipment is a flip-flop while I designates that a piece of equipment is an inverting amplifier. Complete first position letter designations are given in the following Table I. The letter in the second position designates the section of the system in which the particular piece of equipment resides; for example, the letter G designates a piece of equipment residing in the GP section, the letter D designates a piece of equipment residing in the DDA section, while the letter I designates a piece of equipment residing in the input-output section of equipment. Wherever feasible, the letter in the third position designates the particular function of the equipment; for example, the letter A in referring to the GP 10 designates the A register; the letter M, the M register; and so on. In some cases, this third letter refers to no particular function but is included so that each of the items of equipment is clearly and singularly defined thereby eliminating confusion between items. The two numbers in the fourth and fifth places of each designation define which particular one of like pieces of equipment is involved; for example, flip-flop FGA01 is the "01" flip-flop of the accumulator residing in the GP 10. In addition, where a letter appears in the sixth position, it designates input to the particular piece of equipment; I designates input in general, S designates setting input to a flip-flop, and R designates resetting input to a flip-flop. The letter C in the sixth position designates a closed or made switch contact.

TABLE I

| Letter: | Equipment |
|---|---|
| F | Flip-flop. |
| G | Read head swing. |
| H | Magnetic drum head. |
| I | Inverting amplifier. |
| N | Non-inverting amplifier. |
| P | Pulse amplifier (clock pulses). |
| R | Read amplifier. |
| S | Mechanical switch. |
| W | Write amplifier. |

*Structure of general purpose computer section*

The General Purpose computer section 10 (hereinafter referred to as GP 10) of the system of this invention is shown philosophically in FIGURE 6. The GP 10 includes a number of memory tracks (in the particular embodiment described, thirty-two) which are individually allocated to permanent memory, modifiable memory, recirculating registers, and input-output functions. Certain tracks on the same memory drum are allotted to the various functions of the DDA section, described in detail elsewhere in the specification. As an indication of the ability of the GP 10, the particular embodiment having thirty-two memory tracks on the single drum provides space upon each track for 128 words, each of twenty-five binary bits. The word structure will be considered hereinafter in discussing the operation of the GP 10.

The GP 10, functionally includes four recirculating registers. These registers are formed under control of the matrix circuitry which relates the various components. Of these, the A register, the M register, and the B register are used in the main computational operations while the V register is used in addressing. The A register is the accumulator, the primary arithmetic register in which substantially all arithmetic operations are accomplished; this register has both left and right shift capabilities. The M register is an auxiliary arithmetic register which holds the multiplier during a multiply instruction and a quotient during a divide instruction; this register has a right shift capability, and a left shift capability is available through time sharing a logic flip-flop. The B register is an auxiliary arithmetic register which holds the multiplicand during the multiply operation and the divisor during the divide operation; this register has neither a left nor a right shift capability. The V or sector address register is non-arithmetic. It is not under program control but automatically receives and recirculates any instruction read from memory. The V register holds the instruction for a bit-by-bit comparison of sector addresses with the output of a sector address track which particularly designates each word sector about the track. The present position designation furnished by the sector address track is compared with the instruction or operand address carried by the V register. When the two match, the appropriate word position on the drum is automatically selected. The V register may also be mechanized to count intervals for functions which require a particular number of word times, e.g., shift right, multiply, and divide.

The sector address Y track functions in conjunction with a word interval track to provide basic timing and sequencing control. As outlined, the sector address track provides information defining the sector of memory which is presently under the read heads for word addressing.

The sector address track also contains a constant in each word position which is used to define the number of word times required for performing the above-mentioned count during multiply or divide instructions. The constant is read into the sector address (V) register and decremented during the multiply or divide instructions.

The interval track, on the other hand, provides basic information for sequencing the various operations of the GP 10. The interval track provides signals for dividing each word sector into a number of intervals so that the meaning of particular bits of each word may be distinguished. The intervals are used in controlling the various logical operations.

During each particular operation, the GP 10 cycles through four basic phases under control of a pair of sequence control flip-flops FGU01 and FGU02, together termed the sequence control (U) register. The phases for each operation are (1) search for the next instruction, (2) read next instruction, (3) search for the operand specified in the instruction word, and (4) read the operand and perform the arithmetic operation. The following Table II outlines the conditions for the U register flip-flops in the various phases of operation:

TABLE II

| Phase: | State | |
|---|---|---|
| 0 | FGU02* | FGU01* |
| 1 | FGU02* | FGU01 |
| 2 | FGU02 | FGU01 |
| 3 | FGU02 | FGU01* |

The following Table III lists the operations which the GP 10 is capable of performing when the logic provided hereinafter is mechanized in accordance with this specification.

TABLE III

| Instruction: | Binary code Positions 54321 |
|---|---|
| Add | 00001 |
| Subtract | 00101 |
| Clear-Add | 01001 |
| Clear-Subtract | 01101 |
| Add-Replace | 01011 |
| Subtract Replace | 01111 |
| Multiply | 10001 |
| Divide | 10101 |
| Shift A Right | 10000 |
| Shift A Left | 10100 |
| Store Accumulator | 00011 |
| Store M-Register | 00110 |
| Store B-Register | 00111 |
| Load M-Register | 11111 |
| Load B-Register | 11101 |
| Exchange Contents of the A-Register and B-Register | 11001 |
| Exchange Contents of the A-Register and M-Register | 11011 |
| Sign Test Transfer | 10011 |
| Compare Transfer | 10111 |
| Logical "and" Transfer **1** | 10110 |
| Logical "and" Transfer **2** | 10010 |
| Unconditional Transfer | 11110 |
| Idle | 01110 |
| Input | 11010 |
| Output | 01010 |
| DDA Control | 01000 |

Track Address Register Control:
- Initialize DDA.
- Initialize-Clear DDA.
- Clear R and Z.
- Start DDA.
- Y Register to Initial Conditions Track.
- Recirculate DDA.

The execution of any particular instruction is under the control of the instruction (I) register. The instruction register includes five flip-flops capable of storing (in binary form) thirty-two individual instructions. After each instruction in Table III is listed the particular binary signal required to command the performance of a particular instruction.

A more particular description of the arithmetic and control portions of the GP 10 of the system of the word structure used in sequencing will now be given to assist in understanding the arrangement of the system.

*Instruction and data words*

The GP 10 of the system of this invention employs binary instruction and data words (shown in FIGURE 7) each having a length of twenty-five bits. The first bit of each instruction and data word is designated a "spacer" bit. The spacer bit is provided to allow selective word writing on the modifiable tracks by furnishing a period for dissipation of fringing flux generated when the write amplifiers are switched off during the last bit time of writing. Since the spacer bit has no logic or informational content, the effective word length of both the instruction and the data word is twenty-four binary bits.

The twenty-four binary bits of an instruction word following the spacer bit provide an operand address, a next instruction address, and an instruction. In the particular embodiment of the invention described herein, the operand address consists of twelve bits, the first seven of which designate a word sector and the second five of which designate the particular track to be addressed. There are 128 sectors or word positions around any particular track. The next seven bits of an instruction word designate the sector address of the next instruction. For word length economy, the instruction word specified by this sector address is taken from the same track as that of the instruction currently being executed so that an unconditional jump instruction must be given to obtain an instruction from another track. The last five spaces of the instruction word contain the binary signals of Table III which designate the particular operation or instruction to be executed for the particular operand. The five bit positions allow up to thirty-two commands to be executed by the GP 10.

The data word contains a spacer bit, twenty-three bits of magnitude information, and a sign bit. In the particular representation used in the described embodiment, all data is treated as fractional; and the binary point is treated as if located between the most significant bit position and the sign bit position. The sign bit position follows the last magnitude bit in the twenty-fifth bit position. Negative numbers are stored and processed in two's complement form.

As mentioned, each data and instruction word in memory has a particular track and sector address. A track is selected by a designation which includes the read head for that track. A sector is selected by the coding provided on the permanent sector address track (shown in FIGURE 8). Each sector of this track has a particular binary designation contained in bit times $t_1$–$t_7$ and again in bit times $t_{13}$–$t_{19}$. The first seven bit group is used during the operand sector search, the second during the instruction sector search. The binary designations increase in value by one with each sequential sector. Bit times $t_{20}$–$t_{24}$ of each sector on the sector address track contain a number used in counting shifts for the multiplication and division operations. In addition, the sector address track designates the origin by containing a one bit at bit time $t_0$ of the first sector of the drum.

Since the instruction and data words and the various track information utilized in the GP 10 are divided into portions having different significance, means are provided for distinguishing the particular intervals of each sector. To this end, the word interval track contains information (FIGURE 8) arranged to define, when used with the logic circuitry the following intervals for each of the 128 sectors of the memory tracks around the periphery of the particular drum of this embodiment: an interval $I_0$ including only the first bit time $t_0$ for designating the spacer bit interval, an interval $I_1$ containing the next seven bits $t_1$–$t_7$ for designating the operand sector address, a next interval $I_2$ containing the next five bits $t_8$–$t_{12}$ for designating the operand track address, a next interval $I_3$ containing the next seven bits $t_{13}$–$t_{19}$ for designating the next instruction address, an interval $I_4$ including the bits $t_{20}$–$t_{24}$ for designating the particular instruction, and a last interval $I_5$ including only the last bit $t_{24}$ for designating the sign bit time. In order to define the six intervals listed above, the output pattern of the interval track is utilized in the same manner as the output pattern of a flip-flop might be used in a sequence counter.

In order to distinguish between the particular bits, a clock pulse generating arrangement is also provided. It should be noted that clock pulses on a single master clock pulse track (shown in FIGURE 8) are utilized to provide timing for both the GP 10 and DDA 30 of the system. A timing signal wave form, or so-called clock pulse wave form, may be permanently recorded on the clock pulse track. The wave form may comprise (in the particular embodiment described) 3200 evenly spaced timing signals recorded in a well known manner about the periphery of the drum. Upon rotation of the drum, each passing of the timing signal beneath a read transducer RXX00 positioned adjacent the clock timing track causes the production of a corresponding electrical signal. An electrical signal train is applied to a wave-shaping circuit or master clock pulse generator PXX00 which converts the signals to an output train of sharp electrical clock pulses. This output train is utilized directly by GP 10 and DDA 30 and is also applied to a plurality of auxiliary clock-pulse generating circuits to generate the clock pulses defined by the logical equations listed hereafter.

Clock pulses applied to the matrix of the DDA 30 and that of the GP 10 and are utilized therein to synchronize almost all of the operations of the system. Transitions between the electronic one or zero states of the flip-flops circuits are made only upon the appearance of a clock pulse signal. Recording in magnetic form one or zero signals upon all of the memory tracks is synchronized with the recording of a clock signal in such a manner that the tracks are effectively divided into discrete storage cells corresponding to the timing track cells. Thus, the particular bits of each word of memory, of the word interval track, of the sector address track, and of all other tracks on the drum are effectively divided into bit positions under control of the clock pulse track. Later in the description of the specific circuitry comprising the various gating matrices, it will become clear how the clock pulse train produced by the clock pulse generator is transferred to a number of other auxiliary clock pulse generators for distribution to the various flip-flops of the system. In this manner the voltage level of the clock pulse signal may be maintained throughout the various portions of the system even though any number of clock signals are required coincidentally. The use of auxiliary clock pulse generators also allows the generation of half-clock pulses which facilitate certain magnetic recording techniques.

FIGURE 8 illustrates the patterns coded on the interval and sector address tracks to accomplish the above-described interval and sequence definition. It also shows the clock pulses generated by the master generator PXX00.

*Register description*

In FIGURE 6, the various registers and attendant circuitry are shown in block form. It should be noted that the logic and control matrix is illustrated as a central block. The function of the circle actually is a part of the matrix but is better understood when displaced. Since it is quite difficult to visualize of just what parts the various registers are comprised, FIGURE 6 has been constructed to illustrate functional components rather than actual circuitry. Certain portions of the matrix are therefore shown in "control" circles so that the function accomplished may be more easily understood.

Like all of the GP registers, the A register has twenty-five bit positions. These positions are made up of the portion of a magnetic drum memory track passing between the A register read head and the A register write head and a plurality of flip-flops selected by the logic and control matrix for the particular function.

Essentially, the magnetic drum memory track cooperates under matrix control with a magnetic write head and a magnetic read head to form a first recirculating channel, referred to as the A register. The path of information flow through the A register is as follows: magnetic read head, read amplifier RGA01, selected flip-flops, matrix, write flip-flop FGA24, write amplifier WGA24, and a magnetic write head. The flip-flops FGA00, FGA01, and FGA25 are variously connected into the A register channel under control of the logic and control matrix in accordance with the system logical equations specified hereinafter. To aid in understanding of the connections, however, the following descriptions of particular operations are given.

In recirculating, the read head amplifier RGA01 is connected to a read flip-flop FGA01. The flip-flop FGA01 is connected directly to a flip-flop FGA00 which furnishes signals to a write flip-flop FGA24. Output from the flip-flop FGA00 during selected operations may also be directed to a flip-flop FGA25 which adds an additional bit to the recirculating register for left shifts. The flip-flop FGA24 forms the last bit position of the A register and signals therefrom are directed to the write head amplifier WGA24. Connections may also be made at the output of the flip-flop FGA01, the flip-flop FGA00 and the flip-flop FGA25 under control of the logic matrix so that normal recirculation, left shift, and right shift functions may be accomplished.

More particularly, as shown in FIGURE 9, in order to accomplish a right shift, the output of the A register is taken directly at flip-flop FGA01 (i.e., FGA00 is omitted from the recirculation path) thereby reducing the length of the recirculating register by one bit and effectively shifting the word right by one bit. To recirculate, on the other hand, the output is taken in the normal position at the output of the flip-flop FGA00 so that the normal number of bits is included in the particular word operated upon. When a left shift is desired, an additional bit is added to the recirculating register by connecting the flip-flop FGA25 into the register and disabling the output connections from the FGA00 and FGA01 flip-flops. Thus, as the drum track moves under the read and write heads associated with the A register, the bits are sequentially stepped out and through the selected flip-flop paths and rewritten onto the drum track, simple recirculation, left and right shift being provided as above described.

The output of the flip-flop FGA00 may be connected under control of the matrix to a full adder logic circuit within the matrix, conventional to recirculating registers of the drum type, which includes a carry flip-flop FGC00. In FIGURE 6, the adder is included within the illustrated sum and control block. Under control of the logic and control matrix of the GP 10, binary addition and subtraction may be accomplished by the full adder. By utilizing the full adder in conjunction with the flip-flops FGA01 and FGA25 and the other registers, multiplication, division and other operations may also be accomplished.

The M register, like the A register, includes that portion of a magnetic drum track recirculating between read and write heads positioned a selected number of bit positions apart. Like the A register, the M register includes a right shift flip-flop FGM01 with an output capable under matrix control of feeding either a recirculating flip-flop FGM00 or a write control flip-flop FGM24. As with the A register, each of the flip-flops FGM00, FGM01, and FGM24 functions as a particular bit position of the register. It should be noted that with the M register, only a right shift flip-flop is furnished. However, a left shift may be accomplished under matrix control by time-sharing a flip-flop FGD04 residing in the track address (D) register of the GP section of the computer.

The B register, like the M and A registers, comprises the portion of a circulating drum track between a write head and a read head. The B register also includes flip-flops FGB00 and FGB24 connected to function as input and output bit positions. Since no shift capabilities are desired for the B register, neither right nor left shift flip-flops are provided.

The sector address (V) register comprises the portion of a circulating drum track between a pair of read and write heads, a pair of amplifiers, a flip-flop FGV00 and a flip-flop FGV24. The elements are chosen to furnish a recirculating storage for a single word. Recirculation takes place as with the other registers via the read and write heads, the above-mentioned flip-flops, and that portion of the track between the read and write heads. The flip-flop FGV00 to which the pulses from a read amplifier RGV00 are directed has an output operated under control of the logic matrix for furnishing addresses contained in the particular word stored in the V register with the sector addresses on the sector address track.

The sector address (Y) track includes one entire magnetic memory track with information semi-permanently stored thereon. The magnetic track is connected via a read head to a read amplifier RGY00 which furnishes the information from the track to a read flip-flop FGY00. An output may be directed, in response to certain logical commands, from the flip-flop FGY00 to a sector search flip-flop FGS00 for comparison of the addresses of the words stored in the V register with those being read out of the sector address (Y) track. Actually, the comparison is made by logic circuitry of the matrix connected at the input to flip-flop FGS00.

The word interval (T) track includes an entire memory track of information semi-permanently placed upon the magnetic drum. A read head amplifier RGT00 is positioned to read individual bits selected sequentially from the interval (T) track. The read head amplifier RGT00 furnishes signals for operating a word interval (T) register comprising three flip-flops FGT01, FGT02, and FGT03. These flip-flops provide output signals unique to the above-defined word intervals.

Referring again to FIGURE 8, it may be seen that the T register receives a one input signal following bit time $t_7$ of each interval to place the flip-flop FGT01 in the set condition. The T register then receives a zero input signal following bit time $t_{12}$ to reset the flip-flop FGT01 and set the flip-flop FGT02. That these conditions particularly define the word intervals will be readily apparent to those skilled in the art.

In addition to the three flip-flop word interval (T) register which receives and records information indicative of the particular interval of each word sector from the interval (T) track, the GP 10 includes a number of other flip-flop registers. A five flip-flop track address (D) register (including flip-flops FGD01–FGD05) is provided for storing the track address of any particular operation which is taking, or has taken, place. This register is used to store the track address of the last instruction because, as mentioned above, in searching for a normal instruction the search is accomplished on the same track as was that of the previous instruction. Thus, the track identification address must be recorded in order to accomplish the subsequent search. In operation, the D register address activates that portion of the matrix which selects the appropriate track position. The D register is also used for certain command functions in addressing the DDA section and in multiplication and division operations. For example, the fourth flip-flop FGD04 of the track address register is time shared by the M register during phase three to provide the left shift capability above-mentioned with reference to the arithmetic capabilities of the computer section.

An instruction (I) register is also included in the GP 10. The instruction register includes five flip-flops FGI01–FGI05 which are used to record the particular instruction presently being, or to be, executed by the GP 10. The five positions available in the instruction register allow the execution of thirty-two individual instructions coded in the binary notation. Any particular instruction to be executed is read directly from memory into the instruction register during the time that the same instruction bits are being read into the sector address (V) register.

The sequence control (U) register comprising flip-flops FGU01 and FGU02 controls the four basic phases of operation of the GP 10. This register stores the information as to which phase of a particular instruction is presently taking place. For example, the flip-flops FGU01 and FGU02 store information as to whether a search for a next instruction, a sector search for an operand, a reading of the next instruction, or an execution of the arithmetic portion of an instruction is taking place. By their conditions, these flip-flops control the execution of the phases.

A last register in the GP 10 is the control (K) register which comprises a pair of flip-flops FGK01 and FGK02. The flip-flop FGK01 is used to define the first word time of phases two and three so that certain logical functions may be appropriately sequenced. For example, to save the track address of a previous instruction so that it may be used for the next instruction search, a transfer is made between the D and V registers during the first word time of phase three. The flip-flop FGK02, on the other hand, is designated the idle flip-flop. Under control of an external manual control console or in response to an idle instruction, this flip-flop causes the computer to recirculate while retaining the information presently in storage.

The following Table IV lists the flip-flops of the GP 10 of the system of this invention and briefly outlines the functions accomplished by each. These flip-flops appear in the logical equations which follow:

TABLE IV

| Flip-flop: | Function |
|---|---|
| FGA00 | Least significant bit of A register. |
| FGA01 | Right shift for A register. |
| FGA24 | A register write. |
| FGA25 | Left shift for A register. |
| FGC00 | Carry and logical transfers control. |
| FGM00 | Least significant bit of M register. |
| FGM01 | Right shift for M register. |
| FGM24 | M register write. |
| FGB00 | B register read. |
| FGB24 | B register write. |
| FGV00 | V register read. |
| FGV24 | V register write. |
| FGY00 | Sector address track read. |
| FGS00 | Count and coincidence control. |
| FGT01, FGT02, FGT03 | Interval register. |
| FGU01, FGU02 | Sequence register. |
| FGK01, FGK02 | Command register (Miscellaneous control). |
| FGI01, FGI02, FGI03, FGI04, FGI05 | Instruction register. |
| FGD01, FGD02, FGD03, FGD04, FGD05 | Track address register. |

The remaining basic components of the GP 10 of the system shown in FIGURE 6 are the logic and gating matrix and a control console. The matrix receives output signals of the flip-flops, the drum track read amplifiers, and the control console. The matrix generates input signals to operate the flip-flops in response to these input signals. More particularly, the matrix is composed of a plurality of combinations of AND and OR circuits, as determined by the plurality of logical equations, used for generating in synchronism with the clock pulses a corresponding plurality of setting and zeroing signals for the flip-flops. The logical equations of the GP 10 and the manner in which the equations are mechanized by the matrix are set forth in detail below.

The control console includes a plurality of switches and buttons and means for manually generating electrical switch signals in response to the positions of the switches and buttons. These are used to start and stop the computer, supply it electrical power, and so on.

*The operational phases of the GP section*

As mentioned above, in executing any particular operation, the GP 10 sequences through phase zero-search for next instruction, phase one-read next instruction, phase two-search for operand specified in instruction word, and phase three-read operand and perform operation specified. During each of these four phases, various logical and control functions are being performed to implement the required sequencing. These logical and control operations will be explained below with respect to the particular logical equations. However, at this point, the operations accomplished during each phase will be outlined.

During phase zero, a sector search is made for the next instruction word. Each phase of operation, of course, is controlled by the sequence control (U) register which takes a particular state designating phase zero upon the completion of phase three of the last instruction. The sector address of the next instruction is normally contained and the search made in bit positions $t_{13}$–$t_{19}$ of the instruction in the sector address (V) register. However, in the case of the unconditional transfer and idle instructions, the new instruction sector address is contained and the search is made in bits $t_1$–$t_7$ of the instruction in the V register. In all cases, the sector search is made by matching sequentially the sector bits in the V register against the sector bits of the sector address track until a matching indication is received. This is indicated by the sector search flip-flop FGS00 being true at bit time $t_{24}$ of a particular sector. The successful search indication causes the sequence control (U) register to change designation to that for phase one.

During phase one the next instruction is read from the selected position of memory into the V register. Phase one requires only a single word time for execution since it is only necessary to step the one information word from memory during drum rotation. The actual reading is accomplished by connecting the read head of the appropriate memory track to the read amplifier RGR01 or RGR02 and thence to flip-flop FGR00. During phase one, selected portions of the instruction word are also read into the various flip-flop registers. For example, the bits defining the particular operation are fed into the instruction register I which is then capable of actuating the logic for accomplishing that operation. It should be noted that the old track address remains in the track address register D during phase one.

During phase two, a sector search for the operand is performed. Also, during word time one of this phase, the new operand track address (with one exception) is shifted into the five flip-flop track address (D) register. Simultaneously, the old contents of the track address (D) register are read into the sector address (V) register in order to preserve the track address of the last instruction word. The exceptions to the exchange of the track address between the track address register and the V register occur when either an unconditional transfer or an idle instruction has been read into the instruction register. Since these instructions specify a new track address which is to replace the previous track address the old address is not saved.

The flip-flop FGK01 is set to define the first word time and is reset at $t_{24}$ of the first word time in order to show the accomplishment of the track address transfer. For the instructions which do not require an operand search (e.g., certain transfer instructions), phase two is automatically terminated at bit time $t_{24}$ of the first word time. It is also terminated at time $t_{24}$ of the first word for those instructions which have an arithmetic register as the operand address. For instructions which require a search of memory for a particular operand, the phase may last as long as one complete drum rotation.

During phase three, the instruction is executed. Where a word is to be read from memory, that word is so read; and the arithmetic operation is performed. In the case of instructions which may take place in a single word time, such as ADD, SUBTRACT, and so on, the arithmetic operation is performed as the operand is read from memory. For certain operations in which the results are to be replaced in a particular memory position, an extra word tme is required for the execution of phase three. The execution of phase three may also take an indeterminate number of word times for a particular shift operation since such operations vary in length depending on the number of shifts to be performed. The number of shifts performed in any operation is determined by counting down the contents of interval one of the instruction word contained in the V register. This count is under control of the sector search flip-flop FGS00 and is terminated upon FGS00 being true at bit time $t_{24}$ of phase three.

The multiply and divide instructions each take twenty-five word times. This count is determined by counting down the contents of interval two of the V register instruction word. As mentioned above, the proper constant for this count is read into the V register from the sector address track under command of the instruction (I) register during phase two. Phase three for the multiply and divide instructions is terminated when the count is designated by the sector search flip-flop FGS00 as true at bit time $t_{24}$ of a particular word time.

*Explanation of the logical equations describing the structure and operatian of GP 10*

Virtually all of the operations of the GP 10 have now been described with varying particularity. All of the above-described operations of the computer will now be reviewed in detail, both to clarify the nature of the operations performed and to disclose the electrical circuits and apparatus utilized in a preferred embodiment of this computer to mechanize these operations.

In the operations of the computer, as indicated in FIGURE 6, virtually all of the operations are carried on by successive changes in the states of the computer flip-flops. During each timing interval, the GP logic and gating matrix receives the above-described binary signals and responds to selectively produce "set" and "reset" signals which are applied to the corresponding inputs of the computer flip-flops to "set" and "reset" those flip-flops. The GP matrix also produces signals which are transferred from the GP 10 to control the operation of the DDA 30.

The GP matrix comprises a plurality of gating networks, each gating network receiving some of the signals applied to the gating matrix and combining those signals to form one of the output signals produced by the gating matrix. Each of the gating networks will ordinarily include a plurality of logical "AND" gates and "OR" gates arranged to combine applied signals in accordance with an associated Boolean logical equation to produce the desired output signal. As is well known in the art and has been explained above, the Boolean equations associated with a gating network fully define the output signals produced by the network in terms of the input signals received by the network and, in addition, supply a complete description of the structure of the gating network.

In the logical equations for the GP 10 which follow, there are first given all of the equations which define the input signals for operating the flip-flops followed by a number of composite auxiliary functions which are in general used in a number of instances throughout the logic for operating several flip-flops and are therefore amplified and "piped" to various parts of the particular section. These last-mentioned functions are often termed piped or auxiliary functions. All of the logic equations define and specifically point out a particular operative embodiment of the invention.

More particularly, in going through each of the equations for setting and resetting a flip-flop (designated by S or R following the particular component designation) each of the component signals represents a diode input from the particular designated component in the conducting condition, the conducting condition meaning that the particular condition is present. Each term of an equation represents a diode AND gate receiving inputs from the particular associated components. Each group of terms separated by (+) signs represents a diode OR gate receiving inputs from the diode AND gates of each particular term of that equation. An asterisk after any individual component or term signifies that the opposite of the true or one condition obtains for that component or term, i.e., false or off signals for that term. Thus, one embodiment of the system may be mechanized by substituting for the particular components the terms of the logic eqations the diode gating arrangements thereby defined and the flip-flops, pulse generators, and so on, for furnishing the signals for those terms.

Each entire equation is designated by a number; and individual terms of any particular equation are referred to as first, second, et cetera. For example, Equation 5 has three terms; PGA20 FGA24*—first term, PGA01 NGA24 NGP03—second term, and PGA00 FGA00 IGP10—third term.

LOGICAL EQUATIONS FOR GP

| | | | |
|---|---|---|---|
| FGA00S=PGA04 | FGA01 | | (1) |
| FGA00R=PGA04 | FGA01* | | (2) |
| FGA01S=PGA00 | RGA01 | | (3) |
| FGA01R=PGA00 | RGA01* | | (4) |
| FGA24S=PGA20 | FGA24* | | |
| +PGA01 | NGA24 | NGP03 | |
| +PGA00 | FGA00 | IGP10 | (5) |
| FGA24R=PGA20 | FGA24 | | |
| +PGA00 | IGA24 | NGP03 | |
| +PGA00 | FGA00* | IGP10 | (6) |

LOGICAL EQUATIONS FOR GP—Continued

| | | | | | | | |
|---|---|---|---|---|---|---|---|
| FGA25S=PGA04 | NGI21 | RGA01 | | | | | |
| +PGA00 | NGI42 | FGI02 | FGA01 | | | | |
| +PGA04 | NGI72 | FGI02* | FGA00 | NGT10 | | | |
| +PGAXX | NGI42 | FGI04* | FGI02* | FGA01 | | | (7) |
| FGA25R=PGA04 | NGI21 | RGA01* | | | | | |
| +PGA04 | NGI42 | FGA01* | | | | | |
| +PGA04 | NGI72 | FGI02* | FGA00* | | | | |
| +PGA04 | NGI72 | FGI02* | NGT00 | | | | |
| +PGA00 | NGI42 | FGI04 | FGI02* | | | | (8) |
| FGB00S=PGA00 | RGB00 | | | | | | (9) |
| FGB00R=PGA00 | RGB00 | | | | | | (10) |
| FGB24S=PGA01 | IGP10 | FGB00 | | | | | |
| +PGA01 | IGI63 | FGI03* | FGA00 | | | | |
| +PGA01 | IGI63 | FGI03 | NGR00 | | | | |
| +PGA01 | IGX05 | FGB00 | | | | | |
| +PGA20 | FGB24* | | | | | | (11) |
| FGB24R=PGA01 | IGP10 | FGB00* | | | | | |
| +PGA01 | IGI63 | FGI03* | FGA00* | | | | |
| +PGA01 | IGI63 | FGI03 | IGR00 | | | | |
| +PGA01 | IGX05 | FGB00* | | | | | |
| +PGA20 | FGB24 | | | | | | (12) |
| FGC00S=PGA04 | NGI42 | IGI80 | NGT10 | NGR00 | | | |
| +PGA04 | NGI21 | FGA01 | FGB00 | FGM00* | NGT10 | | |
| +PGA04 | NGI21 | FGA01* | FGB00 | FGM00 | NGT10 | | |
| +PGA04 | NGI76 | NGI81 | FGI03* | NGR00 | FGA00 | | |
| NGP03 | NGT10 | | | | | | |
| +PGA04 | NGI76 | NGI72 | NGR00 | FGA00* | NGP03 | NGT10 | |
| +PGA04 | NGI74 | NGI71 | FGI03* | IGR00 | NGP03 | NGT05 | |
| +PGA04 | NGI74 | NGI71 | FGI03 | NGR00 | FGA00* | NGP03 | |
| NGT10 | IGT09 | | | | | | |
| +PGA04 | NGI74 | NGI71 | FGI03 | FGA00 | IGR00 | NGT05 | |
| +PGA04 | NGI82 | FGD03 | FGA25 | FGB00 | NGT10 | | |
| +PGA04 | NGI82 | FGD03* | FGA25* | FGB00 | NGT10 | | (13) |
| FGC00R=PGA04 | NGI42 | FGI03* | IGR00 | FGA00* | | | |
| +PGA04 | NGI42 | FGI03 | IGR00 | FGA00 | | | |
| +PGA04 | NGI21 | FGB00* | FGM00* | FGA01* | | | |
| +PGA04 | NGI21 | FGB00* | FGM00 | FGA01 | | | |
| +PGA04 | NGI82 | FGD03 | FGB00* | FGA25* | | | |
| +PGA04 | NGI82 | FGD03* | FGB00* | FGA25 | | | |
| +PGA04 | NGI74 | NGI71 | FGI03 | IGR00 | FGA00 | | |
| NGP03 | IGT09 | | | | | | |
| +PGA04 | NGI74 | NGI71 | FGI03 | NGR00 | FGA00* | | |
| NGT05 | | | | | | | |
| +PGA04 | FGU02 | NGT00 | | | | | (14) |
| FGD01S=PGA04 | NGX03 | FGD02 | | | | | (15) |
| FGD01R=PGA04 | NGX03 | FGD02* | | | | | (16) |
| FGD02S=PGA02 | NGX03 | FGD03 | | | | | (17) |
| FGD02R=PGA02 | NGX03 | FGD03* | | | | | (18) |
| FGD03S=PGA02 | NGX03 | FGD04 | | | | | |
| +PDA02 | NGI82 | NGX26 | NGP03 | NGT05 | | | |
| +PGA02 | NGI21 | FGK01* | FGM00 | NGP03 | NGT00 | | (19) |
| FGD03R=PGA02 | NGX03 | FGD04* | | | | | |
| +PGA02 | NGI72 | NGX27 | NGP03 | NGT05 | | | |
| +PGA02 | NGI21 | FGK01* | FGM00* | NGP03 | NGT00 | | (20) |
| FGD04S=PGA02 | NGX03 | FGD05 | | | | | |
| +PGA02 | NGI82 | FGK01* | FGM00 | NGP03 | | | (21) |
| FGD04R=PGA02 | NGX03 | FGD05 | | | | | |
| +PGA02 | NGI82 | FGK01* | FGM00* | NGP03 | | | |
| +PGA00 | NGI72 | NGI75 | NGP03 | IGT09 | FGM00* | | (22) |
| FGD05S=PGA03 | NGX03 | FGV00 | | | | | (23) |
| FGD05R=PGA03 | NGX03 | FGV00* | | | | | (24) |
| FGI01S=PGA00 | IGX04 | FGI02 | | | | | (25) |
| FGI01R=PGA00 | IGX04 | FGI02* | | | | | (26) |

LOGICAL EQUATIONS FOR GP—Continued

| | | | | | | | |
|---|---|---|---|---|---|---|---|
| FGI02S=PGA00 | IGX04 | FGI03 | | | | | (27) |
| FGI02R=PGA00 | IGX04 | FGI03* | | | | | (28) |
| FGI03S=PGA00 | IGX04 | FGI04 | | | | | (29) |
| FGI03R=PGA00 | IGX04 | FGI04* | | | | | (30) |
| FGI04S=PGA00 | IGX04 | FGI05 | | | | | (31) |
| FGI04R=PGA00 | IGX04 | FGI05* | | | | | (32) |
| FGI05S=PGA00 | IGP01 | FGT02 | FGT01* | NGR00 | | | (33) |
| FGI05R=PGA00 | IGP01 | FGT02 | FGT01* | IRG00 | | | (34) |
| FGK01S=PGA01 | FGOU2* | FGU01 | | | | | |
| +PGA01 | IGI62 | FGU02 | FGU01 | FGS00 | NGT05 | | |
| +PGA01 | NGI43 | FGK01* | NGP03 | NGT05 | | | (35) |
| FGK01R=PGA01 | FGU02 | FGU01 | FGSS00* | NGT05 | | | |
| +PGA01 | NGI75 | NGI71 | NGP03 | NGT05 | | | |
| +PGA01 | NGP00 | NGT00 | | | | | (36) |
| FGK02S=PGA00 | FGT03 | FGT02* | FGY00 | FMC03 | FIK01 | | |
| +PGA00 | NGI76 | NGI84 | FGI03 | NGP00 | SMP09 | | (37) |
| FGK02R=PGA00 | NGI76 | NGI84 | FGI03 | NGP03 | | | |
| +PGA00 | FIK01* | | | | | | |
| +PGA00 | NGP03 | FMC03* | | | | | (38) |
| FGM00S=PGA03 | IGI61 | FGM01 | | | | | |
| +PGA03 | NGI21 | FGK01* | FGM01 | NGP03 | NGT00 | | |
| +PGA02 | NGI82 | NGX24 | NGP03 | NGT05 | | | |
| +PIA00 | NGI82 | FGM01 | NGP03 | IGT09 | | | (39) |
| FGM00R=PGA03 | IGI61 | FGM01* | | | | | |
| +PGA03 | NGI21 | FGK01* | FGM01* | NGP03 | NGT00 | | |
| +PGA03 | NGI21 | FGT03 | FGT02 | FGK01 | | | |
| +PGA02 | NGI82 | NGX24 | NGP03 | NGI05 | | | (40) |
| +PGI00 | NGI82 | FGM01* | NGP03 | IGT09 | | | |
| FGM01S=PXAXX | RGM01 | | | | | | (41) |
| FGM01R=PXAXX | RGM01* | | | | | | (42) |
| FGM24S=PGA03 | NGM24 | | | | | | |
| +PGA20 | FGM24* | | | | | | (43) |
| FGM24R=PGA03 | IGM24 | | | | | | |
| +PGA20 | FGM24 | | | | | | (44) |
| FGR00S=PGA00 | FGD05* | RGR01 | | | | | |
| +PGA00 | FGD05 | RGR02 | | | | | (45) |
| FGR00R=PGA00 | FGD05 | RGR02* | | | | | |
| +PGA00 | FGD05* | RGR01* | | | | | (46) |
| FGS00S=PGA03 | NGP00 | NGT00 | | | | | |
| +PGA03 | FGU02 | FGU01 | NGT00 | | | | |
| +PGA03 | NGP03 | FGT03 | FGT02* | | | | (47) |
| FGS00R=PGA03 | IGI87 | IGX22 | NGP00 | FGT03* | FGT02 | FGT01 | |
| +PGA03 | NGI71 | FGI02* | FGI01* | FGV00 | NGP03 | FGT03* | |
| FGT02* | FGT01* | | | | | | |
| +PGA03 | IGX22 | FGU02 | FGU01 | FGT03* | FTG02* | FGT01* | |
| +PGA03 | NGI76 | FGI04 | FGI03 | IGX22 | NGP00 | FGT03* | |
| FGT02* | FGT01* | | | | | | |
| +PGA03 | NGI75 | NGI71 | FGV00 | NGP03 | FGT02 | FGT01* | (48) |
| FGT01S=PGA02 | RGT00 | FGT02* | FGT01* | | | | |
| +PGA02 | FGY00* | NGT05 | FGT01* | | | | (49) |
| FGT01R=PGA00 | RGT00 | FGT02 | FGT01 | | | | (50) |
| FGT02S=PGA00 | RGT00* | FGT02* | FGT01 | | | | (51) |
| FGT02R=PGA02 | FGY00 | FGT03 | | | | | (52) |
| FGT03S=PGA00 | RGT00* | FGT03* | FGT02 | FGT01* | | | (53) |
| FGT03R=PGA02 | FGT03 | FGT02* | | | | | (54) |

LOGICAL EQUATIONS FOR GP—Continued

| | | | | | | | |
|---|---|---|---|---|---|---|---|
| FGU01S=PGA03 | FGI05 | FG104* | FGI02 | FGK02 | FGC00 | NGP00 | |
| NGT05 | | | | | | | |
| +PGA03 | FGK02 | FGS00 | NGP00 | NGT05 | | | |
| +PGA02 | FMC02 | NGP00 | NGT05 | | | | (55) |
| FGU01R=PGA03 | IGI67 | FGS00 | FGU02 | FGU01 | NGT05 | | |
| +PGA03 | NGI84 | NGI77 | FGI03 | FGY00 | FGU02 | FGU01 | |
| NGT00 | | | | | | | |
| +PGA03 | NGI77 | NGI71 | FGU02 | FGU01 | NGT05 | | |
| +PGA03 | FGD05* | NGD10 | FGD02* | FGU02 | FGU01 | NGT05 | |
| +PGA03 | FGD05* | NGD10 | FGD01* | FGU02 | FGU01 | NGT05 | |
| +PIA00 | NGI76 | FGI04 | FGI03* | FGU02 | FGU01 | NGT05 | (56) |
| FGU02S=PGA04 | IGP01 | NGT05 | | | | | (57) |
| FGU02R=PGA03 | IGI64 | NGP03 | NGT05 | | | | |
| +PGA03 | NGI75 | FGI05 | FGI04* | FGS00 | FGV00* | NGP03 | |
| NGT05 | | | | | | | |
| +PGA03 | NGI77 | NGI71 | FGS00 | FGU02 | FGU01* | NGT05 | |
| +PGA03 | NGI43 | FGK01 | NGP03 | NGT05 | | | |
| +PGA03 | NGI84 | NGI77 | FGI03* | FGY00 | NGP03 | NGT00 | (58) |
| FGV00S=PXX00 | RGV00 | | | | | | (59) |
| FGV00R=PXX00 | RGV00* | | | | | | (60) |
| FGV24S=PGA01 | FIK01* | FGT03* | FGT02* | FGT01 | | | |
| +PGA20 | FGV24* | | | | | | |
| +PGA01 | IGV94 | FIK01 | | | | | (61) |
| FGV24R=PGA20 | FGV24 | | | | | | |
| +PGA01 | IGV24 | FIK01 | | | | | |
| +PGA01 | IGV12 | FIK01* | | | | | (62) |
| FGW00S=PGA01 | NGW00 | | | | | | |
| +PGA20 | FGW00* | | | | | | (63) |
| FGW00R=PGA01 | IGW01 | | | | | | |
| +PGA20 | FGW00 | | | | | | (64) |
| FGY00=PGA01 | RGY00 | | | | | | (65) |
| GGA06C=IGD14 | | | | | | | (66) |
| GGA07C=NGD11 | NGD03 | | | | | | (67) |
| GGA10C=NGD12 | NGD00 | | | | | | (68) |
| GGA11C=NGD12 | NGD01 | | | | | | (69) |
| GGA12C=NGD12 | NGD02 | | | | | | (70) |
| GGA13C=NGD12 | NGD03 | | | | | | (71) |
| GGA14C=NGD13 | NGD00 | | | | | | (72) |
| GGA15C=NGD13 | NGD01 | | | | | | (73) |
| GGA16C=NGD13 | NGD02 | | | | | | (74) |
| GGA17C=NGD13 | NGD03 | | | | | | (75) |
| GGB20C=NGD10 | NGD00 | | | | | | (76) |
| GGB21C=NGD10 | NGD01 | | | | | | (77) |
| GGB22C=NGD10 | NGD02 | | | | | | (78) |
| GGB23C=NGD10 | NGD03 | | | | | | (79) |
| GGB24C=NGD11 | NGD00 | | | | | | (80) |
| GGB25C=NGD11 | NGD01 | | | | | | (81) |
| GGB26B=NGD11 | NGD02 | | | | | | (82) |
| GGB27C=NGD11 | NGD03 | | | | | | (83) |
| GGB30C=NGD12 | NGD00 | | | | | | (84) |
| GGB31C=NGD12 | NGD01 | | | | | | (85) |

LOGICAL EQUATIONS FOR GP—Continued

```
GGB32C=NGD12     NGD02                                              (86)

GGB33C=NGD12     NGD03                                              (87)

GGB34C=NGD13     NGD00                                              (88)

GGB35C=NGD13     NGD01                                              (89)

GGB36C=NGD13     NGD02                                              (90)

GGB37C=NGD13     NGD03                                              (91)

IGA24I=NGA24                                                        (92)

NGA24I=NGX21   NGX20   FGA25*  FGC00*
      +NGX21   IGX20   FGA25*  FGC00
      +NGX21   IGX20   FGA25   FGC00*
      +NGX21   NGX20   FGA25   FGC00
      +NGI43   FGI04   FGA00   FGK01   NGT10
      +NGI21   NGI81   FGA01   FGK01*  FGD03   FGM00
      +NGI21   NGI81   FGA01   FGK01*  FGD03*  FGM00*
      +NGI82   FGA00   FGK01   NGT10
      +NGI74   FGI05   FGI04   FGI03*  FGM00   NGT10
      +NG175   FG105   FG104   FGI03*  FGB00   NGT10
      +NGI77   NGI71   FGI03*  FGA01   NGT10
      +NGI77   NGI71   FGI03   FGA25   NGT10
      +NGI81   NGI76   FGI03*  FGA00   NGR00
      +NGI81   NGI76   FGI03   FGA00*  NGR00
      +NGI32   FIV00   NGT10
      +NGI47   FGA00
      +FGA24*  NTG00                                                (93)

IGD14I=FGD04
      +FGD03   FGD02   FGD01                                        (94)

NGD00I=FGD02*  FGD01*                                               (95)

NGD01I=FGD02*  FGD01                                                (96)

NGD02I=FGD02   FGD01*                                               (97)

NGD03I=FGD02   FGD01                                                (98)

NGD10I=FGD04*  FGD03*                                               (99)

NGD11I=FGD04*  FGD03                                               (100)

NGD12I=FGD04   FGD03*                                              (101)

NGD13I=FGD04   FGD03                                               (102)

NGI12I=NGI84   NGI76   FGI03*                                      (103)

NGI21I=NGI71   FGI03*  NGI75                                       (104)

NGI32I=FGI05   FGI04   FGI03*  NGI76                               (105)

NGI42I=FGI01   NGI84
      +FGI05*  NGI75                                               (106)

NGI43I=FGI05*  FGI04   NGI74
      +FGI05*  FGI03*  NGI74                                       (107)

NGI47I=FGI05*  FGI04*
      +FGI05   FGI04   FGI03
      +FGI04*  FGI02   FGI01                                       (108)

NGI52I=NGI74   FGI05*  FGD05*  FGD04   FGK01
      +FGI05*  FGI04*  FGI02   FGD05*  FGD04   FGK01               (109)

IGI60I=NGI71   FGI02*                                              (110)

IGI61I=NGI21   NGP03
      +NGI82   NGP03                                               (111)

IGI62I=NGI84   FGI02   FGI01                                       (112)

IGI63I=IGP10
      +FGK01*
      +FGI02
      +FGI05*
      +FGI01*                                                      (113)
```

LOGICAL EQUATIONS FOR GP—Continued

```
IGI64I=FGI05*   FGI04    FGI03*   FGI02*   FGI01*
      +FGI05*   FGI04    FGI02    FGI01
      +FGI05    FGI04*   FGI02*                                (114)

IGI66I=FGI05*   FGI04*   FGI02                                 (115)

IGI67I=NGI84    FGI03*   NGI77                                 (116)

NGI71I=FGI05    FGI04*                                         (117)

NGI72I=FGI05    FGI04*   FGI03                                 (118)

NGI74I=FGI02    FGI01                                          (119)

NGI75I=FGI02*   FGI01                                          (120)

NGI76I=FGI02    FGI01*                                         (121)

NGI77I=FGI02*   FGI01*                                         (122)

IGI80I=FGI03    FGA25
      +FGI03*   FGA25*                                         (123)

NGI81I=NGI71    FGU02    FGU01*   NGT10                        (124)

NGI82I=NGI72    FGI02*   FGI01                                 (125)

NGI84I=FGI05*   FGI04                                          (126)

IGI85I=FGU02*
      +FGU01
      +FGA00*                                                  (127)

IGI87I=FGI04    FGI03    NGI76                                 (128)

IGI88I=NGI75    NGI71
      +NGI74    FGI05    FGI04                                 (129)

IGI89I=NGI84    NGI76    FGI03                                 (130)

IGM24I=NGM24                                                   (131)

NGM24I=IGI88    FGM00
      +NGI74    FGI05    FGI04    FGI03    NGR00    NGP03
      +NGI74    FGI05    FGI04    FGI03*   IGI85
      +NGI21    NGR00    NGP03    FGK01
      +NGI21    IGI85    FGK01*   FGT03    FGT02*
      +NGI21    FGM01    NGP03    FGK01*   NGT10
      +NGI82    FGD04    NGP03    FGK01*
      +FGM00    IGP10                                          (132)

NGP00I=FGU02*   FGU01*                                         (133)

IGP01I=FGU02
      +FGU01*                                                  (134)

NGP03I=FGU02    FGU01*                                         (135)

IGP10I=FGU02    FGU01*                                         (136)

IGR00I=NGR00                                                   (137)

NGR00I=NGD10    NGD00    FGD05*   FGA00
      +NGD10    NGD01    FGD05*   FGB00
      +NGD10    NGD02    FGD05*   FGM00
      +NGD11    NGD00    FGD05*   FDY01
      +NGD11    NGD01    FGD05*   FDP06
      +FGD05    FGR00
      +FGD04    FGR00                                          (138)

NGT00I=FGT03    FGT02*                                         (139)

NGT01I=FGT03*   FGT02*                                         (139a)

NGT05I=FGT03    FGT02                                          (140)

NGT06I=NGT00    FGY00                                          (141)

IGT09I=FGT03    FGT02    FGT01*                                (142)

NGT10I=FGT03*
      +FGT02                                                   (143
```

LOGICAL EQUATIONS FOR GP—Continued

| | | | | | | | |
|---|---|---|---|---|---|---|---|
| IGT12I=FGT03* | FGT02* | FGT01 | | | | | (144) |
| IGV24I=FGT01 | IGI87 | FGD01 | FGU02 | FGU01 | FGK01 | FGT03* | |
| FGT02* | | | | | | | |
| +FGV00 | NGP00 | | | | | | |
| +IGP01 | NGR00 | | | | | | |
| +IGT12 | FGU02 | FGU01 | FGV00 | FGK01 | | | |
| +FGU02 | FGU01 | FGV00 | FGK01* | | | | |
| +NGI76 | FGI04 | FGI03 | FGU02 | FGU01 | FGV00 | | |
| +IGI60 | FGV00 | NGP03 | | | | | |
| +NGI71 | NGI75 | IGX23 | FGK01* | NGP03 | FGT02 | FGT01* | |
| +NGI71 | FGI02* | FGI01* | IGX23 | NGP03 | FGT03* | FGT02* | |
| +NGI71 | FGI02* | FGV00 | NGP03 | FGT03* | FGT01 | | |
| +NGI71 | NGI75 | FGY00 | NGP03 | FGK01 | FGT02 | FGT01* | (145) |
| IGV94I=IGV24 | | | | | | | (146) |
| NGW00I=NGI43 | FGA00 | | | | | | |
| +NGI74 | FGI05* | FGI04* | FGI03 | FGB00 | | | |
| +NGI76 | FGI05* | FGI04* | FGI03 | FGM00 | | | (147) |
| IGW01I=NGW00 | | | | | | | (148) |
| IGW11I=NGX06 | NGD00 | FGW00* | | | | | (149) |
| IGW12I=NGX06 | NGD01 | FGW00* | | | | | (150) |
| IGW13I=NGX06 | NGD02 | FGW00* | | | | | (151) |
| IGW14I=NGX06 | NGD03 | FGW00* | | | | | (152) |
| IGW91I=NGX06 | NGD00 | FGW00 | | | | | (153) |
| IGW92I=NGX06 | NGD01 | FGW00 | | | | | (154) |
| IGW93I=NGX06 | NGD02 | FGW00 | | | | | (155) |
| IGW94I=NGX06 | NGD03 | FGW00 | | | | | (156) |
| NGX03I=NGP00 | FGT03* | FGT02* | FGT01 | | | | |
| +FGK01 | FGT03* | FGT02* | FGT01 | FGU02 | FGU01 | | (157) |
| IGX04I=FGU01* | | | | | | | |
| +FGU02 | | | | | | | |
| +FGT01 | | | | | | | |
| +FGT02* | | | | | | | (158) |
| IGX05I=FGI05 | FGI04 | FGI02* | FGI01 | | | | |
| +FGI05 | FGI02* | FGI01 | FGK01 | | | | |
| +IGP10 | | | | | | | (159) |
| NGX06I=NGI52 | FGD03* | NGP03 | NGT10 | | | | |
| +NGI52 | FGD03* | NGP00 | NGT00 | | | | (160) |
| IGX20I=NGX20 | | | | | | | (161) |
| NGX20I=NGI42 | NGR00 | | | | | | |
| +NGI75 | NGI71 | FGB00 | NGP03 | | | | (162) |
| NGX21I=NGI21 | FGD03 | FGK01* | FGM00* | | | | |
| +NGI21 | FGD03* | FGK01* | FGM00 | | | | |
| +NGI42 | | | | | | | |
| +NGI82 | FGK01* | | | | | | (163) |
| IGX22I=FGY00* | FGV00* | | | | | | |
| +FGY00 | FGV00 | | | | | | (164) |
| IGX23I=FGS00* | FGV00* | | | | | | |
| +FGS00 | FGV00 | | | | | | (165) |
| NGX24I=FGA00* | NGR00 | FGK01 | | | | | |
| +FGA00 | IGR00 | FGK01 | | | | | |
| +FGA00 | FGB00 | FGK01* | | | | | |
| +FGA00* | FGB00* | FGK01* | | | | | (166) |
| NGX25I=FGA00 | NGR00 | FGK01 | | | | | |
| +FGA00* | IGR00 | FGK01 | | | | | |
| +FGA00* | FGB00 | FGK01* | | | | | |
| +FGA00 | FGB00* | FGK01* | | | | | (167) |

LOGICAL EQUATIONS FOR GP—Continued

```
NGX26I=FGA00*   NGR00    FGK01
      +FGA00    IGR00    FGK01
      +FGA00*   FGB00    FGK01*
      +FGA00    FGB00*   FGK01*              (168)

NGX27I=FGA00    NGR00    FGK01
      +FGA00*   IGR00    FGK01
      +FGA00    FGB00    FGK01*
      +FGA00*   FGB00*   FGK01*              (169)

PGA01I=PXX00                                 (170)

PGA02I=PXX00                                 (171)

PGA03I=PXX00                                 (172)

PGA04I=PXX00                                 (173)
```

*General description of terms of the logical equations*

Before considering the significance of the various terms in the foregoing equations, the manner in which these terms specify in detail the mechanization of the logical gating matrix illustrated in FIGURE 6 will be investigated. For purposes of simplicity and clarity, the mechanization of the logical gating networks which supply the input signals to the flip-flop FGA24 will be described with particularity with reference to Equations 5 and 6. Once the gating techniques are thoroughly understood, the mechanization of the remaining logical equations will be readily apparent to those skilled in the art. As will be apparent the gating networks shown in FIGURE 10 are respectively mechanized in strict accordance with the logical Equations 5 and 6.

FIGURE 10 shows the logical gating networks which comprises the input functions of flip-flop FGA24 for placing that flip-flop in the "set and reset" conditions. The networks comprise a plurality of logical "AND" and "OR" gates, each logical AND gate being represented by a closed semi-circle with a dot (·) in its center and each logical OR gate being represented by a closed semicircle with a plus sign (+) in its center. There are known to those skilled in the art any number of methods of mechanizing such gates. However, in the disclosed embodiment, conventional diode gating circuits are preferred and shown.

Briefly stated, an AND gate includes two or more input terminals and a single output terminal. Such a gate is responsive to the voltage levels of the two-level signals applied to its input terminals for producing a one-level output signal at its output terminal only when all of the input signals are at their one-level values. Each OR gate, on the other hand, includes two or more input terminals and is responsive to voltage level signals applied to its input terminals for producing a one-level output signal at its output terminal whenever one or more of the input signals is at its one-level value. AND and OR gates mechanized by diode circuitry are shown in FIGURE 10, specifically AND gate 86 and OR gate 82. In FIGURE 10, a negative signal is considered a one-valued signal; a ground-level signal, a zero-valued signal.

It should be pointed out that each AND gate which is coupled to the input terminals of a flip-flop has, in general, a terminal which receives a periodically recurring clock pulse signal (designated as PG___) that effectively divides real time into clock pulse intervals. Each clock pulse signal, by definition, presents a pulse once per digit time interval. If the clock pulse is normally at a voltage corresponding to the zero level voltage of the voltage-level signals produced at the output circuits of the flip-flops and if each clock pulse results in a brief negative excursion of the clock pulse signal to the one level voltage of the voltage-level signals applied to the gates, it will be recognized that an applied signal will be passed by a clock pulse AND gate to its associated flip-flop input terminal only when a clock pulse is received and when the voltage-levels of any other signals applied to the gate are at their one level values.

Referring now with particularity to FIGURE 10, there is shown a logic arrangement for the Equations 5 and 6, which define the input signals to the flip-flop FGA24. The equations are mechanized by a pair of three input terminal OR gates 81 and 82, each fed by diode inputs from three clock pulse AND gates 83–88. The gates 83–88 receive signals from a plurality of sources, each designated for convenience by a block but actually representing a signal in accordance with the above-described nomenclature. One terminal of each of these AND gates is connected to a clock pulse source, e.g., PGA00. The clock pulse sources may be connected to a bus (not shown) which receives its signal train via the logic matrix from the master clock pulse generator PXX00 (see Equations 170–173).

The other input terminal to AND gate 83 is connected to the reset condition output conductor FGA24* (the connection is shown by dotted lines) whereas the other input terminal of AND gate 86 is connected to the set condition output conductor FGA24 of the flip-flop FGA24. The other AND gates receive the indicated input signals in operation. As one example of operation, if flip-flop FGA24 is in the set condition and a clock pulse is received on lead PGA20, the flip-flop FGA24 will be placed in the reset state whereas if the flip-flop FGA24 is in the reset state and a clock pulse is received on the lead PGA20, the flip-flop FGA24 will be placed in the set condition.

The gates 82 and 86 have been completely illustrated as they might be mechanized by diode gating circuitry in order to more completely define an operative embodiment.

It is apparent from the preceding discussion that logical Equations 5 and 6 thus completely specify the structure of the corresponding gating networks which supply input signals to the flip-flop FGA24. That is, each equation specifies the number of "AND" and "OR" gates which are to be included in the gating network, the number of inputs to each corresponding gate, and the interconnection between the gates. Similar discussions of the manner in which Boolean logical equations may be mechanized by corresponding gating networks have appeared in a variety of prior art publications, as for example in an article entitled "An Algebraic Theory for Use in Digital Computer Design," by E. C. Nelson, Transactions of the IRE Professional Group on Electronic Computers, September 1954, pp. 12 through 21. Accordingly, for the purpose of facilitating complete understanding of the structure and operation of the present invention, the remainder of this specification will be largely devoted to the derivation of the logical equations which describe the operation and which specify the structure of the corresponding gating networks which together comprise the logic and gating matrix, there being one logical equation and corresponding gating network for each of the output signals produced by the matrix.

*Sequencing*

In all of the following discussion, reference should be made to FIGURE 4 of the system. As outlined above, the GP 10 sequences through four phases of operation in executing any particular function. The machine searches for a next instruction during phase zero, reads the next instruction during phase one, searches for the operand specified in the instruction word during phase two, and, finally, reads the operand and performs the arithmetic operation during phase three. Each of these phases is controlled by the condition of the sequence control register comprising the flip-flops FGU01 and FGU02. Table II, supra, illustrates the condition of the two flip-flops during each of these phases. As is illustrated, phase zero is initiated by a false state of each of the two flip-flops; phase one, by a false state in FGU02 only; phase three, by true states in both flip-flops; and phase three, by a false state in FGU01 only. The operations which are accomplished during each phase will now be more particularly discussed with reference to the logical equations.

Before investigating the phasing operations, the interval and sector designations must be clearly understood. As pointed out above and as more particularly shown in FIGURE 8, each sector or word position around the periphery of the drum has a particular designation defined by the binary coding contained in bit positions $t_1$–$t_7$ of the sector address track. Furthermore, each sector is divided into a number of intervals so that particular operations may be accomplished upon and in response to each instruction contained in the sector address (V) register depending upon the position of the bits within a particular word. The intervals are defined by the coding contained on the interval track. The interval track has identical coding for each word around the periphery of the drum so that all sectors have the same divisions. The contents of the interval track are read into the interval (T) register including the flip-flops FGT01–FGT03 via the read amplifier RGT00. The condition of the interval (T) register designates, as defined in Equations 49–54, the particular time interval of operation for any particular word. The particular conditions and the intervals defined thereby are given in the following table:

TABLE V

| | Flip-Flop Conditions | | |
|---|---|---|---|
| | FGT03 | FGT02 | FGT01 |
| Interval: | | | |
| $I_0$ | 1 | 0 | 0 |
| $I_1$ | 0 | 0 | 0 |
| $I_2$ | 0 | 0 | 1 |
| $I_3$ | 0 | 1 | 1 |
| $I_4$ | 0 | 1 | 0 |
| $I_5$ | 1 | 1 | 0 |

PHASE ZERO

Phase zero, as just mentioned, is initiated when both flip-flops FGU01 and FGU02 of the sequence control register are placed in the false state. Upon starting the machine from an off condition, these false states may be set into the sequence control register by sequencing through phase three to arrive at their proper register state, as defined by the third term of Equation 55. The particular states of the sequence control register are thereafter defined by Equations 55–58.

Upon starting the machine, the sector address (V) register is set to read a particular instruction address in the bit positions $t_{13}$–$t_{19}$. This is accomplished by the logic of term one of Equation 61 for flip-flop FGV24. The signal FIK01* is a start signal generated by the control console on closing the start switch. The signals FGT03*, FGT02*, and FGT01 designate the track address interval. This term causes a series of ones to be written as the track address. Term three of Equation 62 in like manner causes all other bit positions to receive a zero on start up so that a complete initial instruction address is automatically designated.

The track address (D) register which includes the five flip-flops FGD01–FGD05 is also furnished the same instruction address indication as that placed in the sector address register V. This is due to signal NGX03 of each of Equations 15–24 which causes the V register track address to be written into the D register (see also Equation 157). Thus, initially, the GP 10 is provided with the particular track on which the instruction search is to commence.

After these items have been generated in the machine, the drum (assuming such a particular embodiment) rotation operation continues; and the instruction address in the sector address (V) register is recirculated via the flip-flops FGV00 and FGV24 (as defined by Equations 59–62) until the instruction address read from the V register and that of the sector address track correspond as determined by the flip-flop FGS00. This instruction sector search of phase zero is completed and phase one is entered upon the flip-flop FGS00 being true at bit time $t_{24}$ of a particular word, indicating that all bit times during the interval of the particular word correspond. This causes the flip-flop FGU01 to be set and phase one to be initiated in accordance with term two of Equation 55.

The particular manner by which the sector search flip-flop FGS00 accomplishes the matching of the instruction address contained in the sector address (V) register with the sector bits of the sector address track is of interest. As shown by term one of Equation 47, the sector search flip-flop FGS00 is set upon entering each new word sector, the signal NGT00 defining each new word. The bits defining the sectors of the instruction and the Y track are then received coincidentally by the AND gates defined by the signal IGX22 in terms one and four of Equation 48. The AND gates provide an output for resetting the flip-flop FGS00 when the counts differ, as is more particularly described in Equation 164. Thus, only if the instruction sector bits compare exactly with the bits contained in the sector address track does the flip-flop FGS00 remain in the true condition at bit time $t_{24}$ and provide a signal for transferring the sequence control (U) register into phase one.

PHASE ONE

Upon the completion of the instruction sector search above-outlined, the flip-flop FGU01 is set in accordance with term two of Equation 55 thereby changing the condition of the sequence control (U) register to that defining phase one. The instruction is then read out of the particular memory position and into the sector address (V) register. During interval four of the single word time of phase one, the instruction bits of the instruction word are transferred sequentially into the instruction (I) register as well as into the sector address (V) register. However, it should be noted that the track address bits of the instruction word are not transferred to the track address (D) register during this phase since the D register controls the memory track which is addressed. The shift operation into the I register is defined by Equations 25–34, especially Equations 33 and 34. Equations 61 and 62, terms three and two, respectively, define the input signals directed to the sector address register write flip-flop FGV24.

Phase one takes but a single word time since all that is required is that an instruction of twenty-five bits be read out of memory into the particular registers. The operation of the flip-flop FGR00 to accomplish the reading of the instruction from memory is more particularly defined by Equations 45 and 46. It should be noted that flip-flop FGR00 receives input signals from two amplifiers, RGR01 and RGR02. A particular gate must be energized (Equations 66–91) to select a particular memory track.

Upon the completion of phase one at bit time $t_{24}$ as signified by the flip-flop FGU02 being set (Equation 57), phase two is entered.

PHASE TWO

During phase two, a sector search for the operand specified in the instruction is performed. The addresses of the various tracks and registers are shown in the Table VI. It should be noted that the various decode signals there shown operate switches to connect the selected memory tracks (Equations 66–91).

TABLE VI

| Track or Register | Binary | Address | Decode | Signal |
|---|---|---|---|---|
| A-Register | 00000 | NGD10 | NGD00 | FGD05* |
| B-Register | 00001 | NGD10 | NGD01 | FGD05* |
| M-Register | 00010 | NGD10 | NGD02 | FGD05* |
| I/0 Track | 00011 | NGD10 | NGD03 | FGD05* |
| DDA Y-Register | 00100 | NGD11 | NGD00 | FGD05* |
| Initial Condition Track | 00101 | NGD11 | NGD01 | FGD05* |
| Modifiable Track 1 | 01000 | NGD12 | NGD00 | |
| Modifiable Track 2 | 01001 | NGD12 | NGD01 | |
| Modifiable Track 3 | 01010 | NGD12 | NGD02 | |
| Modifiable Track 4 | 01011 | NGD12 | NGD03 | |
| Permanent Track 1 | 01100 | NGD13 | NGD00 | |
| Permanent Track 2 | 01101 | NGD13 | NGD01 | |
| Permanent Track 3 | 01110 | NGD13 | NGD02 | |
| Permanent Track 4 | 01111 | NGD13 | NGD03 | |
| Permanent Track 5 | 10000 | NGD14 | NGD00 | |
| Permanent Track 6 | 10001 | NGD14 | NGD01 | |
| Permanent Track 7 | 10010 | NGD14 | NGD02 | |
| Permanent Track 8 | 10011 | NGD14 | NGD03 | |
| Permanent Track 9 | 10100 | NGD15 | NGD00 | |
| Permanent Track 10 | 10101 | NGD15 | NGD01 | |
| Permanent Track 11 | 10110 | NGD15 | NGD02 | |
| Permanent Track 12 | 10111 | NGD15 | NGD03 | |
| Permanent Track 13 | 11000 | NGD16 | NGD00 | |
| Permanent Track 14 | 11001 | NGD16 | NGD01 | |
| Permanent Track 15 | 11010 | NGD16 | NGD02 | |
| Permanent Track 16 | 11011 | NGD16 | NGD03 | |
| Permanent Track 17 | 11100 | NGD17 | NGD00 | |
| Permanent Track 18 | 11101 | NGD17 | NGD01 | |
| Permanent Track 19 | 11110 | NGD17 | NGD02 | |
| Permanent Track 20 | 11111 | NGD17 | NGD03 | |
| Permanent Track 21 | 00110 | IGD14 | | |
| Permanent Track 22 | 00111 | NGD11 | NGD03 | |

The operand search is accomplished by comparing the bits defining the operand address contained in the operand sector address bit positions of the sector address (V) register with those occurring in like bit positions of each sector of the sector address (Y) track. This search and comparison operation occurs during interval $I_1$ of each particular sector address track. The particular operation is controlled by term two of Equation 47 and term of Equations 145 and 146 which provide for the sector search flip-flop FGS00. As may be seen, the flip-flop FGS00 is set on entering each sector (term two of Equation 47) and reset by any failure of correspondence signified by the comparison input signal IGX22 of term three, Equation 48. Thus, only a complete correspondence of all bits allows flip-flop FGS00 to be true at bit time $t_{24}$.

During phase two, the operand track address is shifted into the track address (D) register, as defined by Equations 15–24, especially Equations 23 and 24. Simultaneously, the contents of the D register are read into the track address bit positions $t_8$–$t_{12}$ of the V register to preserve the track address of the last instruction word so that the next instruction search may be accomplished on the same track. This operation is defined by the first term of Equations 145 and 146 which provide for the true and false input signals IGV94 and IGV24 for the operation of the V register write flip-flop FGV24 during this interval of phase two.

It should be particularly noted that the track address recordation and shifting operation is performed with the flip-flop FGK01 defining the first word time of the phase during which the function is accomplished. The true condition of the flip-flop FGK01 is contained in the NGX03 signal defined in Equation 157 which appears in each of Equations 15–24. The flip-flop FGK01 is true upon entering phase two and is reset at bit time $t_{24}$ of the first word time to accomplish the one-word definition. This function is more particularly shown by the first terms of each of Equations 35 and 36, respectively, defining the operation of the flip-flop FGK01.

As pointed out above, there are two exceptions to the exchange of the operand track address between the track address (D) register and the sector address (V) register. These exceptions—defined by term six of Equation 145—occur when an UNCONDITIONAL TRANSFER or an IDLE instruction has been read into the instruction (I) register during phase one. Since each of these instructions specifies a new track address which is to replace the previous track address, the old address need not be preserved so the shift circuitry for the transfer is not energized.

Certain instructions do not require an operand search; for example, the shift instructions, the exchange-between-register instructions, and so on require no operand search. For these instructions, phase two is terminated automatically at bit time $t_{24}$ of the first word. The same phase termination operation is accomplished for those instructions which have an arithmetic register, such as the A, B, or M register, as the operand address. The condition is detected by sampling the track address (D) register for the track address. If the address is an arithmetic register than the phase is automatically terminated. These operations are better defined by terms three through six of Equation 56 which concerns the operation of the flip-flop FGU01 of the sequence control (U) register. For example, term three contains the logic for terminating phase two for shift operations, terms four and five for register exchange and register operand operations.

The normal termination of phase two and the entry to phase three occurs when the sector search flip-flop FGS00 is true at bit time $t_{24}$ of a particular word sector resetting the flip-flop FGU01 to indicate a successful sector search. This operation is defined by term one of Equation 56.

It should be noted that for most of the operations which may be performed by the GP 10, the completion of the operand search leaves the track address register D free for use in executing control functions. This is especially important (as will be apparent) in controlling the DDA 30.

PHASE THREE

During phase three, all of the arithmetic operations are performed. Phase three varies in length depending upon the operation performed. For all instructions other than MULTIPLY, DIVIDE, SHIFT-A-RIGHT, SHIFT-A-LEFT, ADD-REPLACE, and SUBTRACT-REPLACE, phase three lasts for a single word time. For the one word instructions and the ADD-REPLACE and SUBTRACT-REPLACE instructions the arithmetic operation is performed as the operand is read from its memory location. Phase three terminates for one-word-time operations on the reset of flip-flop FGU02 as defined by term one of Equation 58. The signal IGI64 of Equation 58 is an auxiliary function which is present in all of the one-word time operations (Equation 114). The ADD-REPLACE and SUBTRACT-REPLACE functions require an extra word time (controlled by term four of Equation 58) to place the results of the arithmetic operation back in the memory location of the modifiable memory tracks so the resetting of the flip-flop FGU02 is delayed by one word time.

The Shift-A-Right and Shift-A-Left instructions are variable in length depending upon the number of shifts to be performed. The number of shifts performed is determined by counting down the contents of the V register contained in the interval one positions. The number is programmed into this interval for the particular instruction. Term two of Equation 48 defines the resetting of flip-flop FGS00 during each word of the shift count prior to completion to accomplish the subtract-one-from-count operation. The count is accomplished by complementing all bits of the number through the first one bit on each transfer through the flip-flop FGS00 to effectively subtract one on each transfer. The complement is provided by Equation 165 for signal IGX23 which appears at the V register input amplifier (term nine of Equation 145). Phase three is terminated when a zero count results in flip-flop FGS00 being true at a bit time $t_{24}$ of phase three.

The multiply and divide instructions each take twenty-five word times, one for placing the numbers in the proper registers and twenty-four for the actual arithmetic operations. The period is determined by counting down by one during each word time the bits recorded in interval four positions of the V register during the multiply and divide execution via the logic directed to the FGS00 flip-flop. The count is defined by term three of Equation 47 which controls setting flip-flop FGS00 at the beginning of phase three and by term five of Equation 48, the incomplete count term. The proper constant for the count is read into the V register from the sector address track during interval four of the first word time of phase three (term eleven, Equation 145). For the multiply and divide instructions, phase three is terminated when FGS00 is true at bit time $t_{24}$ indicating a count down to zero of the constant denoting the number of word times required for a multiply or divide operation. The termination of phase three is controlled by term two of Equation 58 defining the resetting of the FGU02 flip-flop.

All of the arithmetic and control operations of the GP 10 of the system of this invention are accomplished during phase three of the sequence of operations. These operations will be discussed in detail in the following sections in order to illustrate the operation of the GP 10 with particularity.

ADD AND SUBTRACT OPERATIONS

As pointed out above, phase three of the ADD and SUBTRACT operations is entered upon obtaining a successful search for the operand during phase two. This is signified by the flip-flop FGS00 being true at bit time $t_{24}$ of a particular word, the search itself being defined by term three of Equation 48. In the add or subtract operations, the operand in the particular memory location selected during phase two is added to or subtracted from the contents of the A register. The result remains in the A register. All negative numbers appear in the machine in the two's complement form. Thus, no testing of the negative signs of the accumulator or of the related memory location is required.

In order to accomplish the add and subtract functions, the values to be combined are transferred through an arithmetic matrix defining the input to an amplifier NGA24. The read amplifier RGA01 and the read flip-flop FGA01 for the A register are switched into the flip-flop FGA25 (as defined by terms four and two of Equations 7 and 8) bypassing flip-flop FGA00 so that the amplifier NGA24, the input to which forms the arithmetic matrix, may be used for all arithmetic operations.

The addend or subtrahend is read from the selected memory location and switched through an amplifier NGX20 (as defined in Equation 162 into the amplifier NGA24. The inputs to the amplifier NGA24 from memory and the A register are controlled by the first four terms of Equation 93.

Only the logic for the carry flip-flop FGC00, by generating either a carry or a borrow, differentiates between an add or a subtract operation. Term one of Equation 13 and terms one and two of Equation 14 control the generation of the carry and borrow. For example, the signal IGI80 in term one of Equation 13 includes a control term for designating ADD or SUBTRACT and the input from flip-flop FGA25 Equation 123. Thus, a carry is generated where signals FGA25 and NGR00 (true signal from memory, Equation 138) are both present and the instruction is ADD.

As pointed out above, the operation is such that the contents of the memory location and the contents of the accumulator (A) register are switched into the arithmetic matrix input to amplifier NGA24 and are then retransferred to the accumulator (A) register. The sum logic including the carry or borrow, the memory signal, and the augend or minuend is written into the A register in the manner outlined by terms one-four of Equation 93. Table III above gives the binary code necessary for instructing the ADD and SUBTRACT operations and thus defines the condition of the instruction register I including flip-flops FGI01–FGI05 during the performance of these operations.

Of especial note is the fact that other positions than memory may be address for the operand. More particularly, the Y register and the initial conditions track of the DDA 30 may be addressed to obtain the operand. This is particularly valuable as will be noted below.

ADD-REPLACE/SUBTRACT-REPLACE

The ADD-REPLACE and SUBTRACT-REPLACE functions are substantially like those illustrated above for the ADD and SUBTRACT functions and are accomplished by switching the numbers through the same arithmetic matrix under control of substantially the same equations. However, upon the completion of the arithmetic function, the operand memory location is filled with the result (term one of Equation 147). As will be apparent, the memory position must be on a modifiable track since only such tracks have facilities for writing. However, the modifiable track may be that of the Y register of the DDA 30. The result also remains in the A register.

As pointed out, the flip-flop FGK01 defines the first word time of phase three so that after the addition or subtraction the sum or difference in the accumulator may be transferred to the modifiable memory position. This operation is more particularly defined in Equations 35, 36, and 58. These equations illustrate that flip-flop FGK01 is reset after bit time $t_{24}$ of the first word time of phase two, and set a bit time $t_{24}$ of the first word time of phase three (term three of Equation 35). Term four of Equation 58 illustrates that sequence control flip-flop FGU02 is reset at bit time $t_{24}$ of word two of phase three during these operations to initiate a new phase zero. It should be noted that the two REPLACE commands are the only ones in which the track address register D is not freed for control use during phase three. Instead, it retains the address of the memory position during the phase.

SHIFT-A-RIGHT

During the SHIFT-A-RIGHT operation, the contents of the A register are shifted right by one bit position for each word time during the execution of the command. This is accomplished by decreasing the recirculation path one bit during each word time by removing the flip-flop FGA00 from the path and taking input at the flip-flop FGA24 directly from flip-flop FGA01, as defined by term eleven of Equation 93. The sign of the number in the A register is held in the sign position by rewriting it from its position at bit time $t_{24}$ to bit time $t_0$ during each shift, as shown by term eleven and the last term of Equation 93. In the equation, the signal NGT00 defines interval $I_0$ (time $t_0$) and the signal FGA24* provides for writing the sign in the appropriate position during the operation.

Phase three of this command is entered after a single word time of phase two as no operand search need be performed. Phase three may last for any number of words up to 128 (the total number of word positions around the drum) depending upon the number of shifts to be performed. The number of shifts is defined by a binary number programmed into the sector address portion of the operand address field of the instruction. This binary number is stepped out of the V register and decremented by one through the comparison executed by the flip-flop FGS00, as defined by term two of Equation 48. The execution of the instruction is terminated when a count of zero is detected by the flip-flop FGS00 at bit time $t_{24}$ of a particular word sector, as defined by term three of Equation 58.

SHIFT-A-LEFT

The SHIFT-A-LEFT operation is accomplished in a substantially identical manner to the SHIFT-A-RIGHT operation except that the recirculation path is increased by one bit time by switching the output of the flip-flop FGA00 into flip-flop FGA25 (terms three of Equations 7 and 8) and writing from flip-flop FGA25 into the write flip-flop FGA24 per term twelve of Equation 92. During a left shift, the contents of the A register are shifted left; and zeros are inserted in the least significant bit positions. In order to insert zeros in the least significant position of the A register, the flip-flop FGA25 is reset to zero at bit time $t_0$ of each word, as is more particularly defined in term four of Equation 8. It is of interest that the sign is not rewritten into the sign position during a left shift. If the number is shifted sufficiently that the sign bit changes, the register has necessarily overflowed so that the number retained is meaningless. For this reason, the rewrite is not provided.

MULTIPLICATION

The arithmetic portion of the MULTIPLICATION operation is commenced upon completion of phase two after a successful search for the multiplier has been made in memory (terms three of Equations 47 and 48). During the first word time of phase three, as defined by term two of Equation 36 which controls the state of flip-flop FGK01 at time $t_{24}$ of each word of phase two, the multiplicand stored in the A register is shifted into the B register (terms two of Equations 11 and 12); and the A register is cleared to zeros. The clearing is accomplished by providing no input term for amplifier WGA24 during this period. Coincidentally, the contents of the selected memory location are also read into the M register to serve as the multiplier (Equation 132, term four). It should be noted that signal NGR00, the address signal, is defined in Equation 138; terms six and seven thereof include the usual address of the memory read flip-flop FGR00 while terms four and five allow the DDA 30 to be addressed for a multiplier. The logic for the gates for connecting particular memory tracks specified in Table IV are contained in Equations 66–91.

As pointed out above, twenty-four word times are necessary to accomplish the actual multiplication after setting up the problem. In order to count the word times for the multiplication operation, a constant is permanently recorded in the five bit positions of interval $I_4$ of each word sector of the sector address track. During interval $I_4$ of the first word of phase three of the multiply operation, this binary number is shifted serially from the sector address track into the sector address register in the operation defined by the last term of Equation 145. Each word time thereafter, as outlined by the last term of Equation 48 and the eighth term of Equation 145, the number is decremented by one until zero is reached. This determination is made when the flip-flop FGS00 is true at bit time $t_{24}$.

Multiplication is performed by essentially the method outlined by Booth and Booth (see, Automatic Digital Calculators, 2d edition, pp. 45–48 published by Butterworth Scientific Publications). The method is especially useful since it may be used with both normal and complemented numbers without the necessity of a sign test prior to the operation. In accordance with this method, a comparison is made during each word time between two adjacent bits of the multiplier beginning with the least significant to determine whether (1) to add the multiplicand to or subtract it from the partial product and shift the product or (2) to shift the partial product by one bit position without performing an addition or a subtraction.

For the first comparison, the least significant digit of the multiplier is compared with a zero. To accomplish this, the zero bit position flip-flop FGM00 of the M register is set to zero at time $t_{24}$ of the first word time (term three of Equation 40). Thereafter, the multiplier is shifted and a comparison is made at time $t_0$ of each word time between the states of flip-flop FGM01 (the next-to-least significant bit) and flip-flop FGM00 (the least significant bit) to determine the operation to be performed. The following occur as a result of each comparison at time $t_0$. If the two bits of the multiplier are identical, the partial product is shifted right by one bit position. If the FGM01 position contains a zero and the FGM00 position contains a one, the multiplicand is added to the partial product and the total is shifted right one bit position. If the two are reversed, the multiplicand is subtracted from the partial product and the total is shifted right by one bit position. The sign is preserved by rewriting it at bit time $t_0$ of each word.

In the mechanization of the preceding operations, control is derived from the track address flip-flop FGD03, the inputs to which are illustrated in the third term of each of Equations 19 and 20. At bit time $t_0$ of each word time after the first word time, the content of flip-flop FGM00 is shifted to flip-flop FGD03 while, simultaneously, the contents of flip-flop FGM01 are shifted to flip-flop FGM00. The shifted results are then held in flip-flops FGM00 and FGD03 throughout the word time and used as control terms to determine the operation being performed for the remainder of the word time. In view of the fact that addition and subtraction are distinguished only in the carry flip-flop of the arithmetic matrix, either signal FGD03 or FGM00 appears in the carry logic.

The actual logic of the addition and subtraction operations in mechanizing the multiplication is shown in terms two and three of the carry Equation 13, terms three and four of Equation 14, and the summing matrix terms one through four of Equation 93. The logic for accomplishing the multiplication shift function is shown in terms six and seven of Equation 93. It will be noted that paired ones or zeros in these two terms occasion the generation of the shift signal.

To complete the multiplication explanation, the least significant (overflow) bits of the product are shifted into the M register at bit time $t_0$ of each word time. This is defined in term five of Equation 132. Upon completion of the instruction, the A register contains the product, the M register contains the sign of the multiplier, and the B register contains the multiplicand.

DIVIDE

The DIVIDE operation is performed in a manner somewhat analogous to the Multiply operation. However, in executing DIVIDE, the signs of the dividend and divisor are compared to determine the operation to be performed. This method is also outlined by Booth and Booth at pp. 48–51 of the above-mentioned text.

During the first word time of phase three of this instruction, the operand is read from memory or other position including DDA 30 into the B register; and the M register is cleared to zero. The operand in the B register functions as the divisor. The contents of the A register function as the dividend. At bit time $t_{24}$ of each word, a comparison of the signs of the divisor and dividend (partial remainder) is made; and a quotient is generated according to the following rules. If the signs of the two numbers are alike, the dividend is shifted left one bit, the divisor is subtracted from the dividend, and a one bit is added to the quotient; if they differ, the dividend is shifted left one bit, the divisor is added to the dividend, and a zero bit is added to the quotient. An initial sign comparison at time $t_{24}$ of word one generates the sign of the quotient, positive if the signs are alike, negative if they differ.

As with the multiplication operation, the end of the first word time of phase three is signified by the flip-flop FCK01 being reset at bit time $t_{24}$, as outlined by the second terms of each of Equations 35 and 36. The A register recirculation during word one to retain the dividend is controlled in accordance with term eight of Equation 93; the M register clear during word one, by the lack of a term for recirculation. The loading of the B register from memory is accomplished in accordance with the third terms of Equations 11 and 12.

The sign and quotient generation is controlled in accordance with term three of Equation 39, term four of Equation 40, and terms two of Equations 19 and 20. It should be noted that track register flip-flop FGD03 is operated at time $t_{24}$ of each word to control the operation performed, the following word time in forming the partial remainder. Flip-flop FGD04 is also operated in controlling the left shifts (Equations 21 and 22, term two of each). Finally, division recirculation is outlined by terms four and five of Equations 39 and 40, respectively. Upon completion of the instruction, the A register contains the remainder, the M register contains the quotient, and the B register contains the divisor.

CLEAR-ADD

In this operation the A register is cleared, and the contents of a selected memory position are copied into the A register. The clearing is accomplished by forcing each bit of the augend to zero as it is added to the addend (last term of Equation 8); the signal FGA25 directed to NGA24 accomplishes the zeroing. The B and M registers remain unchanged. Equation 93, terms one through four defining the summing matrix, term one of Equation 13, and terms one and two of Equation 14 relating to the carry flip-flop FGC00 control the operation. The signals NGX20 and IGX20 of Equation 93 contain the memory input signals (see Equation 162).

CLEAR-SUBJECT

The contents of the selected memory location are subtracted from "zero" contained in the cleared A register. A zero is forced in the same manner as in the CLEAR-ADD operation. This results in the two's complement of the contents of memory being formed in the A register. The B and M registers remain unchanged. This operation is defined by the same equations which control the CLEAR-ADD operation.

It should be noted that the CLEAR-ADD and CLEAR-SUBTRACT operations are especially useful for calling numbers from the Y register of DDA 30 for comparison and other purposes directly related to correction and updating.

SIGN TEST TRANSFER

The sign of the contents of the selected location is tested. If the sign of the contents is negative, the next instruction is taken from the sector address specified by the "next instruction" address of this instruction. If the sign of the contents is positive, the instruction taken will be the next sequential instruction occurring in memory on the same track upon completion of phase three of the SIGN TEST TRANSFER command. The A, B, and M registers remain unchanged. This instruction is most useful when a number in the Y register of the DDA 30 has a sign which is controlling for a later operation. The sign is tested for the instruction which is to be selected.

Phase three is entered upon completing the search for the operand during phase two and lasts but a single word time. Since no arithmetic functions are accomplished, the arithmetic registers all recirculate. The carry flip-flop FGC00 is connected to determine the sign as the number is read from the selected location, at bit time $t_{24}$ as outlined by term six of Equation 13. It should be noted that signal IGR00 of term six (defined in Equations 137 and 138) allows input signals from any of a number of locations including the arithmetic registers, the DDA 30, and the GP memory. To make the determination, the sign bit is transferred to the flip-flop FGC00. If the carry flip-flop FGC00 is set at bit time $t_{24}$, the sign is positive (a binary zero); if not set, the sign is negative. Once set, the flip-flop FGC00 will remain set during phase zero thus causing flip-flop FGU01 to be set and the next sequential instruction to be selected per term one of Equation 55. Essentially, setting flip-flop FGU01 sequences the system into phase one in which the contents of the memory (here the one next in sequence) are automatically read into the V register (Equations 61 and 62).

COMPARE TRANSFER

During the single word of phase three of this command, the contents of the selected position are compared with the contents of the A register. If the contents of the A register are equal to or greater than the contents of the seleced position, the next instruction is taken from the next instruction field of the command. If the contents of the selected position are greater than the contents of the A register, the next sequential instruction occurring upon completion of the command will be taken.

As with the SIGN TRANSFER operation, no arithmetic functions are accomplished; and the A, B, and M registers remain unchanged. The transfer criteria is determined by comparing bit by bit the state of the output flip-flop FGA00 with the state of the selected position (signal NGR00 or IGR00). The carry flip-flop FGC00 is used to detect the conditions. It is reset prior to entry to phase three by the logic of term nine of Equation 14. It will be set from time $t_1$–$t_{23}$ if one bit occurs in memory and not in the A register, term seven of Equation 13. It will remain reset from time $t_1$–$t_{23}$ if a one bit appears in the accumulator and not in memory (term seven of Equation 14). Even though an absolute value comparison has been made as above described, a negative number is considered as less than any positive number so at time $t_{24}$ a sign comparison per terms eight of each of Equations 13 and 14 is made. The setting of the flip-flop FGC00 causes the next sequential instruction to be taken as explained above with respect to the SIGN TEST TRANSFER. This instruction may be used for comparing numbers in the Y register of the DDA 30.

LOGICAL "AND" TRANSFER 1

The contents of the selected memory position and the contents of the A register are compared, bit by bit. If for every one bit occurring in memory a corresponding one bit occurs in the A register, the next instruction will be taken from the address specified by the next instruction field of the instruction. If for any one bit in the memory a one bit did not occur in the A register, then the next instruction taken will be that which occurs upon the completion of this instruction on the same track as the current instruction, i.e., the next sequential instruction. The operation is thus a comparison to determine identity. The logical product (AND) of the memory contents and the inverse of the A register contents replace the A register contents. The B and M registers remain unchanged. The command is especially useful for logical bit extraction since particular non-conforming bits may be selected from the number.

The comparison is accomplished by the carry flip-flop FGC00 in accordance with term five of Equation 13. Again, the sequential selection after the comparison is controlled by term one of Equation 55. The logical product generation is controlled by term fourteen of Equation 93.

The operation of this instruction allows a test for a unique configuration of switch settings. For example in the event all of a set of conditions must be satisfied before an action is taken, this instruction would be utilized. This might be the case in a missile release situation where multiple requirements of readiness must all be satisfied before a release can be made.

LOGICAL "AND" TRANSFER 2

A comparison is made by flip-flop FGC00 of the logical product of the contents of memory and the contents of the A register. If no one bit in the memory location corresponds to a one bit in the A register, the next sequential instruction occurring upon the completion of the command will be taken from the same track from which the present instruction was obtained. The logical product of the memory word and the A register word replaces the old A register contents. The B and M registers remain unchanged. The terms defining the comparison and sequential selection operations are four of Equation 13 and one of Equation 55. Term thirteen of Equation 93 defines the generation of the logical product.

This instruction allows the testing for any one of a group of switches being in an "on" state. A typical example of the use of this instruction would be where a number of conditions could prevent a mission from being performed and a test for any one of the conditions existing was to be made.

STORE A

The contents of the A register are placed in a selected memory or other location on one of the modifiable tracks. The contents of the A, B, and M registers remain unchanged. Equations 147 and 148 define the input to the memory write flip-flop FGW00 which control this operation. Term sixteen of Equation 93 defines the recirculation of the A register. It should be noted that the store terms can be used in addressing other than memory positions, e.g., the Y register of DDA 30. This lends a special control facility to the system.

STORE B

The contents of the B register are placed in a selected location on one of the modifiable memory tracks or other addressable locations. The contents of the A, B, and M registers remain unchanged. The terms two of Equations 147 and 148 define the store function of this operation. Terms four of Equations 11 and 12 define the B register recirculation.

STORE M

The contents of the M register are placed in a selected location on one of the four modifiable memory tracks or other addressable location. The contents of the A, B, and M registers remain unchanged. Terms three of Equations 147 and 148 define the storage during the operation.

LOAD B

The contents of a selected memory or other addressable location replace the contents of the B register. The A register and M register remain unchanged. The terms three of Equations 11 and 12 define the loading operation. The load commands may also be used for transferring information to addressable DDA locations such as the initial conditions track and the Y register.

LOAD M

The contents of a selected location replace the contents of the M register. The contents of the A register and the contents of the B register remain unchanged. The equations defining the loading operation are 131 and 132, specifically term two.

EXCHANGE A AND B

The contents of the A register are shifted into the B register while the contents of the B register are shifted into the A register. The M register recirculates. The equations for this operation are 11, 12 and 93, terms two, two, and ten, respectively.

EXCHANGE A AND M

The contents of the A register are shifted into the M register while the contents of the M register are shifted into the A register. The B register recirculates. The equations for this exchange operation are 93 and 132, terms nine and three, respectively.

TRANSFER UNCONDITIONALLY

The operand address field of this instruction specifies the address from which the next instruction is to be taken. Term four of Equation 48 definies the sector search by the logic at the input to the flip-flop FGS00. It will be noted that signals FGT01*, FGT02*, and FGT03* cause the search to be conducted during interval $I_1$ rather than the normal interval $I_3$. This command might well be used with various of the comparison commands for instruction selection.

IDLE

The execution of this instruction causes the GP 10 to go into a state in which all registers are recirculated. The GP 10 remains in this state until a restart signal is received. This instruction is normally used for checkout and program error checks; for example, if the expected results for a particular operation do not occur, this instruction may be used in conjunction with the SIGN-TEST-TRANSFER or other comparison instruction to halt operations. The equations defining the operation are (11-term four), (93-term sixteen), and (131, 132-terms eight).

INPUT

The input lines of any one of a number of addressable input locations (shown in FIGURE 1 as input-output block 14) are scanned to provide input signals serially into the A register. The address of the input location is specified by the operand track address bits of the input instruction. This address is held in the track address (D) register during the execution of the command. The command code signal NG132 (equation 105) serves as the external control to indicate that an input quantity is being scanned. The external input is received at flip-flop FGA24 of the A register via the amplifier NGA24. The equation defining this operation is 93, term fifteen, in which FIV00 designates generally the input signal being read. The signal FIV00 along with the track address specifies the particular input which is received.

OUTPUT

The contents of the A register are shifted serially into the output lines which may be selected from any of a number of addressable locations specified by the operand track address of the output instruction. The output signals may proceed from any position from which an operand may be otherwise sent, e.g., A register, M register. The equation 103 defines the signal NGI12 controlling the operation within the GP 10. In FIGURES 1 and 4, the output positions are shown in block form. The actual equipment may take any of a number of forms well known in the computing art.

CONTROL DDA

As will be better appreciated from the description of the DDA 30 which follows, the GP 10 may initiate specified operations of the DDA 30 by a general command "CONTROL DDA." The particular operation desired is specified by the condition of the GP track address (D) register.

The operations are described only briefly at this point since a detailed description is given in the discussion of DDA operation.

The second term of Equation 56 and the last term of Equation 58 together define the drum origin mark at which all of the following operations commence. The remainder of the logic for the particular operations is in the matrix of DDA 30. The five commands which follow are CONTROL DDA commands.

CONTROL DDA/INITIALIZE DDA

Upon the execution of this command, the contents of the initial conditions track of DDA 30 are read into its Y register. The R register and the Z-lines of the DDA 30 recirculate. The execution of this command is delayed until an origin pulse is received. The operation lasts for one drum revolution and is terminated when the following origin pulse occurs. The A register, the B register, and the M register of the GP 10 remain unchanged. Upon the termination of this command normal operation of the DDA is resumed. The D register condition for the command is listed in Table IX below.

CONTROL DDA/INITIALIZE-CLEAR DDA

The execution of this command by the GP 10 results in the contents of the initial conditions track being read into the Y register of the DDA 30 and in the R register and Z-lines of the DDA 30 being cleared to zero. This command takes one drum revolution to execute and begins and ends at an origin pulse. Upon the termination of this command, normal operation of the DDA 30 is resumed. The contents of the registers of the GP 10 remain unchanged. The D register condition for the command is listed in Table IX below.

CONTROL DDA/CLEAR R AND Z

The contents of the R register and the Z-lines of the DDA 30 are cleared to zero. The Y register recirculates retaining its information. The command requires one drum revolution, commencing and ending on an origin mark. The A register, the B register, and the M register of the GP 10 remain unchanged. The command is signalled by the D register in accordance with Table IX.

CONTROL DDA/RECIRCULATE DDA

This instruction results in the DDA 30 going into a recirculate mode beginning at an origin pulse. Information in the Z-lines recirculates around the fifty bit recirculation loops so that the majority of information is saved. Information in the Y and R registers and the initial conditions track is recirculated. The condition of the D register is given in Table IX. The command is normally used for test purposes.

CONTROL DDA/START DDA

The execution of this instuction applies signals to bring the DDA 30 out of the recirculate mode. Table IX lists the nondition of the D register for the command.

*General description of the DDA section 30*

In order to fully understand the manner in which the DDA 30 of the present invention is mechanized, it is desirable to have some familiarity with the mathematical concepts which underlie the use of a DDA.

Production of delta 3 output signals by an integrator is accomplished in accordance with the equation $dZ=KYdX$ through use of a so-called R number which is associated with the Y number. Delta Y increments are selectively added to or subtracted from the Y number so that the Y number changes at the rate delta Y. For each delta X signal received, the Y number is accordingly added to or subtracted from the R number. In this way, the Y number is effectively added to the R number at the rate delta X. Eventually, the R number overflows (that is, exceeds predetermined limits); and the rate at which such overflow occurs is taken as the output rate, delta Z. The operation is illustrated philosophically in FIGURE 2.

The mathematical basis for integration will not be presented in more detail here since it has been well described in the prior art literature relating to DDA's (see article entitled, "The Decimal Differential Analyzer," by Mendelssohn, Aero Engineering Review, February 1954).

In order to solve a problem with a DDA, the integrator sections of the DDA must be interconnected; and initial values must be determined for each of the sections. Once the interconnections and initial values have been determined, their mechanization is programmed and the problem solution may take place.

It should be understood that in a DDA, an individual integrator need not necessarily exist as a separate and distinct entity but instead may comprise a stored Y number, an associated stored R number, and apparatus for relating the two to accomplish the integration. The apparatus may include means for utilizing selected delta Z signals as delta X and delta Y inputs, means for decreasing or increasing the Y number in accordance with each delta Y input, means for increasing or decreasing the R number in accordance with the Y number and the delta X input, and means for generating delta Z output signals in accordance with the resultant overflows of the R number. Thus, a plurality of integrators may be provided by means for storing a plurality of pairs of Y and R numbers and operating serially upon each of such pairs, the apparatus for performing these operations being time shared to successively service each pair of Y and R numbers. To this end, one or more magnetic tracks may be used to store all Y and R numbers, conventionally a single track for all Y numbers and another single track for all R numbers.

Interconnections between integrator sections are established by initially programming the DDA to select results (delta Z signals) of various integrator sections as delta X and delta Y signals for others of the integrator sections. Initial values of the various Y numbers are entered by filling the digits representing these numbers into the spaces on the Y register memory track selected for the various integrator sections. The particular program for the complete integration (chosen with the above considerations in mind) is placed on the program memory tracks of the DDA. The program is selected to provide integrator interconnections and all commands necessary to mechanize the operation. An especially complete description of integrator set up and philosophy, including interconnection, is given in F. G. Steele Patent 3,035,768, issued on May 22, 1962.

Figure 3:
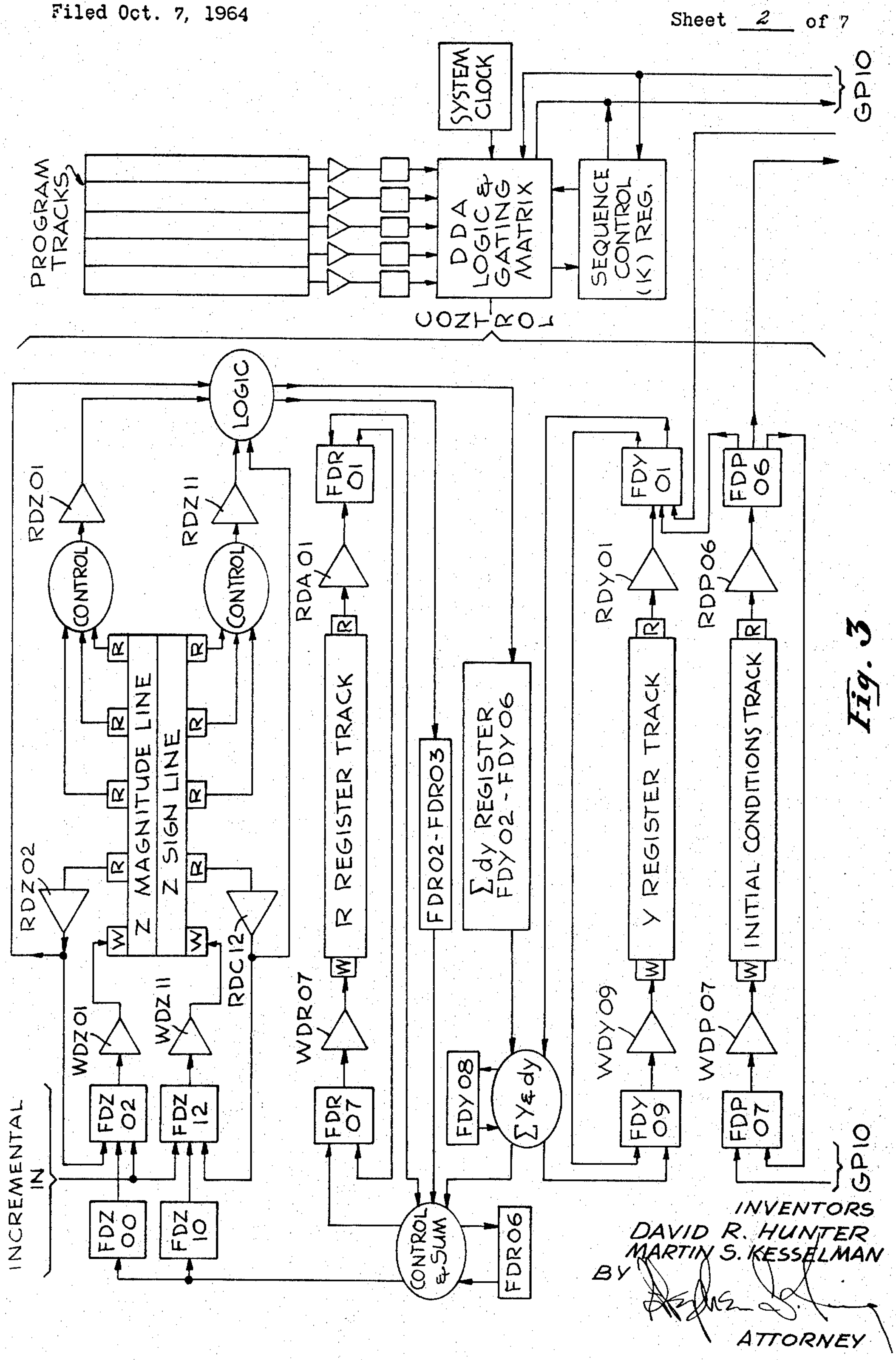
FIGURE 3 is a functional block diagram of the digital differential analyzer of the system of the invention.

In FIGURE 3 is shown a functional block diagram of one specific embodiment of a digital differential analyzer section (hereafter referred to as the DDA 30) in accordance with the invention. It should be noted that FIGURE 3 does not attempt a complete description of DDA 30 but is offered merely to assist an understanding of the system.

The DDA 30 may physically comprise a number of magnetic drum storage tracks, a plurality of flip-flop circuits, various amplifiers and magnetic heads, and a logic and gating matrix for accomplishing the particular functions devised by the programmer. More particularly, the DDA 30 comprises an initial conditions track, a Y register track, a R register track, a pair of magnitude and sign Z-line tracks, and five program tracks, all of which may comprise magnetic memory tracks upon a rotating drum. In the illustrated embodiment, the program tracks comprise what are termed "semi-permanent" memory tracks on the magnetic drum; and the other tracks comprise modifiable memory tracks upon the drum. "A semi-permanent track" as used herein refers to one for which no provision has been made to modify the storage content during operation.

The five program tracks are arranged and operated in synchronism, each in a serial fashion, so that at any particular machine time five bits of binary program information are available. Thus, as many as thirty-two program commands are available. These commands include those for starting and ending individual integrators, for starting and ending an operation termed servo, for selecting (decoding) information at Z-line positions as delta X and delta Y inputs, for reversing signs, for selecting external incremental input signals, and for other functions, all as explained more particularly hereinafter.

The program takes up one-half of the length of tracks and is duplicated to attain an iteration rate which is twice drum rate. Each program track has an associated read head which is operated in synchronism with the read heads of the other program tracks to provide an output signal to read amplifiers for operating program track read flip-flops. The read and write heads of the system are selected and associated with the tracks in accordance with well known criteria to provide and to discern incremental areas on the tracks of selected magnetization in accordance with inputs provided thereto.

In order to place a program on the program tracks, well known equipment may be connected to furnish writing signals to each of the program track read heads. For example, signals for writing in what is termed in the art a "Ferranti" pattern may be provided by means of external equipment. The use of external equipment for writing the program gives rise to the designation "semi-permanent" memory. This method of placing a program on the program tracks through equipment which is not a physical part of the system is especially useful where system portability is a factor and it is desirable to reduce overall weight or size, e.g., airborne systems.

It should be especially noted that all of the operations of the DDA are programmed, those for starting and stopping integrators as well as for decoding functions. This feature, enhanced by extreme track length, allows the space-conserving variable length integrators.

As pointed out above, the use of a binary number system in the equipment of this invention provides thirty-two possible individual program commands where five program tracks (five bit positions) are sampled synchronously and coincidentally. In practice, it has been found that the number of command codings available is more than sufficient for the functions of the relatively sophisticated DDA of this invention. However, if desired, the number of commands could be doubled by simply including an additional program track. Obviously, the logic circuitry of the system would have to be revised as to details to accommodate the addition.

The program tracks furnish signals to the logic and gating matrix for exerting control through a plurality of circuit arrangements therein, the particular operations of which will be explained hereinafter. For the purposes of this general description, only the functions of these arrangements will be discussed. The program tracks control the generation of signals by the matrix for operating the DDA 30 in the integration and servo modes. It should be remembered, and will be emphasized where pertinent to the discussion, that primary control of these operations by the logic arrangements is exerted by means of the program tracks.

The logic and gating matrix of DDA 30 receives clock signals from a clock pulse generator which may also provide clock signals to the GP 10. These signals are used as defined in the logical equations listed hereafter for the operation of the system.

The initial conditions track in the embodiment here discussed comprises a circular magnetic track of 3200 bit positions, identical in number to that provided for the Y and R tracks. In contrast to those tracks however, only one half of the initial conditions track is ever filled with information since the track need only provide signals for initializing the Y register which encompasses only one-half of a track around the drum. The initial conditions track is mechanized by a write head amplifier WDP07 and a read head amplifier RDP06 connected, respectively, to read and write heads positioned 1600 bits, or one-half a track length, apart. The read head amplifier RDP06 furnishes signals sequentially during drum rotation to a read head flip-flop FDP06. The write amplifier WDP07 furnishes signals to a flip-flop FDP07 which may be connected by the control matrix to the Y register track for initializing the DDA 30.

The selected initial conditions are originally placed on the initial conditions track from external circuitry under control of the GP 10 through the write head amplifier WDP07 and write flip-flop FDP07. This is accomplished by the GP STORE commands addressed to the initial conditions track. When the DDA 30 is initialized under command of the program control tracks, the initial Y numbers stored in particular positions on the initial conditions track are read out serially via the flip-flop FDP06 and placed on the Y register track. The actual control for starting, of course, is accomplished by the GP 10. That is, the GP 10 commands through the agency of a "CLEAR-INITIALIZE" instruction that the R register track and the Z-line tracks be cleared to zero and that the contents of the initial conditions track be written onto the Y register track.

In the case of the instruction, the Y register is initialized on a single drum rotation.

Both the Y and R registers of the DDA are mechanized in the following manner. Each register includes an individual magnetic track utilizing a single pair of read and write heads which are separated by 1600 binary bits. In general, prior art recirculating registers have read and write heads separated by space sufficient for the bits of but a few integrators. Such arrangements with fixed programs form fixed-length registers which must be large enough to include the largest Y and R numbers to be used. Where shorter numbers are manipulated, the space not used is lost.

The arrangement of this invention is not so limited. The wide head separation allows a programmer to start and stop integrators as he wishes, to devise integrators of variable lengths, and to place these integrators adjacent one another between the heads with only a negligible loss of space (a single spacing bit in a particular embodiment). Although, in prior art fixed-word-length integrators the space not used in a particular register is necessarily lost, in the present DDA an integrator of ten bits can be placed adjacent another integrator of twenty-six bits with only a single space left to distinguish between them. On an average, it has been estimated that this system of variable length integrators allows the efficient use of well over ninety percent of the register space available as compared with approximately sixty percent use for fixed-word-length integrators.

An additional advantage accrues from the close arrangement of individual registers. Since waste space is substantially abolished, the time normally spent traversing that space in fixed-word-length machines is eliminated so that operations are speeded by approximately one and one-half times those of a comparable fixed-word-length machine. Furthermore, no statistically-computed limits are placed on register size. Thus, if larger words are ever desired, they may be used without any machine changes.

Each of the Y and R registers (in one particular embodiment) is a recirculating register having a track length between heads of 1600 binary bits. Each of the tracks has space for 3200 bits so one iteration requires but half a rotation of the drum.

The Y register illustrated philosophically in FIGURE 3 is mechanized by a write flip-flop FDY09 which controls signals directed through write head amplifier WDY09 to the magnetic track via a write head. Positioned 1600 binary bits away is a read head connected to a read head amplifier RDY01 through which signals are transferred to a read flip-flop FDY01. A recirculating path may be provided by circuitry in the logic and gating matrix between the flip-flops FDY09 and FDY01 so that the arithmetic operations of the Y register may be accomplished.

A full adder circuit is included within the DDA logic and gating matrix circuitry which is utilized for adding or subtracting the sum of delta Y increments to or from the Y numbers in the Y register. The full adder includes a carry flip-flop FDY08. The adder is furnished summation of delta Y information from a shift register which includes a plurality of flip-flops FDY02–FDY06 and associated circuitry within the matrix for totaling a plurality (up to seven in one particular embodiment) of detla Y increments. The adder also receives Y number information from the Y register. Thus, under control of the program channels, a plurality of incremental delta Y signals may be decoded from the Z-lines, transferred to the shift register flip-flops FDY02–FDY06, totaled and held for summation with a particular Y number in the Y register of a following integrator. The facility by which a plurality of delta Y inputs may be added to a single integrator on one passage of the Y register track eliminates individual recirculations for each addition and increases the iterative speed of the DDA 30 appreciably.

As stated above, the sum of the Y number and the delta Y increments is added during the integrate operation to the number in the R register at a rate determined by the delta X signals. The R register is mechanized by the R register memory track, a read head associated with a read amplifier RDA01, a read flip-flop FDR01, a write head, and an amplifier WDR07 associated with a write flip-flop FDR07. As with the Y register, control of signals to and from the flip-flops FDR01 and FDR07 is exercised by the logic and gating matrix. Again, a philosophical illustration of the R register is given in FIGURE 3.

The addition of the Y number to the R number is accomplished through use of a carry flip-flop FDR06 and full adder logic circuitry within the matrix. A pair of flip-flops FDR02 and FDR03 are used for storing the sign and magnitude of the X increments which control the addition or subtraction. These flip-flops are also used in generating overflow signals.

As noted, ternary-coded numbers are transmitted and utilized within the DDA 30 of the system. Thus, delta X, delta Y, and delta Z bits have possible values of −1, 0, or +1. The ternary number system is used to obtain the increased accuracy possible through the use of smaller increments. However, the use of the ternary system requires that both the magnitude of the overflow from the R register and its sign be recorded by the Z lines. To this end, two Z-line tracks are provided, one for the sign and one for the magnitude of the overflow information.

Overflow generation is controlled by the program control tracks in accordance with the following rules. If the old R number plus the sum of the new Y number times delta X is equal to or greater than one-half a one magnitude and a zero sign bit are generated in order to signify a delta Z increment of plus one. If the sum of these numbers totals less than one-half but equals or exceeds negative one-half, a zero magnitude bit is generated to signify a delta Z increment of zero. If the sum is less than negative one-half, a one magnitude and a one sign bit are generated to signify a delta Z increment of minus one. The incremental overflow signals generated proceed from the R register to an overflow input and decode circuit which includes a pair of overflow storage and putaway flip-flops FDZ00 and FDZ10. These flip-flops store the sign and magnitude of individual overflow signals. From the putaway flip-flops, the signals are transferred on program command to the Z lines.

The magnitude Z-line includes a write flip-flop FDZ02, a write amplifier WDZ01, a write head, the magnetic track, and plurality of read heads connectable by the logic and gating matrix to read head amplifiers RDZ01 and RDZ02. In like manner, the sign Z-line comprises a write flip-flop FDZ12, a write amplifier WDZ11, a write head, the magnetic track, and read heads connectable to read amplifiers RDZ11 and RDZ12.

The normal storage on both the magnitude and sign Z lines is accomplished by short-loop recirculation registers. For the magnitude line, the storage recirculation is accomplished by a loop comprising the write flip-flop FDZ02, the amplifier WDZ01, fifty bit spaces on the track separating the write head from the first read head, the amplifier RDZ02, and a path back to the write flip-flop FDZ02 controlled by the matrix. The Z sign line recirculation loop comprises the write flip-flop FDZ12, the write amplifier WDZ11, fifty bits of track separating the write and first read heads, the amplifier RDZ12, and feedback to flip-flop FDZ12 controlled by the matrix. Once an incremental signal is placed on the two lines it recirculates around the fifty bit path until written over by a succeeding signal. Since it is rewritten each fifty bits, it also continues down the track to the other read positions, being repeated at fifty bit intervals. Thus, any incremental signal may be selected every fifty bits by any read head. Since the heads are separated by 260 bits, the appearance interval is even less than fifty bits.

An especially important feature of the invention is the use of the two putaway flip-flops FDZ00 and FDZ10. These flip-flops provide temporary storage so that delta Z overflow signals may be selectively written on the Z-lines at positions directed by a PUT-AWAY command. Thus, information may be stored temporarily in the putaway flip-flops and written on the Z-lines at almost any position to facilitate communication with particular integrators and better use integrator space. The contents of the two putaway flip-flops may also be transferred directly as delta X or delta Y input signals to the integrator sections, further increasing system facility.

The recirculating paths also provide storage during the recirculation operation under control of the GP 10. During this operation, the information on each of the Z-line tracks between the write head and the first read head is recirculated while all other information is destroyed.

By the use of the putaway flip-flops and the plural read heads positioned at appropriate intervals along the tracks of the Z lines, rapid and facile communication is provided for the arrangement. This is especially useful in a DDA in which the integrators are of variable length because the variable length feature can be used to best advantage to save time and storage space only if communication with the Z-lines is such that incremental inputs may be made to appear at the appropriate time without delay.

One additional register is found in the DDA 30. This sequence control register comprises four flip-flops FDK01–FDK04. It stores signals indicating the mode of operation presently being performed (e.g., integration) and practices overall control over the operation. This register responds to signals from both the program tracks and the GP 10 in executing its functions.

*General description of operation of DDA 30*

As pointed out, the DDA 30 may be operated in the recirculate mode under GP command or in the integrate and servo modes under command of the program tracks. It may also be operated under command of the program tracks for certain input-output functions.

The commands listed in the following Table VII may be used for programming the operation of the DDA 30 in either the integrate or the servo mode.

TABLE VII

| | Code for Tracks | | | | |
|---|---|---|---|---|---|
| Program track number | 5 | 4 | 3 | 2 | 1 |
| Command: | | | | | |
| Complement $dz_0$ | 1 | 1 | 0 | 0 | 0 |
| Decode $dz_0^*$ as dx | 1 | 1 | 0 | 1 | 0 |
| Decode $dz_1$ as dx | 0 | 0 | 1 | 0 | 0 |
| Decode $dz_2$ as dx | 0 | 0 | 1 | 0 | 1 |
| Decode $dz_3$ as dx | 0 | 0 | 1 | 1 | 0 |
| Decode $dz_4$ as dx | 0 | 0 | 1 | 1 | 1 |
| Decode $dz_0$ as dy | 0 | 1 | 0 | 0 | 0 |
| Decode $dz_1$ as dy | 0 | 0 | 0 | 0 | 0 |
| Decode $dz_2$ as dy | 0 | 0 | 0 | 0 | 1 |
| Decode $dz_3$ as dy | 0 | 0 | 0 | 1 | 0 |
| Decode $dz_4$ as dy | 0 | 0 | 0 | 1 | 1 |
| Decode $dz_1$ as $dz_0$ | 1 | 0 | 0 | 0 | 0 |
| Decode $dz_2$ as $dz_0$ | 1 | 0 | 0 | 0 | 1 |
| Decode $dz_3$ as $dz_0$ | 1 | 0 | 0 | 1 | 0 |
| Decode $dz_4$ as $dz_0$ | 1 | 0 | 0 | 1 | 1 |
| Overflow to $dz_0$ | 0 | 1 | 1 | 1 | 0 |
| Overflow to $dz_0$ and put $dz_0$ to dx | 0 | 1 | 0 | 1 | 0 |
| Putaway $dz_0$ Positive | 0 | 1 | 0 | 0 | 1 |
| Putxway $dz_0$ Negative | 0 | 1 | 0 | 1 | 1 |
| Start Servo | 0 | 1 | 1 | 0 | 1 |
| Start Integrator | 0 | 1 | 1 | 0 | 0 |
| Do Nothing | 0 | 1 | 1 | 1 | 1 |
| Input 1 | 1 | 1 | 1 | 0 | 0 |
| Input 2 | 1 | 1 | 1 | 0 | 1 |
| Input 3 | 1 | 1 | 1 | 1 | 0 |
| Input 4 | 1 | 1 | 1 | 1 | 1 |
| Output 1 | 1 | 0 | 1 | 0 | 0 |
| Output 2 | 1 | 0 | 1 | 0 | 1 |
| Output 3 | 1 | 0 | 1 | 0 | 1 |
| Read Input-Output Track | 1 | 1 | 0 | 1 | 1 |
| Write on Input-Output Track | 1 | 1 | 0 | 0 | 1 |

The particular operations accomplished by each of the above commands will appear from the following description.

THE INTEGRATION OPERATION OF THE DDA

The number of integrators available and the length of each integrator are variable under program control. Referring to FIGURE 5 which is a diagram of a few of the commands which may be given during particular bit times, it will be seen that an integrator is started when a START INTEGRATOR command appears on the program tracks for four bit times. As will be explained below, the start period may be less than four bit times in certain instances; but four is sufficient for all cases. This command sets the control flip-flop FDK01 to define the integration interval so that other program commands may be performed during the integration.

Figure 2:
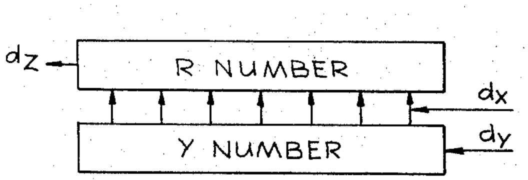
FIGURE 2 is a block diagram of assistance in outlining the general operation by which integration is accomplished by a digital differential analyzer.

Prior to the particular START INTEGRATOR command illustrated, the DDA cycles through other operations and incremental input signals for the particular integrator of interest are decoded. During this interval, the various increments are selected from the Z line tracks under program control and are placed in the temporary storage facilities afforded by flip-flops FDR02 and FDR03 and the summation of delta Y register. Upon receipt of a START INTEGRATOR command from the program tracks, the delta Y increments which have been selected and totaled in the summation of delta Y register (the flip-flops FDY02–FDY06) are shifted to full adder circuitry defined by the matrix. The initial four bit times are provided for this shifting function. Thereafter, the integrator operation begins automatically; and the sum of delta Y's is added by the full adder to the Y number in the Y register while the new Y number is added to the R number in the R register. During this period as illustrated in FIGURE 2, the various incremental input signals for the next integrator may be decoded (the delta X input normally only after the Y number is transferred to the R register in response to the appropriate delta X input, if any). External incremental inputs may also be accepted and overflow outputs transferred externally.

The end of each integrator is signalled by the OVERFLOW command appearing for two consecutive bit times on the program channels. Upon receiving the command, the R register overflow for a particular integrator is generated in accordance with the rules above outlined and is transferred to the putaway flip-flops FDZ00 and FDZ10. Thereafter, the overflow bits may be stored on the Z-line track or otherwise utilized under program command.

It should be particularly noted that an integrator is both initiated and terminated on program command. This facility allows the creation of the variable length integrators which accelerate machine operation to a substantial degree.

The following mathematical mechanizations should be noted. The OVERFLOW command defines the sign bit position of the integrator word. The sign of a positive number is represented by a binary zero in the sign bit position; and the sign of a negative number, by a binary one in the sign bit position. In a particular embodiment of the invention the maximum range of the R register is minus $\frac{1}{2}<R<\frac{1}{2}$. Negative numbers are expressed in two's complement form. As mentioned, the most significant bit position in the R register reflects the sign of the number in the R register. Thus, two bit times are required to generate the delta Z overflow-one bit time indicating the most significant magnitude bit position and another bit time indicating the sign bit position.

SERVO

In many cases, the particular mechanical or electronic arrangements with which a DDA is associated cannot utilize signals which have a value of zero. Thus, the zero-valued delta Z signals generated in an integration by DDA 30 for attaining extreme precision must often be converted to a different form for external transmission. The DDA 30 accomplishes this by converting the code from ternary to binary. The servo operation accomplishes the conversion.

The servo mode of operation is under control of the program tracks. The same philosophical components are used as for integration except that the R register function is not utilized. The servo mode is generally initiated in the DDA 30 by the appearance of a START SERVO command for four consecutive bit times on the program tracks. During the START SERVO command, the sum of delta Y increments decoded from the Z-lines for the servo operation are shifted from the summation register into the Y register full adder.

During the servo operation which commences automatically after the four succeeding START SERVO commands, a particular number is converted from a ternary indication into a binary indication so that it may be used for external communication. The operation is accomplished by adding the delta Y increments to the Y number and utilizing the sign of the Y number and the value of delta X to produce the delta Z overflow. In order that delta Z never be zero, a positive clock is used for delta X.

An OVERFLOW command terminates the servo mode and generates the appropriate output signals. Thus, the servo operation, like integration, may utilize variable lengths of the Y register track. The output signals may be stored on the Z-lines for later use or may be used immediately for external communication.

RECIRCULATE

Recirculation is the third basic operation of which the DDA 30 is capable. It is normally used for test purposes. The recirculate operation occurs when the GP 10 executes the command RECIRCULATE DDA. The execution is delayed after the command is given so that recirculation will commence only after the completion of an iteration cycle.

During the recirculation mode, the contents of the Y and R registers recirculate and are not modified by the commands appearing on the program channels (which are ignored). The contents of the fifty bit recirculate paths of the Z-lines also recirculate while that information not included in these recirculation paths is destroyed. The DDA 30 will continue to recirculate until the GP 10 issues the instruction START DDA. The execution of this command also commences only after the DDA 30 reaches a drum track origin point even though the command may be given at any bit time.

SPECIFIC DESCRIPTION OF DDA 30

The functions of one particular DDA 30 are implemented by means of sixteen logical flip-flops, five write flip-flops, eight read flip-flops, and approximately nine hundred logical diodes. FIGURE 4 illustrates the registers and tracks contained on the magnetic memory drum, the read heads and amplifiers associated therewith, the flip-flops for writing and reading connected to the write and read head amplifiers, the logical flip-flops, and a DDA logic and gating matrix.

Essentially, the matrix contains the diode gates and amplifiers defined by the logical equations to accomplish the particular operations of the DDA 30. The logical flip-flops and the read and write flip-flops are, in general, connected directly into the logic and gating matrix and their inputs furnished by the matrix. The following Table VIII lists all of the flip-flops of the DDA 30. Each flip-flop is designated in accordance with the above-outlined nomenclature with respect to its location in the DDA 30, its function as a flip-flop, and the particular functional portion of DDA 30 with which it is associated. Each designation is also followed by a short description of the function accomplished by the particular flip-flop.

TABLE VIII

| | |
|---|---|
| FDK01 | Integrate control. |
| FDK02 | Servo control. |
| FDK03 | (1) Recirculate control. |
| FDK04 | (2) Read-write control. |
| FDP01, FDP02, FDP03, FDP04, FDP05 | Program track read. |
| FDP06 | Initial conditions track read. |
| FDP07 | Initial conditions track write. |
| FDR01 | R register read. |
| FDR02 | Delta X magnitude and intermediate overflow. |
| FDR03 | Delta X sign and intermediate overflow. |
| FDR06 | Carry for $R+Y$ delta X sum matrix. |
| FDR07 | R register write. |
| FDX00 | Intermediate overflow results. |

| | |
|---|---|
| FDY01 | Y register read. |
| FDY02, FDY03, FDY04, FDY05, FDY06 | Σ delta Y register. |
| FDY08 | Carry for $Y+\Sigma$ delta Y sum matrix. |
| FDY09 | Y register write. |
| FDZ00 | Delta Z overflow magnitude and auxiliary decode. |
| FDZ10 | Delta Z overflow sign and auxiliary decode. |
| FDZ02 | Z-magnitude write. |
| FDZ12 | Z-sign write. |

In order to better understand the mechanization and operation of the DDA 30, a list of logical equations defining the operation of the flip-flops illustrated in the above Table VIII and the derivation of various auxiliary functions follow.

LOGICAL EQUATIONS FOR DDA

```
FDK01S=PDA03   NDY00    FDP01*   IDK01              (201)

FDK01R=PDA03   NDR02
      +PDA03   FDK04*   FDK03

FDK02S=PDA03   NDY00    FDP01    IDK02              (203)

FDK02R=PDA03   NDZ00
      +PDA03   FDK04*   FDK03                       (204)

FDK03S=PDA06   IDI01    FGD04
      +PDA06   IDP02    FDP02*                      (205)

FDK03R=PDA06   IDP01    FGD03    NGT06
      +PDA06   IDP02    FDP02    IDI02    IDK02
      +PDA06   IDP02    FDP02    FGD04*   IDK02
      +PDA06   NDZ00    IDK02                       (206)

FDK04S=PDA06   IDP02    IDI02    IDK02
      +PDA06   IDP02    FGD04*   IDK02              (207)

FDK04R=PDA06   IDI01    FGD04
      +PDA06   NDZ00    IDK02                       (208)

FDP01S=PDAXX   RDP01                                (209)

FDP01R=PDAXX   RDP01*                               (210)

FDP02S=PDAXX   RDP02                                (211)

FDP02R=PDAXX   RDP02*                               (212)

FDP03S=PDAXX   RDP03                                (213)

FDP03R=PDAXX   RDP03*                               (214)

FDP04S=PDAXX   RDP04                                (215)

FDP04R=PDAXX   RDP04*                               (216)

FDP05S=PDAXX   RDP05                                (217)

FDP05R=PDAXX   RDP05*                               (218)

FDP06S=PDAXX   RDP06                                (219)

FDP06R=PDAXX   RDP06*                               (220)

FDP07S=PDA00   NGW00
      +PDA20   FDY01*
      +PDA00   FDY01    IDI01                       (221)

FDP07R=PDA00   IGW01
      +PDA20   FDY01
      +PDA00   FDY01*   IDI01                       (222)

FDR01S=PDA01   RDA01                                (223)

FDR01R=PDA01   RDA01*                               (224)
```

LOGICAL EQUATIONS FOR DDA—Continued

| | | | | | | |
|---|---|---|---|---|---|---|
| FDR02S=PDA02 | NDR55 | NDR50 | RDZ01 | | | |
| +PDA02 | IDR56 | NDR50 | RDZ02 | | | |
| +PDA02 | NDR52 | FDZ00 | | | | |
| +PDA02 | NDR02 | IDR95 | FDR01* | | | |
| +PDA02 | NDR02 | FDR01* | FDR06 | | | |
| +PDA02 | NDR02 | IDR95 | FDR06 | | | |
| +PDA02 | NDZ00 | FDP03 | | | | (225) |
| FDR02R=PDA02 | NDR55 | NDR50 | RDZ01* | | | |
| +PDA02 | NDR50 | IDR56 | RDZ02* | | | |
| +PDA02 | NDR52 | FDZ00* | | | | |
| +PDA02 | NDR02 | FDR01 | IDR05 | | | |
| +PDA02 | NDR02 | FDR01 | FDR06* | | | |
| +PDA02 | NDR02 | IDR05 | FDR06* | | | (226) |
| FDR03S=PDA02 | NDR55 | NDR50 | RDZ11 | | | |
| +PDA02 | IDR56 | NDR50 | RDZ12 | | | |
| +PDA02 | NDR52 | FDZ10 | | | | (227) |
| FDR03R=PDA02 | NDR55 | NDR50 | RDZ11* | | | |
| +PDA02 | IDR56 | NDR50 | RDZ12* | | | |
| +PDA02 | NDR52 | FDZ10* | | | | |
| +PDA02 | NDZ00 | FDP03 | | | | (228) |
| FDR06S=PDA03 | NDY00 | FDR03 | FDK02* | FDK01* | | |
| +PDA03 | IDR95 | FDR01 | | | | (229) |
| FDR06R=PDA03 | NDZ00 | | | | | |
| +PDA03 | IDR05 | FDR01* | | | | (230) |
| FDR07S=PDA04 | IDR05 | NDR53 | IDX05 | | | |
| +PDA04 | IDR95 | FDR06* | FDR01* | IDX05 | | |
| +PDA04 | IDR95 | FDR06 | FDR01 | | | |
| +PDA04 | FDR01 | IDK00 | IDX05 | | | |
| +PDA04 | FDR01 | FDR02* | IDX05 | | | |
| +PDA20 | FDR07* | | | | | (231) |
| FDR07R=PDA04 | IDR05 | FDR06 | FDR01 | | | |
| +PDA04 | IDR05 | FDR06* | FDR01* | | | |
| +PDA20 | FDR07 | | | | | |
| +PDA04 | IDR95 | NDR53 | | | | |
| +PDA04 | FDR01* | FDR02* | | | | |
| +PDA04 | FDR01* | IDK00 | | | | |
| +PDA04 | IDI01 | FGD02 | | | | (232) |
| FDY01S=PDA00 | RDY01 | FDK04* | IDX02 | | | |
| +PDA00 | RDY01 | FDK03 | IDX02 | | | |
| +PDA00 | FII01 | FDK04 | FDK03* | | | |
| +PDA00 | NGI52 | NGW00 | NGD11 | NGD00 | FGD05* | (233) |
| FDY01R=PDA00 | RDY01* | FDK04* | IDX02 | | | |
| +PDA00 | RDY01* | FDK03 | IDX02 | | | |
| +PDA00 | FII01 | FDK04 | FDK03* | | | |
| +PDA00 | NGI52 | IGW01 | NGD11 | NGD00 | FGD05* | (234) |
| FDY02S=PDA03 | NDY00 | FDY03 | | | | (235) |
| FDY02R=PDA03 | NDY00 | FDY03* | | | | (236) |
| FDY03S=PDA03 | NDY00 | FDY04 | | | | |
| +PDA03 | FDY03* | IDY11 | NDY81 | | | |
| +PDA00 | FDY05 | FDY03* | IDY91 | NDY81 | | |
| +PAA00 | FDY04 | FDY03* | IDY91 | NDY81 | | (237) |
| FDY03R=PDA03 | NDY00 | FDY04* | | | | |
| +PDA03 | FDY03 | IDY91 | NDY81 | | | |
| +PDA00 | FDY05* | IDY11 | NDY81 | FDY03 | | |
| +PDA00 | FDY04* | FDY03 | IDY11 | NDY81 | | (238) |
| FDY04S=PDA03 | NDY00 | FDY05 | | | | |
| +PDA03 | FDY04* | FDY03 | IDY11 | NDY81 | | |
| +PDA03 | FDY04* | FDY03* | IDY91 | NDY81 | | (239) |
| FDY04R=PDA03 | NDY00 | FDY05* | | | | |
| +PDA03 | FDY04 | FDY03 | IDY11 | NDY81 | | |
| +PDA03 | FDY04 | FDY03* | IDY11 | NDY81 | | (240) |
| FDY05S=PDA03 | NDY00 | FDY06 | | | | |
| +PDA03 | FDY05* | FDY04 | FDY03 | IDY11 | NDY81 | |
| +PDA03 | FDY05* | FDY04* | FDY03* | IDY91 | NDY81 | (241) |

LOGICAL EQUATIONS FOR DDA—Continued

| | | | | | | | |
|---|---|---|---|---|---|---|---|
| FDY05R=PDA03 | NDY00 | FDY06* | | | | | |
| +PDA03 | FDY05 | FDY04 | FDY03 | IDY11 | NDY81 | | |
| +PDA03 | FDY05 | FDY04 | FDY03* | IDY91 | NDY81 | | (242) |
| FDY06S=PDA03 | FDY05* | FDY04* | FDY03* | IDY91 | NDY81 | | (243) |
| FDY06R=PDA03 | FDY05 | FDY04 | FDY03 | IDY11 | NDY81 | | (244) |
| FDY08S=PDA02 | FDY02 | FDY01 | IDK04 | | | | |
| +PDA00 | NDY00 | FDY06 | IDK00 | | | | (245) |
| FDY08R=PDA02 | FDY02* | FDY01* | IDK01 | | | | |
| +PDA02 | NDZ00 | | | | | | (246) |
| FDY09S=PDA04 | NDY97 | IDX03 | IDK01 | | | | |
| +PDA04 | FDY01 | IDX03 | IDK03 | | | | |
| +PDA04 | FDP06 | IDX04 | IDI01 | | | | |
| +PDA02 | FDY09* | | | | | | (247) |
| FDY09R=PDA04 | IDY07 | IDX03 | IDK01 | | | | |
| +PDA04 | FDY01* | IDX03 | IDK03 | | | | |
| +PDA04 | FDP06* | IDX04 | IDI01 | | | | |
| +PDA20 | FDY09 | | | | | | (248) |
| FDX00S=PDA00 | FDR02 | NDR02 | | | | | (249) |
| FDX00R=PDA00 | FDR02* | NDR02 | | | | | (250) |
| FDZ00S=PDA04 | NDZ00 | FDR02* | FDR03* | NDY97 | FDX00 | | |
| +PDA04 | NDZ00 | FDR02* | FDR03 | IDY07 | FDX00 | | |
| +PDA04 | NDZ00 | FDR02 | FDR03* | IDY07 | FDX00 | | |
| +PDA04 | NDZ00 | FDR02 | FDR03 | NDY97 | FDX00 | | |
| +PDA04 | NDZ00 | FDK02 | | | | | |
| +PDA04 | IDP03 | IDR56 | RDZ02 | | | | |
| +PDA04 | IDP03 | NDR55 | RDZ01 | | | | (251) |
| FDZ00R=PDA04 | NDZ00 | PDK02* | FDX00* | | | | |
| +PDA04 | NDZ00 | FDR02* | FDR03* | IDY07 | | | |
| +PDA04 | NDZ00 | FDR02* | FDR03 | NDY97 | | | |
| +PDA04 | NDZ00 | FDR02 | NDR03* | NDY97 | FDK02* | | |
| +PDA04 | NDZ00 | FDR02 | FDR03 | IDY07 | FDK02* | | |
| +PDA04 | IDP03 | IDR56 | RDZ02* | | | | |
| +PDA04 | IDP03 | NDR55 | RDZ01* | | | | (252) |
| FDZ10S=PDA00 | NDZ00 | FDR02* | FDK02* | | | | |
| +PDA00 | NDZ00 | FDR03* | FDR02 | NDY97 | FDK02 | | |
| +PDA00 | NDZ00 | FDR03 | IDY07 | FDK02 | | | |
| +PDA00 | IDP03 | DIR56 | RDZ12 | | | | |
| +PDA00 | IDP03 | NDR55 | RDZ11 | | | | |
| +PDA00 | FDP05 | FDP04 | FDP03* | FDP02* | FDP01* | FDZ10* | (253) |
| FDZ10R=PDA00 | NDZ00 | FDR02 | FDK02* | | | | |
| +PDA00 | NDZ00 | FDR03* | FDR02 | IDY07 | FDK02 | | |
| +PDA00 | NDZ00 | FDR03 | NDY97 | FDK02 | | | |
| +PDA00 | IDP03 | IDR56 | RDZ12* | | | | |
| +PDA00 | IDP03 | NDR55 | RDZ11* | | | | |
| +PDA00 | FDP05 | FDP04 | FDP03* | FDP02* | FDP01* | FDZ10 | (254) |
| FDZ02S=PDA20 | FDZ02* | | | | | | |
| +PDA03 | IDZ23 | IDX05 | | | | | (255) |
| FDZ02R=PDA03 | IDZ26 | | | | | | |
| +PDA20 | FDZ02 | | | | | | |
| +PDA02 | IDI01 | GFD02 | | | | | (256) |
| FDZ12S=PDA02 | IDZ25 | IDX05 | | | | | |
| +PDA20 | FDZ12* | | | | | | (257) |
| FDZ12R=PDA02 | IDZ24 | | | | | | |
| +PDA02 | IDI01 | FGD02 | | | | | |
| +PDA20 | FDZ12 | | | | | | (258) |
| RDZ01=HDZ81 | IDA21 | | | | | | |
| +HDZ82 | IDA21 | FDP02 | FDP01* | | | | |
| +HDZ83 | IDA21 | FDP02 | FDP01 | | | | (259) |
| RDZ11=HDZ91 | IDA22 | | | | | | |
| +HDZ92 | IDA21 | FDP02 | FDP01* | | | | |
| +HDZ93 | IDA21 | FDP02 | FDP01 | | | | (260) |
| PDA20I=PXX00* | | | | | | | (261) |

LOGICAL EQUATIONS FOR DDA—Continued

| | | | | | | |
|---|---|---|---|---|---|---|
| IDA21I=FDP04 | | | | | | |
| +FDP05 | FDP03 | | | | | (262) |
| IDA22I=FDP04* | FDP03* | FDP02 | | | | |
| +FDP05* | FDP04* | FDP02 | | | | (263) |
| IDI01I=IGI67 | | | | | | |
| +IGP10 | | | | | | (264) |
| IDI02I=IDI01 | | | | | | (265) |
| IDK00I=FDK02 | | | | | | |
| +FDK01 | | | | | | (266) |
| IDK01I=IDK03 | | | | | | (267) |
| IDK02I=FDK04* | FDK03 | | | | | (268) |
| IDK03I=FDK02 | IDK02 | | | | | (269) |
| +FDK01 | IDK02 | | | | | |
| +NDZ00 | IDK02 | | | | | |
| IDK04I=FDK02* | FDK01* | | | | | |
| +NDZ00 | FDK01* | | | | | (270) |
| IDP00I=FDP05* | | | | | | |
| +FDP04* | | | | | | |
| +FDP03* | | | | | | |
| +FDK04* | FDK03 | | | | | (271) |
| IDP01I=FDP05 | | | | | | |
| +FDP04 | | | | | | |
| +FDP03 | | | | | | |
| +FDP01* | | | | | | |
| +FDK04* | FDK03 | | | | | (272) |
| IDP02I=FDP05* | | | | | | |
| +FDP04* | | | | | | |
| +FDP03 | | | | | | |
| +FDP01* | | | | | | (273) |
| IDP03I=FDP05* | | | | | | |
| +FDP04 | | | | | | |
| +FDP03 | | | | | | (274) |
| IDP50I=FDP07* | IDI01 | FGD05 | | | | |
| +FDP07* | NGI52 | NGD11 | NGD01 | FGD05* | IDI02 | (275) |
| IDP51I=FDP07 | NGI52 | NGG11 | NGD01 | FGD05* | IDI02 | |
| +FDP07 | IDI01 | FGD05 | | | | (276) |
| NDP53I=FDP05 | FDP04* | FDP03 | | | | (277) |
| NDP54I=NDP53 | FDP02 | FDP01 | | | | (278) |
| IDP55I=NDP54 | | | | | | (279) |
| NDR02I=FDP05* | FDP04 | FDP02 | FDP01* | FDK01 | FDK02* | (280) |
| IDR05I=FDR02* | | | | | | |
| +IDY07 | FDR03 | | | | | |
| +NDY97 | FDR03* | | | | | |
| +FDK01* | FDK02* | | | | | (281) |
| NDR50I=FDP05* | FDP04* | FDP03 | FDK01* | | | (282) |
| NDR52I=FDP04 | FDP03* | FDP02 | FDP01* | FDK01* | | (283) |
| NDR53I=FDR06* | FDR01 | | | | | |
| +FDR06 | FDR01* | | | | | (284) |
| NDR55I=FDP02 | | | | | | |
| +FDP01 | | | | | | (285) |
| IDR56I=NDR55 | | | | | | (286) |
| IDR95I=FDR02* | | | | | | |
| +NDY97 | FDR03 | | | | | |
| +IDY07 | FDR03* | | | | | |
| +FDK01* | FDK02* | | | | | |
| +NDZ00 | | | | | | (287) |
| IDX02I=NGI52 | NGD11 | NGD00 | FGD05* | | | (288) |

LOGICAL EQUATIONS FOR DDA—Continued

| | | | | | | | |
|---|---|---|---|---|---|---|---|
| IDX03I=IDI01 | IDX04 | | | | | | (289) |
| IDX04I=FGD02* | FGD01* | | | | | | |
| +FDG02 | FGD01 | | | | | | (290) |
| ID05I=IDI01 | FGD02 | | | | | | (291) |
| NDY00I=FDP05* | FDP04 | FDP03 | FDP02* | | | | (292) |
| IDY07I=NDY97 | | | | | | | (293) |
| IDY11I=FDP04 | FDZ10 | | | | | | |
| +NDR55 | RDZ11 | | | | | | |
| +NDR55 | FDP04 | | | | | | |
| +IDR56 | FDP04* | RDZ12 | | | | | (294) |
| NDY81I=FDP05* | FDP03* | FDP04 | IDR56 | RDZ02 | | | |
| +FDP05* | FDP04* | FDP03* | NDR55 | RDZ01 | | | |
| +FDP05* | FDP04 | FDP03* | FDP02* | FDP01* | FDP01* | FDZ00 | (295) |
| IDY91I=FDP04 | FDZ10* | | | | | | |
| +NDR55 | RDZ11* | | | | | | |
| +NDR55 | FDP04 | | | | | | |
| +IDR56 | FDP04* | RDZ12* | | | | | (296) |
| NDY97I+FDY08 | FDY02* | FDY01* | | | | | |
| +FDY08* | FDY02* | FDY01 | | | | | |
| +FDY08* | FDY02 | FDY01* | | | | | |
| +FDY08 | FDY02 | FDY01 | | | | | (297) |
| NDZ00I=FDP05* | FDP04 | FDP02 | FDP01* | FDK01* | | | (298) |
| IDZ02I=IDP01 | | | | | | | |
| +IDP02 | | | | | | | (299) |
| IDZ23I=IDZ26 | | | | | | | (300) |
| IDZ24I=IDZ02 | RDZ12 | | | | | | |
| +IDP01 | FDP02* | FDZ10 | | | | | |
| +IDP01 | FDP02 | FDZ10* | | | | | |
| +IDP00 | FDP02* | FDP01* | QEV11 | | | | |
| +IDP00 | FDP02* | FDP01 | QEV12 | | | | (301) |
| IDZ25I=IDZ24 | | | | | | | (302) |
| IDZ26I=IDZ02 | RDZ02 | | | | | | |
| +IDP01 | FDZ00 | | | | | | |
| +IDP00 | FDP02* | FDP01* | FEV01 | | | | |
| +IDP00 | FDP02* | FDP01 | FEV02 | | | | |
| +IDP00 | FDP02 | FDP01* | FES02 | | | | (303) |
| FDA01I=PXX00 | | | | | | | (304) |
| FDA02I=PXX00 | | | | | | | (305) |
| PDA03I=PXX00 | | | | | | | (306) |
| PDA04I=PXX00 | | | | | | | (307) |
| PDA05I=PXX00 | | | | | | | (308) |
| PDA06I=PXX00 | | | | | | | (309) |
| PDA20I=PXX00* | | | | | | | (310) |

In the foregoing equations and those relating to the GP 10, a few otherwise undefined signals appear. They are defined as follows. The signal FMC03 is a signal from the control console which causes the GP 10 to perform a single instruction and then go into the idle condition. The signal FMC02 is a signal from the control console which causes the GP 10 to begin operation. The signal FIK01 is a signal from the control console which signifies that sufficient time has passed for the warm-up to take place so that operations may begin. Its absence is used to provide an initial instruction in the V register. The signal SMP09 is generated by the control console and causes the GP 10 to circulate through a single instruction and then idle. All of the foregoing signals are provided in appropriate positions by biasing the input terminals at which they normally appear if the control console is disconnected. The signal FIV00 is the input signal selected by the GP track address register for external inputs. The signals QEV11, QEV12, FEV01, FEV02, and FES02 are all incremental input signals and their use in the equations is obvious.

As outlined above, the DDA 30 of the system of this invention is capable of operation in the integrate, servo, and recirculate modes. During these modes it is capable of executing a number of different commands. The integrate and servo modes of operation are under control of the DDA 30 while the recirculate mode is under control of the GP 10. The DDA 30 may also be placed in a read/write auxiliary mode for external communication purposes.

Philosophically, the DDA 30 comprises the initial conditions register, the Y register, the R register, the Z-lines, the five program channels, a number of logic and control flip-flops, a logic and gating matrix arrangement for executing the various operations, input and output control means associated with the GP 10, and input and output means associated with external equipment.

dress (D) register of the GP 10 specifies the particular one of the six DDA control funtcions to be performed. The conditions of the flip-flops FGD01–FGD05 of the track address register (D) for controlling the particular operations of the DDA 30 under GP command are given in Table IX, following.

TABLE IX

| DDA Function | States of D-Register Flip-Flops | | | | |
|---|---|---|---|---|---|
| | FGD05 | FGD04 | FGD03 | FGD02 | FGD01 |
| Initialize DDA | 0 | 0 | 0 | 0 | 1 |
| Initialize/Clear DDA | 0 | 0 | 0 | 1 | 0 |
| Clear R and Z Registers | 0 | 0 | 0 | 1 | 1 |
| Start DDA | 0 | 0 | 1 | 0 | 0 |
| Recirculate DDA | 0 | 1 | 0 | 0 | 0 |
| Contents of Y Register to Initial Conditions Track | 1 | 0 | 0 | 0 | 0 |

The overall control of the operation of the DDA 30 is practiced through the effect which commands originated by the GP 10 and by the program channels have on a sequence control (K) register. The sequence control (K) register comprises four flip-flops FDK01–FDK04. As a generalization, the flip-flop FDK01 controls the integration mode, the flip-flop FDK02 controls the servo mode, and the flip-flops FDK03 and FDK04 provide DDA program control of whole number input-output capabilities and assist in controlling special modes of operation under command of the GP 10.

The conditions of the flip-flops FDK01–FDK04 are defined by logical Equations 201–208. For example, the integration cycle begins when the FDK01 flip-flop is set, as controlled by Equation 201. It should be noted that the signal IDK02 in Equation 201 is indicative of an operation other than GP controlled RECIRCULATE and is generated by conditions of the flip-flops FDK03 and FDK04 while the signals NDY00 (see Equation 292) and FDP01* together signify a particular program control command from the five program tracks which initiates the summation of delta Y shift interval.

Equation 202 which states the resetting terms for flip-flop FDK01 for terminating integration illustrates that the flip-flop FDK01 assumes the reset condition either upon the first bit time of the overflow operation as signified by signal NDR02 or upon the initiation of the recirculation operation as commanded by the last two signals in the term, FDK04* and FDK03, which indicate the conditions of the associated sequence control flip-flops.

The servo operation is initiated when flip-flop FDK02 is set in accordance with Equation 203. As will be noted, only the condition of the program flip-flop FDP01 varies in initiating the servo and integrate operations. The servo mode is terminated in accordance with Equation 204 on either the last bit time of overflow or the receipt of a RECIRCULATE command.

Before referring to Equations 205–208, it should be understood that the GP 10 controls the operation of the DDA 30 in the performance of a number of functions by supervising the condition of the sequence control (K) register. These functions are initializing the DDA, clearing and initializing the DDA, clearing the R and Z registers, recirculating the DDA, starting DDA, and transferring the contents of the initial conditions track to the Y register. The actual control is accomplished by means of a general GP instruction, CONTROL DDA Equation 273, in conjunction with a particular coding of the track address (D) register of the GP 10. The output signal generated by an inverting amplifier IGI67 of the GP 10 causes the amplifier IDI01 to generate a signal which signifies CONTROL DDA. The code appearing in the track address (D) register of the GP 10 specifies the particular one of the six DDA control funtcions to be performed.

As pointed out above, another very useful operation may be accomplished by the GP 10 with respect to the DDA 30. By means of any of the store, putaway, or other GP commands having a storage address, words may be written from the GP 10 directly into the Y register of the DDA. The Y register is simply addressed as another storage position. This facility allows single word corrections to be made and offers other advantages.

On investigating Equations 205 and 208, it will be noted that the first term of each contains the signal IDI01 which signifies GP control. Thus, flip-flop FDK03 being set and flip-flop FDK04 being reset signity the RECIRCULATE command. On the other hand, OVERFLOW is indicated when both of these flip-flops are reset last terms of Equations 206 and 208, EXTERNAL READ UNDER GP CONTROL by the flip-flop FDK03 being reset (term two of Equation 206 and the flip-flop FDK04 being set (term one of Equation 207), and EXTERNAL WRITE when both are set (term two of Equation 205 and term one of Equation 207). START DDA is commanded when the flip-flop FDK03 is reset in accordance with term one of Equation 206; note that this term includes a drum origin signal NGT06 so that the operation will commence only at an origin. Term three of Equation 206 and term two of Equation 207 provide for EXTERNAL READ NOT UNDER GP CONTROL.

As mentioned above, the conditions of the flip-flops FDK01–FDK04 of the sequence control register (K) are controlled not only by the GP 10 but also by the program tracks of the DDA 30. The program tracks each provide signals via read head amplifiers RDP01–RDP05 for setting and resetting the program track read flip-flops FDP01–FDP05, the operations of which are illustrated in Equations 209–218. The five program tracks are capable of storing thirty-two individual commands. In the embodiment of the DDA disclosed, the commands illustrated in Table VII, supra, are those for which logic has been devised, for which enabling circuitry has been provided within the matrix, and which may therefore be programmed. These functions are, essentially, decode a particular Z-line position as a delta X increment, decode a Z-line position as a delta Y increment, decode a Z-line position to the putaway flip-flops, overflow, putaway, control, and input-output. Each of these functions will be discussed in more detail in the following portions of this description.

INITIAL CONDITIONS TRACK

The primary function of the initial conditions track of DDA 30 is to hold information with which to place initial Y numbers in positions selected for the various integrators of the Y register. Basically, the initial conditions track serves as a modifiable storage track by means of which properly calculated initial Y numbers can be entered in the Y registers by the GP 10. It may be used in starting a problem or in updating a problem where the Y numbers of a number of integrators are interrelated and require mutual updating.

The initial conditions track philosophically comprises that portion of the magnetic track positioned between read and write heads connected to amplifiers RDP06 and WDP07, those amplifiers, the write flip-flop FDP07, and the read flip-flop FDP06. The first terms of each of Equations 221 and 222 contain the true and false input signals NGW00 and IGW01 generated by GP 10 for writing information from the A, B, and M registers of the GP 10 on the initial condition track (see Equations 147 and 148). These signals are generated by the GP 10 during the STORE A, STORE B, STORE M, ADD-REPLACE, AND SUBTRACT-REPLACE COMMANDS.

The initial conditions track may also be used for transferring information from the Y register to the GP 10. To this end, the third terms of Equations 221 and 222 define the control over the initial conditions write flip-flop FDP07 which causes it to respond to the information contained in the Y register as an initial stage in the transfer. Term five of GP Equation 138 contains the controlling logic for addressing the initial conditions track in order to receive the information contained therein. As may be seen from the latter equation, the track is interrogated by means of its read-flip-flop FDP06 which also furnishes output signals for recirculation and for initializing the Y register.

THE Y REGISTERS

The Y register includes, in association, the magnetic drum track between read and write heads connected to amplifiers RDY01 and WDY01; the read flip-flop FDY01; the write flip-flop FDY09; the summation of delta Y register including an adder input flip-flop FDY02, three delta Y summation flip-flops FDY03–FDY05, and a sign flip-flop FDY06; and full adder logic at the input to carry flip-flop FDY08. The summation register will be discussed in the following section.

The Y register write flip-flop FDY09 is operated in accordance with Equations 247 and 248. The first term of each of these equations includes the input from the Y full adder defined by the DDA logic and gating matrix. In these terms, the signal IDX03 defines a period other than that for initializing, the signal IDK01 defines a period other than recirculate, and the signals NDY97 and IDY07 are the true and false sum matrix signals defined in Equations 297 and 293. The second term of each of Equations 247 and 248 is a normal recirculation write term, the third term of each equation controls initializing the Y register under GP control, while the last term of each is a Ferranti write input term.

As may be determined from Equation 297, the sum matrix input to the Y register depends on the bits read from each of the Y register read flip-flop FDY01, the summation of delta Y register (signal FDY02), and the carry flip-flop FDY08. The logic for the carry function is contained in the first terms of each of Equations 245 and 246 relating to the flip-flop FDY08. In addition, term two of Equation 245 provides a zero preset of the carry flip-flop to correct for two zero conditions of the summation register, while term two of Equation 246 provides for reset on completion of overflow.

The read flip-flop FDY01 is used as the input channel to the Y register. The GP 10 may, under program control, write into the Y register through the flip-flop FDY01. The operation is accomplished as though the Y register were a portion of the modifiable memory of the GP 10 while the GP control inhibits the normal operation of the Y register. This function allows the GP 10 to correct, replace, or otherwise update single Y numbers without interferring with DDA operation and without loss of an iteration. The GP 10 simply writes the new word into the read flip-flop FDY01 in place of the one circulating.

The DDA 30 may also, under program control, utilize the Y register read amplifier RDY01 (the normal input) or the output of an input-output buffer stage (a magnetic track) as the input to the read flip-flop FDY01.

The logic for all of these operations of the read flip-flop FDY01 is contained in Equations 233 and 234. The first two terms of each of these equations define the normal operations in which the input is received from the Y track via the read head RDY01. The last two terms of each of the equations define the operations in which the read flip-flop FDY01 receives input from the input-output track and the GP registers, respectively. The input-output track designation calls signals from or directs signals to a magnetic storage track which serves as modifiable temporary storage between the DDA 30 and the GP 10. It may serve either one or both and is especially useful in providing temporary storage for interim DDA conditions and results.

SUMMATION OF DELTA Y REGISTER

The delta Y incremental signals selected from the Z-lines for summation with a particular Y number are algebraically summed in the five stage, flip-flop register FDY02–FDY06. The stages including flip-flops FDY03–FDY05 are arranged as a forward-backward two's complement parallel adder. Such an adder is capable of operating with the ternary input signals provided by the Z-lines to either add or subtract particular increments depending on their signs. These stages are assisted by the sign-holding flip-flop FDY06.

The decodes from the Z-lines are transferred to and added in the summation register where they are retained with the appropriate sign until a START INTEGRATION or START SERVO signal is received. At that time, the signals defining the summation are shifted via the flip-flop FDY02 to the full adder logic defined by Equations 293 and 297 for summation with the Y number stored in the particular position of the Y register. The first four bit times of a servo or integration operation are used for this shift operation (defined by the first terms of each of Equations 235–242. After the absolute number has been shifted, the sign is held in the flip-flop FDY02 for the remainder of the integration or servo interval to control the particular summation. Equations 237–242 illustrate the operations of the magnitude flip-flops FDY03–FDY05 of the parallel adder, and Equations 243 and 244 illustrate the operation of the sign flip-flop FDY06.

The shift interval may be shortened where the number of delta Y increments summed are less than four. For example, for a single delta Y increment only two bit times are required for the shift since only the least significant bit and the shifting flip-flop FDY02 need be traversed. In like manner, only three bit times are required for shifting three or less delta Y increments.

The mathematical operation by which the parallel addition is accomplished is interesting. For example, Equations 237 and 238 illustrate the operation of the flip-flop FDK03 which represents the least significant digit of the sum. The second, the third, and the fourth terms of each equation have an input NDY81 which represents a magnitude true decode for a delta Y increment signifying that the increment has an absolute value of one. The second term of Equation 237 also contains an input signal IDY11 which signifies that the increment is positive while the third and fourth terms contain an input signal IDY91 which signifies that the increment is negative. These are reversed in Equation 238.

This logic causes the least significant bit to change each time a +1 or −1 delta Y decode occurs, to a one when flip-flop FDY03 was previously false, to a zero when it was previously in the true state. Obviously, a zero Y increment leaves the summation register in its prior state.

In the next most significant bit position, the change is dependent upon the state of the least significant bit position, as exemplified by Equations 239 and 240. The same is true of flip-flop FDY05, as shown by Equations 241 and 242.

The sign bit changes only when the total goes from plus zero (represented by 0000) to minus one (represented by 1111) and when the number goes from minus one to plus zero. Equation 243 contains the logic for setting flip-flop FDY06 when all of the stages are false and a delta Y minus signal IDY91 is received, i.e., going from plus zero to minus one. The Equation 244 demonstrates the alternate change of sign when all of the flip-flop stages are true and a positive delta Y signal IDY11 is received, i.e., going from minus one to plus zero.

The logic of term two of Equation 245 relating to the carry flip-flop FDY08 provides a zero preset to that flip-flop for negative delta Y sums to correct for fact that there are a pair of zero conditions, 0000 and 1111. This allows shift times to be shortened for both positive and negative totals since the bits are by the present adjusted to identical absolute value significance.

THE R REGISTER

The R register comprises that portion of the recirculating magnetic storage track on the drum between magnetic heads connected to the write amplifier WDR07 and the read amplifier RDA01, those heads and amplifiers, a write flip-flop FDR07, and a read flip-flop FDR01. The R register also includes circuitry within the DDA logic matrix for performing a full adder function, including a carry flip-flop FDR06, and for utilizing delta X control flip-flops FDR02 and FDR03 and a flip-flop FDX00 associated with overflow generation.

As pointed out above, the read and write heads on the R register recirculating track are spaced apart by 1600 bit positions, one-half a track length. The read amplifier RDA01 is directly connected to the read flip-flop FDR01, as illustrated by Equations 223 and 224. From the read flip-flop FDR01, the signals are recirculated to the write flip-flop FDR07 according to the logic of Equations 231 and 232 of the DDA matrix.

More particularly, the fourth term of Equation 231 and the sixth term of Equation 232 define the recirculation of information in the R register. In these terms, the signal IDK00 commands the recirculation of information, the signal IDX05 prevents initialization from taking place, and the signals FDR01 and FDR01* represent the information read by the R register read flip-flop FDR01.

On the other hand, the summation of the R number and the Y number in accordance with the delta X input signal is accomplished by means of the R register full adder which is partially defined by the first three terms of Equation 231 and by the first, second, and fourth terms of Equation 232 relating to the write flip-flop FDR07. Those terms contain the input signals IDR05 and IDR95 which represents the true and false information directed to the R register; the input to the amplifiers which generate these signals forms an additional portion of the summing matrix (see Equations 281 and 287). These true and false signals receive the Y register sum matrix signals IDY07 and NDY97 so that the new Y number is added to the R number.

Equation 284 also defines an input signal NDR53 which represents a portion of the sum matrix for the Y plus R number addition, more particularly the addition of the carry to the R number. Equations 229 and 230 define the operation of the carry flip-flop FDR06. The flip-flop FDR06 accomplishes the normal carry function and presents true and false carry signals in accordance with terms two of each of Equations 229 and 230. The carry flip-flop FDR06 is also preset to "one" when the two's complement of the Y register is to be added to the R register (term one of Equation 229) to change a Y number in one's complement to a two's complement representation. The input signal NDZ00 in the first term of Equation 230 defines the resetting operation occurring on the last bit time of an integration operation.

In addition to information from the full adder, information contained in the R register is recirculated via the write flip-flop FDR07 when delta X equals zero. Information may also be recirculated when the DDA 30 is in the recirculate mode, signals may be provided for clearing the R register to zero under GP control, or external writing signals may be furnished. Recirculation in general has already been discussed. Recirculation when the delta X increment equals zero is controlled by the logic of terms five of Equations 231 and 232. INITIALIZE-CLEAR is commanded by term seven of Equation 232. Ferranti write input is controlled by term six of Equation 231 and term three of Equation 232.

It should be noted that the clock signal PDA20 appearing in both of Equations 231 and 232 is a half-clock (synchronized to appear midway between normal clock signals) which is useful for processing external Ferranti write information. Other types of information may be utilized by other writing schemes. In this regard, all clock signals having a two (2) in the fourth place are half-clock signals while all other clock signals are full-clock signals. In the logic they are considered to be generated by the clock generator PXX00 by the signal designated PXX00*.

The delta X increments are selected from the Z-lines and stored in flip-flops FDR02 and FDR03. The first three terms of Equations 225 and 226 define the magnitude storage which takes place after increment selection from the Z-line read heads or from the putaway flip-flop FDZ00. Equations 227 and 228, other than the last term of Equation 228, contain similar logic for the storage of delta X sign information in putaway flip-flop FDZ10 after selection from the Z sign line.

OVERFLOW EQUIPMENT

The overflow operation is defined by Equations 225–228 and 249–254 which relate to the operations of flip-flops FDR02, FDR03, FDX00, FDZ00, and FDZ10. Since the R register stores information having both positive and negative values (between $-\frac{1}{2}$ and $\frac{1}{2}$), two bits (sign and magnitude) are required to represent an increment of overflow. The most significant bit position reflects the sign of the R number; the next, its magnitude. If the total of the R number and the Y number is greater than or equal to $\frac{1}{2}$, a positive delta Z increment is generated. If between the two limits, only zeros are generated. If less than $-\frac{1}{2}$, a negative delta Z increment is generated.

The flip-flops FDR02, FDR03, and FDX00 receive input signals from logic circuitry adapted to produce overflow signals indicative of the appropriate delta Z generation. The actual logic is not such as may be readily explained since it is derived by a Boolean manipulation of the equations defining a truth table which sets forth the above-mentioned criteria for generation of overflow signals. The truth table is constructed, the equations generated, and the logic arrived at in a manner well known to logic designers.

The integration overflow operations of flip-flop FDR02 are controlled by the fourth, fifth, and sixth terms of each of Equations 225 and 226. Each of these terms includes a signal NDR02 which signifies that the first bit of overflow is occurring and other signals designating a true or false R number input, a carry, a Y summing matrix signal, and an R summing matrix signal.

The flip-flop FDX00 (Equations 249 and 250) acts to transfer the condition of the flip-flop FDR02 during the first bit time of overflow.

Equations 227 and 228 list the input signals to flip-flop FDR03 which assists in defining the generation of the appropriate sign for overflow. More particularly, the flip-flop FDR03 maintains the sign of the delta X increment during the operation. This sign is one of the control terms in the generation of overflow as the equations relating to the overflow flip-flops demonstrate.

The first four terms of the Equation 251 and the first five terms of Equation 252 relating to flip-flop FDZ00 define a part of the summing matrix for determining the appropriate delta Z magnitude. As will be noted, the signals of these terms include conditions of the various elements affecting overflow generation. The first terms of each of Equations 253 and 254 control the sign of overflow in accordance with the conditions of flip-flop FDR02 during the last bit of the shift interval.

For the servo operation, a binary zero output signal is never allowed in the overflow. To this end, the logic provides that the delta Z overflow increment generated during the servo operation is equal to the sign of the Y number and the magnitude of delta X. To eliminate zero output bits, a one valued-delta X is always generated. The logic contained in the last terms of Equations 225 and 228 provides that a delta X increment of plus one magnitude is always generated on the last bit time of overflow unless a delta X decode command (signal FDP03*) is given. This necessarily causes the delta X increment for the next number to have a value of one.

The logic for input to the magnitude flip-flop FDZ00 during servo overflow is given in term five of Equation 251. No reset logic is necessary since delta X can never equal zero. The sign logic for servo overflow is contained in terms two and three of Equations 253 and 254, relating to flip-flop FDX10.

THE Z-LINES

Two Z-lines are employed in the DDA section of this system to represent the ternary values, plus one, zero, and minus one, the possible values of the delta Z overflow. Each line has an identical read-write head configuration. Each line, in addition to a magnetic track, includes a write flip-flop, a write head for recording, a write amplifier which receives information from a write flip-flop, a number of read heads interposed as selected intervals, and a pair of read amplifiers. For example, the magnitude Z-line has a write flip-flop FDZ02, a write head amplifier WDZ01, a first read head HDZ80, a first read head amplifier RDZ02 connected to the read head HDZ80, a second read head HDZ81, a third read head HDZ82, and a final read head HDZ83. The latter three read heads may be selectively connected by logic circuitry (Equation 259) to a second read head amplifier RDZ01. The particular read head selected is determined in accordance with the logic of Equation 259 under control of the five program tracks. The read head amplifier RDZ01 is arranged to be operated for furnishing delta Z information on program command to the delta X and delta Y decode stations.

The read head amplifier RDZ02 is connected in a recirculation loop of fifty bits back to the magnitude Z-line input so that information may be recirculated via the flip-flop FDZ02 for the magnitude Z-line. The particular operation is controlled by the logic of Equations 255 and 256 which describe the flip-flop inputs and by Equations 300 and 303 which more particularly describe the true and false input signals.

In like manner, a putaway sign flip-flop FDZ10 is arranged to furnish overflow sign information to a write flip-flop FDZ12 for the sign Z-line (Equations 257 and 258). The sign Z-line also has a fifty bit recirculation loop including a read head amplifier RDZ12 and flip-flop FDZ12 (defined by Equations 301 and 302), and read heads HDZ90, HDZ91, HDZ92, and HDZ93. The last three heads are selected by means of logic to feed the sign-line output amplifier RDZ11 (Equation 260). The outputs of the read amplifiers RDZ01 and RDZ11 are used directly in logical gating before being clocked into a flip-flop so that the address for the read head and the decode command may be the same logical expression.

The recirculation of information around the Z-line fifty bit loops is interrupted by a putaway command which causes the old information to be destroyed while new information is entered from the putaway flip-flop FDZ00 and FDZ10. Again, these operations are defined by Equations 255–258 and Equations 301 and 303. The flip-flops FDZ02 and FDZ12 allow the entry of external incremental input information. The Equations 301 and 303, the last two and last three terms, respectively, which define signals IDX24 and IDX26, control the external inputs which are directed to the write flip-flops FDZ02 and FDZ12. For incremental output signals, the information is read from the first read head RDZ02 on the magnitude line and RDZ12 on the sign line. The output is then taken and transferred to external circuitry such as buffer stages (not shown) peculiar to the particular use.

In various references to the Z-lines, the read positions are designated as $Z_0$, $Z_1$, $Z_2$, $Z_3$, and $Z_4$. $Z_0$ refers to the putaway flip-flops, $Z_1$ to the first pair of read heads, and so on.

*Operation of the DDA section of the system*

THE FILL OPERATION

As with the GP 10 of the system, the fill operation for the DDA 30 is accomplished by conventional equipment (not shown) which is physically connected to the system only during the fill operation. The equipment is used to write through the read heads for filling the program tracks. If desired in the particular problem, initial delta X and delta Y increments may also be written on the Z lines by the external equipment. Essentially, this method is used to lighten the equipment so that it will better serve in airborne and other situations in which minimum weight is a primary criterion. Quite obviously, it would be entirely feasible to provide fill equipment physically associated with the system were the contemplated use to change. However, such equipment is quite conventional; may include various associated arrangements such as punched tape, punched card, and magnetic tape inputs associated with various well known forms of buffer storage; and, since not a portion of this invention, has been not treated herein for the sake of clarity.

Various other operations for placing information in the DDA 30 which do relate to the operating system are discussed below.

INITIALIZING THE DDA SECTION

For either the integrate or the servo operation, initial conditions must often be placed on the initial conditions track and read into the Y register before commencing the operation. The first function is accomplished by reading the contents of the A, B, or M register into the initial conditions track via the write flip-flop FDP07 (Equations 221 and 222, first term of each; see also Equation 147 of the GP logical equations). Note that in the operation the initial conditions track is addressed as a modifiable memory position of the GP 10. The second function is accomplished by either the GP INITIALIZE–CLEAR command or the INITIALIZE command. It will be remembered that each of these commands is associated with the general GP command, CONTROL DDA. The INITIALIZE-CLEAR command is given when the DDA has been used for some previous operation and the DDA registers contain old information which must be cleared before commencing the new problem; the INITIALIZE command is given where the registers are already clear or where a set of corrected Y numbers which depend upon one another are to be entered during a problem. Both commands require the GP instruction CONTROL DDA (signal IDI01 of terms three of Equations 247 and 248). In either case, the initial conditions contained on the initial conditions track are transferred sequentially from the track via the initial conditions read flip-flop FDP06 and the Y register write flip-flop FDY09 to the appropriate positions on the Y register track. The operation is defined by terms three of Equations 247 and 248. As may be seen, each of these terms includes a true or false signal from flip-flop FDP06 representing the initial conditions track information, a signal IDX04, and the signal IDI01. The signal IDX04 specifies the particular command. It is derived (see Equation 290) from the conditions of the flip-flops of the track address (D) register of the GP 10, as explained supra.

In both operations, the initial conditions are read from the initial conditions track and onto the Y register. As mentioned, the initial conditions track is filled only half way around the drum since it is only necessary to provide initial conditions for that portion of the Y register memory track which lies between the read and write heads, i.e., only half a drum.

As previously mentioned, Y numbers may also be taken from the Y tracks via the initial conditions track and transferred to the GP 10. This is accomplished by the GP command listed in Table XI for transferring between those tracks. The command initiates the signal IDI01 which appears in terms three of each of Equations 221 and 222 relating to the initial conditions track read flip-flop FDP07. Once stored in the initial conditions track, the information may be transferred to the GP 10 by a direct addressing as a memory position.

OPERATIONS WITH THE INPUT/OUTPUT TRACK

The function of the input/output track as temporary storage associated with both the GP 10 and the DDA 30 was mentioned above. The use of the track is initiated by DDA 30 through either the READ or the WRITE command listed in Table VII. On the READ command, the information in the track is read therefrom into the read flip-flop FDY07 of the Y register (see Equations 233 and 234, terms three of each). On the WRITE command, the information is written from the Y register onto the input/output track. Both commands, like START INTEGRATOR and START SERVO, seize control of the DDA 30 and continue until an OVERFLOW command is received.

The provision of the track lends special facility to the entire system by providing a temporary memory for the DDA 30. It may also serve the GP 10 but is normally not needed for memory purposes; its main use with the GP 10 would be for transfer purposes.

THE INTEGRATOR OPERATION

The integration operation for an individual integrator is commanded by the appearance of the START INTEGRATOR command on the five program tracks (the actual coding for the command is shown in Table VII) for four sequential bit times. The four bit times are sufficient to allow the shifting of the number representing the sum of delta Y increments through the summation register including flip-flops FDY02–FDY06 into the Y register full adder. As mentioned above, the interval may be shortened where only a very few delta Y increments are handled. The integrate cycle commences automatically upon the completion of the command and continues until an overflow signal is received from the five program channels for two bit times. The two bit times are sufficient to allow the generation of a ternary overflow output which includes both a sign bit and a magnitude bit.

The START INTEGRATOR signal appearing on the program tracks causes the sequence control register FDK01–FDK04 to initiate the integration operation as defined in Equation 201. Equation 201 contains a clock-term PDA03, a signal NDY00 which signifies the beginning of the shift interval for the summation of delta Y increments, a program track signal FDP01*, and an auxiliary control signal IDK01. The combination of signals FDP01* and IDK01 includes states for all of the program tracks and effectively commands the integrate operation. The integrate condition of the sequence control (K) register causes the write flip-flop FDY09 of the Y register to receive the summation of signals from the summation of delta Y register and information contained on the Y register track for each particular integrator programmed on the Y register. These quantities are added together.

The summation function is delineated in the first term of each of Equations 247 and 249 which contain in addition to a clock signal, a signal NDY97 and IDY07 signifying the summation signal from the full adder, the signal IDK01 which signifies the setting of the flip-flop FDK01 and that the operation is not recirculated (shown in Equation 267), and a signal IDX03 which signifies that neither the INITIALIZER-CLEAR nor the INITIALIZE operation is being carried on.

As explained above, the integration operation is initiated for an individual integrator by the appearance on the program tracks of the START INTEGRATOR command for four successive intervals. Table VII above lists the bits which are programmed on the tracks for the START INTEGRATOR command. As is apparent from Equation 201, all of these conditions are required in order to set the sequence control flip-flop FDK01 which controls the integrate operation.

The appearance of the START INTEGRATOR command on the program channels for the appropriate period also causes the amplifier NDY00 to generate a signal indicative of either the START INTEGRATOR or the START SERVO command. This signal appears in the first term of each of Equations 237–242. The first term of each of these equations is a term which accomplishes the shift of the delta Y increments out of the summation of delta Y register and into the Y register. Thus, the appearance of the START INTEGRATOR signal on the program tracks initiates the addition of the sum of the delta Y increments to the Y number stored in the Y register.

As pointed out above, the sum of the delta Y increments is shifted through the summation register into the full adder circuit associated with the Y register. The full adder logic is contained at the input to the carry flip-flop FDY08 in Equations 245 and 246, term one of each and in terms one of each of Equations 247 and 248 defining the operation of the Y register write flip-flop FDY09. In the equations for the carry flip-flop FDY08, the signal FDY02 in each of the first terms represents the sum of delta Y increments to be added to the Y number while the signal FDY01 represents the Y number. It should be noted that the sign of the sum of the Y increments is retained in the flip-flop FDY02 of the summation register during the operation of the full adder in order to control the particular operation accomplished.

After the Y number and the delta Y increments have been combined, a number of operations may take place. For example, new delta Y increments may be decoded from the Z-lines or from the putaway flip-flops and stored in the summation register for use in the next integrator. By a special operation, a delta X increment may also be decoded even though the old delta X cannot be replaced until the R and Y operation is complete. During the summation the new Y number is also added to the R number in the R register of the integrator in accordance with the delta X increment stored in the delta X decode section flip-flops.

The operation by which increments are decoded from the Z-line and placed in storage in the summation of delta Y register follows. The decode command is signaled by the coding of the program tracks at a particular clock interval in accordance with the commands given in Table VII. The particular command causes the logic connected to the various Z-line read head positions to function to present the increment stored in the position in accordance with Equations 259 and 260. Equations 262 and 263 define the logic signals which appear in the aforementioned switching equations and are directly generated by the condition of the program tracks. The signals representing Y increments are transferred by the read amplifiers RDZ01, RDZ02, RDZ11, and RDZ12 to the flip-flops of the summation register. The logic for this operations appears in Equations 294–296 for the amplifiers IDY11, NDY81, and IDY91 and in Equations 237–244 defining the operation of the flip-flops FDY03–FDY06.

In addition to the conventional addition of the sum of delta Y increments to the Y number, the Y number may be replaced by a corrected Y number furnished by the GP 10 and that number summed with the incremental sum. This operation is accomplished by one of the commands of the GP 10 (such as STORE) which uses the Y register as an addressable memory position (refer to description of GP 10, supra). Any portion of the information on the Y track may be replaced in this manner to correct or otherwise update it. The last terms of each of Equations 233 and 234 contain the input logic directed to read flip-flop FDY01 for accomplishing this function. Note that, since the input from the GP 10 is at the read flip-flop of the Y track, the new Y number is summed with the delta Y increments without loss of an iteration thereby increasing machine speed.

The addition of the Y number to the R number in the R register is accomplished in accordance with the value of the delta X increment stored in the flip-flops FDR02 and FDR03. The decoding of a delta X increment is accomplished in the same manner as is decoding of the delta Y increment. However, a different program command is given as shown in Table VII. The operation of the logic connected to the Z-line read amplifiers causes the transmission of the delta X increment to the delta X storage flip-flops FDR02 and FDR03 in accordance with terms one and two of each of Equations 225–228. Alternatively, as mentioned before, the putaway flip-flops may also be used as a decode station; this is indicated in the third term of each of Equations 225–228 by the signals FDZ00 and FDZ10. By use of the putaway flip-flops, the delta X increment may be decoded for a next integrator even before the Y and R numbers have been summed under control of the old delta X increment. This is accomplished through the commands OVERFLOW to $dZ_0$ AND PUT $dZ_0$ TD $d$X and DECODE $d$Z as $dZ_0$ of Table VII. The latter command decodes an increment at a particular Z line read head and transfers it to the putaway flip-flops FDZ00 and FDZ10 (called $dZ_0$ in the command notation) for storage, while the former command causes the increment, once it is stored in the putaway flip-flops, to automatically transfer to the delta X storage flip-flops FDR02 and FDR03 when overflow occurs (see Equations 251 and 252, last two terms of each).

The addition of the Y number and the R number is accomplished by the R register full adder matrix. All of the terms of the full adder matrix are addressed to the register write flip-flop FDR07 as shown in Equations 231 and 232. The first three terms of Equation 231 include signals IDR05 and IDR95 which are, respectively, the false and true inputs from the R register summing matrix. The terms also include the signal FDR01 from the R read flip-flop and a carry signal FDR06. The fifth term of Equation 231 defines the operation accomplished when the delta X increment is zero so that no addition or subtraction is required. Equation 232 has terms one, two, four, and five which define like operations for resetting the flip-flop FDR07.

Reference to Equations 281 and 287 will illustrate the full adder inputs IDR05 and IDR95. As will be obvious from these equations the amplifiers furnishing the true and false inputs are energized in response to the R register carry signal, the delta X increment, and the Y number. As pointed out previously, one of the inputs to the R register full adder is the output of the Y register full adder, signified by the signals NDY97 and IDY07. By utilizing the Y register full adder output as a term in the R register full adder, the combining operations of the Y and R registers may be accomplished coincidentally. This precludes operating upon the Y number on a first iteration and the R number on a second iteration of the magnetic drum and enhances the accuracy of the calculations accomplished by the DDA 30 of the system.

As outlined by the above-mentioned equations, the Y number is added to the R number by sequential addition of bits. Upon the completion of the addition, the integration cycle may be terminated by the appearance of the OVERFLOW command (shown in the Table VII) on the program tracks for two consecutive bit intervals. The OVERFLOW command energizes the flip-flop FDR02 in accordance with the fourth, fifth and sixth terms of Equation 225 and the fourth, fifth, and sixth terms of Equation 226. Each of these terms includes a signal NDR02 (Equation 280) which signifies the first bit time of the overflow operation. The OVERFLOW command also energizes the flip-flop FDX00 in accordance with Equations 249 and 250. During the second bit time of the overflow period, the overflow signals are generated in the putaway flip-flop FDZ00 and FDZ10. The Equations 251–254 illustrate this operation. As mentioned previously, the overflow may take three different values, a positive one, a zero, or a negative one. Thereafter, the overflow information may be decoded from the putaway flip-flops for immediate use as a delta X or delta Y increment or may be stored on the Z-lines at the appropriate positions for future use. It should be noted that Table VII provides a command for complementing the delta Z increments on storage on the Z-lines.

It should also be noted that, as mentioned previously, the OVERFLOW command may be replaced by the OVERFLOW TO $dZ_0$ AND PUT $dZ_0$ TO $d$X command. The latter command causes the same overflow to occur but additionally shifts the stored delta X increment from the putaway flip-flops to the delta X storage flip-flops FDR02 and FDR03.

The storage on the Z-lines is designed to especially enhance the convenience of communication with all integrators. More particularly, the overflow information may be held in the putaway flip-flops until those flip-flops are required for storing the overflow from the next integrator. This facility gives a substantial selection period which may be utilized to enhance placement on the Z-lines. Furthermore, the short Z-line recirculation loops may utilize any of the output positions to further increase availability of output signals and enhance communication. The above-mentioned decode-to-putaway flip-flops command is also available to facilitate communication; and the command COMPLEMENT $dZ_0$ is available to enhance operation and increase machine speed.

This extremen choice in storage along with the substantial number of decode positions available through the multiple read heads substantially enhances the internal communication of the DDA 30. In effect, it makes the random length integrator arrangement of the present invention possible and, in fact, feasible.

Storage and selection from the Z-lines has already been discussed as it concerns the integrate operation. However, it should be remarked in closing the discussion of that operation that incremental inputs (such as accelerometer input signals) may be entered by means of the four DDA program INPUT commands listed in Table VII. The incremental input signals are received at write flip-flops FDZ02 and FDZ12 in accordance with Equations 301 and 303 defining inputs to amplifiers IDZ24 and IDZ26. Signals QEV11, QEV12, FEV01, FEV02, and FES02 represent possible incremental inputs. The inputs may be entered (just as Z-line increments may be decoded) during the actual integration operation. Thus, no delay need by occasioned by sampling external incremental input signals.

THE SERVO OPERATION

As explained above, the servo operation is one specially designed for converting the ternary signals used for communication and mathematical calculation within the DDA 30 to binary indications for external transmission. The servo operation is commanded by the appearance of the START SERVO command on the program tracks for four or less sequential intervals. The program conditions for the particular command are illustrated in Table VII above. The command appears in the signals FDP01 and NDY00 of Equation 203 defining the setting of the flip-flop FDK02. The setting of this flip-flop, as explained above, controls the initiation of the servo operation.

Once the START SERVO command has been received, the sum of the delta Y increments contained in the summation of delta Y register is shifted into the full adder circuitry contained in the logic and gating matrix associated with the Y register. This operation is identical to that which takes place upon the initiation of the integration operation and is controlled by logic defined in Equations 235–244 relating to the flip-flops FDY02–FDY06 of the summation register. As explained previously, each of the equations includes in its first term a signal NDY00 generated by the program command for enabling operation during the summation shift interval. It is for this reason that the START SERVO command is programmed on the tracks to occur for a number of intervals sufficient to accomplish the entire shift function.

As in the integration operation, the sum of delta Y increments is shifted through the summation register into the adder defined by Equations 293 and 297. As is outlined in those equations, the adder samples information contained in the carry flip-flop FDY08, in the flip-flop FDY02 of the summation register, and in the read flip-flop FDY01 of the Y register. Thus, the adder receives information representing the carry, the numbers to be added, and the Y number and accomplishes the summation in accordance with the information received, as outlined in the above-mentioned equations. As in the integration operation, the sign of the sum of delta Y increments is held in the flip-flop FDY02 during the operation of the Y register full adder so that the appropriate addition or subtraction may be accomplished. Equations 247 and 248 define the write operation for the Y register through flip-flop FDY09 and include the true and false signals NDY97 and IDY07 from the adder. The first term of each of these equations defines the summation of delta Y increments and the Y number.

The R register is not used in the servo operation. The servo overflow is generated by the sign of the Y number and continually occurring positive delta X values generated (as explained) by the last terms of each of Equations 225 and 228 on the last bit time of overflow.

The servo overflow is generated in accordance with the Equations 251–254 which relate to the magnitude and sign overflow flip-flops FDZ00 and FDZ10. In Equation 251, term five defines the servo overflow operation; in Equation 253, terms two and three define the operation; and in Equation 254, terms two and three define the operation. It will be noted that all of these terms include the signal FDK02 signifying that the control flip-flop FDK02 is in the set condition. In accordance with the above-mentioned desiderata, the magnitude flip-flop FDZ00 is always placed in the one or set condition in generating an overflow in the binary coding as contrasted to an overflow generated in the ternary coding. On the other hand, the sign overflow flip-flop FDZ10 is set to the true or false condition depending on the sign of the Y number after the summation with the delta Y increments. Thus each of the terms of the Equations 253 and 254 includes signals NDY97 and IDY07 indicating a true or false input from the Y summing matrix, that is a positive or negative Y summation number. Each of the terms also has a signal from the flip-flop FDR03 which indicates the sign of delta X.

As previously mentioned, for the normal servo operation in which ternary numbers are converted to binary, the delta X increment sign is maintained positive by providing a positive input signal. However, in certain instances the programmer may wish to vary the delta X values in order to accomplish particular manipulative operations. To this end, the arrangement is provided with the logic which will enable this variation. The input depending on the sign of delta X enables such variation.

It should be noted that the decoding of delta Y increments is performed in a manner substantially identically to that for decoding such increments during the integrate operation. That is, the decode signals are programmed on the program tracks; and the appropriate Z-line position is read to determine the significance of the indication thereat. All of these operations are defined by the logic set out in the above explanation relating to the integrate operation. The only difference, of course, is in the generation of the delta X signal, discussed above.

RECIRCULATION

The recirculation operation is commanded by the GP 19 through the signal IDI01 of Equation 273. The term comprises two GP signals IGI67 or IGP10 which, when generated, essentially preempt control of the DDA during phase three of the GP operation. It will be recalled that phase three is that during which the various GP commands are executed. Equations 205 and 208 relating to the sequence control flip-flops FDK03 and FDK04 both include in their first terms the signal IDI01 which signifies the GP control during phase three. Each of the equations also includes the signal FGD04 which signifies that the operation is recirculation. It will be recalled that the flip-flop FGD04 is the fourth of the track register flip-flops. As pointed out above, the track register flip-flops are used to indicate the particular command to be executed by the DDA when the general GP command CONTROL DDA is initiated.

Thus the Equations 205 and 208 illustrate that the recirculation operation commences when the flip-flop FDK03 is set and the flip-flop FDK04 is reset. It is also of interest to note that the flip-flops FDK01 and FDK02 are each set by logic (see Equations 201 and 203) which includes a signal IDK02 signifying that the mode of operation is not recirculation. Thus, the recirculate command by the GP is a preemptive command; and neither the integrate nor the servo operation may proceed during its continuance.

When the RECIRCULATE command is received, the DDA goes through a number of operations. The information in the Y register and the information in the R register are recirculated without change. Thus, the delta Y and delta X increments stored in the flip-flops associated with those registers have no effect during the recirculation. During recirculation the information contained in the short fifty bit recirculation loops of the Z lines is also recirculated. All other information on the Z lines is destroyed, however, since the short recirculation loops must necessarily rewrite on every fifty bits of the track processed under the heads. The information destroyed is relatively unimportant, however, and pertains only to a single iteration. This destruction does not occur with the Y and R register tracks since the read and write heads are positioned an entire one-half track length apart and recirculation thus causes a rewriting of the recirculated information at the same position in which that information would appear during any other operation.

Control of the recirculation of information in the R register is through the logic contained in term four of Equation 231 and term six of Equation 232. Both terms include a signal IDK00 which signifies that neither the integrate nor servo operation has been commanded. Both also include a signal from the flip-flop FDR01 representing the information on the R register track.

The recirculation operation affects the Y register in accordance with the terms two of each of Equations 247 and 248. Both of these equations include a recirculate signal IDK03, a signal IDX03 which signifies that initial conditions are not being transferred, and a signal representing the condition of the Y register read flip-flop FDY01. The recirculation in the fifty bit recirculation lines of the Z lines is controlled by terms one of each of Equations 301 and 303 which define the amplifier inputs for the Z-line write flip-flops FDZ02 and FDZ12. It will be noted that each term contains a signal denoting a recirculation read amplifier (RDZ02 and RDZ12) as one input signal.

Recirculation is normally used only for test purposes. For example, recirculation would be used if it was desired to look at all integrators at the same instant to check program operation.

In addition to the GP controlled RECIRCULATION, the Table VII contains a command DO NOTHING which essentially allows the entire DDA 30 to continue a particular function such as integration without generating information or taking other action adverse to the function. The command is required in order that machine operation not be disrupted where no particular command is required for the operation.

SUMMARY OF SYSTEM OPERATION

After the extensive discussion of the operations of the general purpose computer and digital differential analyzer sections of the equipment presented above, only a few comments of the individual operation of these sections will be offered. The remainder of the summary will point out the interrelation of the two sections of the system which enhance the operation of the entire system.

Essentially, the general purpose computer section (GP 10) is capable of all of the normal functions of a general purpose computer. For example, it may add, subtract, multiply, and divide. It may also accomplish additional operations by means of unconditional transfer commands, commands for loading particular registers, and various value and sign comparison commands. In addition to these commands, it has a pair of logical transfer commands which are especially useful in providing the logical product of two numbers or in selecting one or a number of items from a group by providing a control against which items in the group may be checked.

The digital differential analyzer section (DDA 30) accomplishes the normal functions of a DDA but uses a unique structural arrangement to accomplish this end. The arrangement allows integrators of variable lengths to be placed immediately adjacent one another so that machine space may be conserved and system operation accelerated. This result depends upon a complete programming of all DDA functions, an arrangement of the Y and R registers for best utilization of indeterminate length integrators, and on an especially facile communication arrangement for the overflow and input Z-line storage. Another unique feature of the digital differential analyzer section of the system is the provision of the initial conditions track which may provide initial conditions under control of GP 10 so that a plurality of integrators may be furnished initial Y numbers on a single iteration of the drum.

The interrelation of the GP 10 and the DDA 30 may be considered in two different categories. First, the GP 10 is able to manipulate individual numbers of the Y register and the initial conditions track by any of its own commands which have an addressable memory position. Second, the GP 10 and the DDA have logic circuitry which allows the GP 10 automatically to accomplish a number of standard functions with respect to the operation of the DDA 30.

As to the first category, the GP 10 may call numbers from either the Y register track or the initial conditions track for use in the GP 10. This allows numbers on these DDA tracks to be added, subtracted, compared with other numbers, multiplied, generated, and variously handled for correction, logical, and for other purposes. As an example of the extreme facility that the ability to address a DDA position as a memory position affords, a specific Y number in a particular integrator may be called to the A register, there compared with a number which affords a control, the results of the comparison made to select either a first or a second instruction, and a corrected Y number placed back in the Y register position from which the original Y number was taken. Quite obviously, the GP 10 is able also to direct any number held in a particular register to either the Y register or the initial conditions track by means of the store commands. Thus, a particular manipulation such as computing a set of initial conditions or correcting a particular Y number may be made and the number placed in the appropriate position of the DDA 30. All of the GP address commands may be used in a substantially analogous manner to provide for the enhancement of DDA operation.

In the second category of operations are included all of those operations which the GP 10 automatically provides for the DDA 30. These operations are commanded under the CONTROL DDA command of the GP10. By means of these operations, information is transferred from the initial conditions track for providing initial Y numbers on the Y register, the DDA 30 is caused to recirculate and to be cleared, information is transferred from the initial conditions track back to the GP 10, and the operation of the DDA 30 is initiated. Quite obviously, these operations are those which must often be commanded whenever the DDA 30 is operated. The provision of logic for automatically accomplishing these functions saves a substantial amount of operational time in both the setup and testing of the system.

All of the foregoing examples, illustrate the extreme usefulness of a system constructed in accordance with the invention. It is to be understood, however, that the above-described arrangements are merely illustrative of the application of the principles of the invention. Numerous other arrangements may be devised by those skilled in the art without departing from the spirit and scope of the invention as defined by the appended claims.

What is claimed is:

1. A computing machine comprising an integrating section having means for storing information to control the logical operations of the integrating section, a first recirculating register of a first length, a second recirculating register of a length equal to that of the first recirculating register, a third recirculating register having a length substantially less than the length of the first recirculating register, means for advancing information contained in the third recirculating register to a plurality of readout positions over periods substantially longer than that required for an iteration of the third recirculating register, and means for selecting information held by said means for storing information to control the logical operations of the integrating section to cause the integrating section to commence integration, to select particular incremental numbers for use in the integration, and to cease integration, the length of individual integrators produced by such control being arbitrarily variable under such control.

2. A computing machine as claimed in claim 1 wherein said means for selecting information includes means for selecting incremental signals from the third recirculating register at any of the plurality of readout positions.

3. A computing machine as claimed in claim 1 further comprising a storage medium having the capacity equal to the length of the first recirculating register, and means for transferring information contained in said storage medium to said first recirculating register during a single recirculation of said first recirculating register.

4. A magnetic drum computing machine comprising a plurality of magnetic program storage tracks upon the drum, a first recirculating register of a first length comprising a portion of a magnetic track on said drum, a second recirculating register of a length equal that of the first recirculating register comprising a portion of another magnetic track on said drum, a magnetic overflow storage track on said drum, a control section including a plurality of flip-flops and gating circuits operative responsive to information stored on said plurality of program tracks for controlling said machine in accomplishing an integration operation.

5. A magnetic drum combinational computer system comprising:

a general purpose computer section including;

a plurality of magnetic tracks;

read and write heads cooperating with said magnetic tracks;

means for storing signals representing particular numbers and operations on selected tracks;

a logic and gating matrix having logic circuits;

general purpose computer section control means connected to said logic circuits and said first named means for enabling operations upon said signals;

a digital differential analyzer section including;

a plurality of memory tracks;

read and write means associated with said tracks;

a plurality of flip-flop circuits;

means for storing program-representing signals on selected tracks;

control means connecting said tracks, said read and write means and said flip-flop circuits to form a Y register, an R register and an overflow memory; and said general purpose computer section control means further including means for selecting signals representing data words from memory tracks of said general purpose section and transferring said signals to selected positions in said Y register of said digital differential analyzer section.

6. In the computer system of claim 5, said logic and gating matrix including:

summing means for summing combined delta Y increments from said up-down register with individual Y numbers;

means for transferring said Y numbers to said recirculating Y register and to said recirculating R register; and means for summing R numbers with numbers transferred to said R register from said summing means.

7. In the computer system of claim 6, said logic and gating matrix including:

means for connecting some of said plurality of flip-flops to form an up-down counter for summing both positive and negative delta Y increments during a predetermined time interval.

8. In the computer system of claim 6, said digital differential analyzer including:

a control section including a rotating magnetic drum;

means for storing information on selected portions of said magnetic drum;

means for retrieving information stored on said magnetic drum;

a plurality of flip-flop circuits;

means connecting said logic and gating matrix to said means for storing information and means for retrieving information on said magnetic drum, and to said flip-flops to provide a recirculating Y register, a summation of delta Y increments register, a recirculating R register, overflow storage means; and program track means on said magnetic drum for causing Y numbers and delta Y increments to be combined and added to R numbers in accordance with delta X increments, providing an integrating function.

9. A digital differential analyzer comprising:

control means;

an initial conditions register storing variable length words;

a recirculating Y register having a storage capacity which is a multiple of the average length of variable length words stored therein;

a recirculating R register;

an overflow storage register; and means enabling said control means to selectively transfer variable length words from said initial conditions register to said Y register and stored adjacent one another in said Y register to initialize an integration.

10. Apparatus according to claim 9, including:

means for providing initial Y numbers to said Y register;

means for selecting incremental delta Y values for combination with Y members;

means for selecting incremental delta X values for controlling the combination of Y numbers with numbers in said R register;

means for providing incremental input signals to said overflow storage register; and means for selecting incremental output signals representing overflow of said R register.

11. In the apparatus of claim 10, said recirculating R register having a storage capacity which is a substantial multiple of average word length stored therein, Z storage means including at least one magnetic drum memory track, a write head and a plurality of read heads associated with said magnetic track, and said control means generating a recirculation path between one of said read heads and said write head for recirculating incremental overflow signals.

12. In the apparatus of claim 11 said recirculating Y and R registers including tracks on a magnetic storage drum having storage portions respectively defined by read and write heads separated by a storage distance which is a substantial multiple of average Y and R number length.

13. Apparatus according to claim 12 wherein said input signals are furnished by said means for providing initial Y numbers to said Y register.

14. Apparatus according to claim 13, including means for selectively providing Y numbers to individual areas of the Y register storage portion during the integration operation.

15. Apparatus according to claim 14 wherein said means for selectively providing Y numbers comprises means for reading a particular number from a plurality of positions, including the Y register storage portion, said means for reading being responsive to input signals for directing a new Y number to be rewritten in place of a selected Y number on the Y register storage portion.

16. Apparatus according to claim 15 wherein said overflow storage register includes a magnetic drum storage portion with a write head and a plurality of read heads for selecting incremental numbers from various positions thereof, means for selecting incremental signals from any of said read positions and placing them in temporary storage means, and means for transferring incremental numbers from temporary storage means to control the combination of Y and R numbers in said R register in response to the generation of an incremental overflow signal by said R register.

17. Apparatus according to claim 15 wherein said control means includes means for selecting a plurality of stored increments for coincident addition to a single Y number in said Y register, means for selecting an incremental number from said incremental storage means to control the combination of the Y number and the R number in said R register, and further means for selecting an incremental number from said incremental storage means to control the combination of Y and R numbers in said R register during the period of combination of other Y and R numbers.

(References on following page)

References Cited

UNITED STATES PATENTS

| | | | |
|---|---|---|---|
| 2,841,328 | 7/1958 | Steele et al. ------ | 235—150.31 |
| 2,850,232 | 9/1958 | Hagen et al. ------ | 235—150.31 |
| 2,935,734 | 5/1960 | Donan et al. --------- | 340—174 |
| 3,007,640 | 11/1961 | Beck et al. ------- | 235—150.31 |
| 3,029,023 | 4/1962 | Beck et al. ------- | 235—150.31 |
| 3,035,768 | 5/1962 | Steele ----------- | 235—150.31 |
| 3,039,688 | 6/1962 | Moe et al. ------- | 235—150.31 |
| 3,109,090 | 10/1963 | Cabaniss et al. ---- | 235—150.31 |
| 3,167,646 | 1/1965 | Giroux --------- | 340—172.5 X |

FOREIGN PATENTS

| | | |
|---|---|---|
| 794,633 | 5/1958 | Great Britain. |

OTHER REFERENCES

Bendix Computer Corporation Accessory Model DA–1A Digital Differential Analyzer for the Bendix G–15D General Purpose Computer, Revised May 1957. Received in the U.S. Patent Office on December 17, 1957, pp. 1 to 5 (copy available in 235–152.1).

IBM Reference Manual 1401 Data Procesing System copyright 1960, 1961, pp. 31 to 33 relied on. (copy available in Group 240).

MARTIN P. HARTMAN, *Primary Examiner.*

U.S. Cl. X.R.

235—165